(12) United States Patent
Lin et al.

(10) Patent No.: US 12,541,079 B2
(45) Date of Patent: Feb. 3, 2026

(54) IMAGING LENS ASSEMBLY, IMAGE CAPTURING UNIT AND ELECTRONIC DEVICE

(71) Applicant: LARGAN PRECISION CO., LTD., Taichung (TW)

(72) Inventors: Yu Jui Lin, Taichung (TW); Shih-Han Chen, Taichung (TW); Guang-Yan Liu, Taichung (TW); Yu-Han Shih, Taichung (TW); Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 285 days.

(21) Appl. No.: 18/386,755

(22) Filed: Nov. 3, 2023

(65) Prior Publication Data
US 2025/0102771 A1 Mar. 27, 2025

(30) Foreign Application Priority Data

Sep. 22, 2023 (TW) ................................ 112136261

(51) Int. Cl.
*G02B 13/00* (2006.01)
(52) U.S. Cl.
CPC ................................ *G02B 13/0035* (2013.01)
(58) Field of Classification Search
CPC ...... G02B 9/12; G02B 13/0035; G02B 13/18; G02B 27/0025
See application file for complete search history.

(56) References Cited

U.S. PATENT DOCUMENTS

| | | |
|---|---|---|
| 5,173,809 A | 12/1992 | Iwaki et al. |
| 8,724,235 B2 | 5/2014 | Tsai et al. |
| 9,341,815 B1 | 5/2016 | Hsueh et al. |
| 9,759,889 B1 | 9/2017 | Tang et al. |
| 10,338,355 B2 | 7/2019 | Hsieh et al. |
| 11,513,317 B2 | 11/2022 | Wang et al. |
| 11,632,492 B2 | 4/2023 | Huang |
| 2015/0370039 A1 | 12/2015 | Bone |
| 2016/0212309 A1 | 7/2016 | Liu et al. |
| 2016/0212310 A1 | 7/2016 | Liu et al. |
| 2016/0223785 A1 | 8/2016 | Liu et al. |
| 2016/0223786 A1 | 8/2016 | Liu et al. |

(Continued)

FOREIGN PATENT DOCUMENTS

| | | |
|---|---|---|
| CN | 106970459 A | 7/2017 |
| CN | 108459398 A | 8/2018 |

(Continued)

OTHER PUBLICATIONS

TW Notice of Allowance Dated Feb. 18, 2025 as received in Application No. 112136261.
TW Office Action dated Aug. 5, 2024 in application 112136261.

*Primary Examiner* — Jack Dinh
(74) *Attorney, Agent, or Firm* — Maschoff Brennan

(57) ABSTRACT

An imaging lens assembly includes three lens elements which are, in order from an object side to an image side along an optical path: a first lens element, a second lens element and a third lens element. Each of the three lens elements has an object-side surface facing toward the object side and an image-side surface facing toward the image side. The object-side surface of the second lens element is concave in a paraxial region thereof. At least one surface of at least one lens element in the imaging lens assembly has at least one inflection point.

11 Claims, 36 Drawing Sheets

(56) References Cited

U.S. PATENT DOCUMENTS

| | | |
|---|---|---|
| 2016/0223787 A1 | 8/2016 | Liu et al. |
| 2016/0223789 A1 | 8/2016 | Liu et al. |
| 2016/0334605 A1 | 11/2016 | Liu et al. |
| 2016/0334606 A1 | 11/2016 | Liu et al. |
| 2017/0235097 A1 | 8/2017 | Tsai et al. |
| 2017/0276907 A1 | 9/2017 | Lai et al. |
| 2017/0276908 A1 | 9/2017 | Lai et al. |
| 2020/0371312 A1 | 11/2020 | Tang et al. |
| 2021/0318525 A1 | 10/2021 | Bao et al. |
| 2022/0269042 A1 | 8/2022 | Wang et al. |
| 2023/0047080 A1 | 2/2023 | Lee et al. |
| 2023/0052783 A1 | 2/2023 | Lee et al. |
| 2023/0204937 A1 | 6/2023 | Charriere et al. |
| 2024/0019670 A1 | 1/2024 | Chang et al. |
| 2024/0345363 A1 | 10/2024 | Huang |

FOREIGN PATENT DOCUMENTS

| | | |
|---|---|---|
| CN | 108802974 A | 11/2018 |
| CN | 109828346 A | 5/2019 |
| CN | 110208920 A | 9/2019 |
| CN | 110531505 A | 12/2019 |
| CN | 111061046 A | 4/2020 |
| CN | 211506525 U | 9/2020 |
| CN | 111812828 A | 10/2020 |
| CN | 112684589 A | 4/2021 |
| CN | 113156616 A | 7/2021 |
| CN | 213986999 U | 8/2021 |
| CN | 113777755 A | 12/2021 |
| CN | 113805311 A | 12/2021 |
| CN | 113835213 A | 12/2021 |
| CN | 114167593 A | 3/2022 |
| CN | 216013817 U | 3/2022 |
| CN | 115202008 A | 10/2022 |
| CN | 116338932 A | 6/2023 |
| KR | 10-2022-0115035 A | 8/2022 |
| TW | 201723574 A | 7/2017 |
| TW | 202109115 A | 3/2021 |
| TW | 202234117 A | 9/2022 |
| TW | 202305438 A | 2/2023 |
| TW | 202305458 A | 2/2023 |
| TW | 202314311 A | 4/2023 |
| TW | 202443229 A | 11/2024 |
| WO | 2021/147012 A1 | 7/2021 |
| WO | 2022/052133 A1 | 3/2022 |
| WO | 2022/236732 A1 | 11/2022 |
| WO | 2023/089791 A1 | 5/2023 |

US 12,541,079 B2

IMAGING LENS ASSEMBLY, IMAGE CAPTURING UNIT AND ELECTRONIC DEVICE

RELATED APPLICATIONS

This application claims priority to Taiwan Application 112136261, filed on Sep. 22, 2023, which is incorporated by reference herein in its entirety.

BACKGROUND

Technical Field

The present disclosure relates to an imaging lens assembly, an image capturing unit and an electronic device, more particularly to an imaging lens assembly and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an imaging lens assembly includes three lens elements. The three lens elements are, in order from an object side to an image side along an optical path, a first lens element, a second lens element and a third lens element. Each of the three lens elements has an object-side surface facing toward the object side and an image-side surface facing toward the image side.

Preferably, the object-side surface of the second lens element is concave in a paraxial region thereof. Preferably, at least one surface of at least one lens element in the imaging lens assembly has at least one inflection point.

A curvature radius of the object-side surface of the first lens element is R1, a curvature radius of the object-side surface of the second lens element is R3, and a curvature radius of the image-side surface of the second lens element is R4; with a wavelength of helium d-line as a reference wavelength for the imaging lens assembly, an axial distance between the object-side surface of the first lens element and an image surface is TLd, an entrance pupil diameter of the imaging lens assembly is EPDd, an Abbe number of the first lens element is V1d, an Abbe number of the second lens element is V2d, an Abbe number of the third lens element is V3d, a focal length of the imaging lens assembly is fd, and a focal length of the first lens element is f1d; and the following conditions are preferably satisfied:

$$1.75 < TLd/EPDd < 2.80;$$
$$0.75 < (R1-R3)/(R1+R3) < 2.55;$$
$$0.50 < (R1-R4)/(R1+R4) < 4.20;$$
$$30.00 < V1d + V2d + V3d < 105.00;$$

and $$0.70 < fd/f1d < 1.70.$$

According to another aspect of the present disclosure, an imaging lens assembly includes three lens elements. The three lens elements are, in order from an object side to an image side along an optical path, a first lens element, a second lens element and a third lens element. Each of the three lens elements has an object-side surface facing toward the object side and an image-side surface facing toward the image side.

Preferably, the object-side surface of the second lens element is concave in a paraxial region thereof. Preferably, at least one surface of at least one lens element in the imaging lens assembly has at least one inflection point.

A curvature radius of the object-side surface of the first lens element is R1, and a curvature radius of the object-side surface of the second lens element is R3; with a wavelength of helium d-line as a reference wavelength for the imaging lens assembly, an axial distance between the object-side surface of the first lens element and an image surface is TLd, an entrance pupil diameter of the imaging lens assembly is EPDd, half of a maximum field of view of the imaging lens assembly is HFOVd, an Abbe number of the first lens element is V1d, an Abbe number of the third lens element is V3d, a refractive index of the first lens element is N1d, and a refractive index of the third lens element is N3d; and the following conditions are preferably satisfied:

$$1.50 < TLd/EPDd < 2.80;$$
$$0.50 < (R1-R3)/(R1+R3) < 2.75;$$
$$0.35 < \tan(HFOVd) < 0.73;$$

and $$19.70 < V1d/N1d + V3d/N3d < 47.80.$$

According to another aspect of the present disclosure, an imaging lens assembly includes three lens elements. The three lens elements are, in order from an object side to an image side along an optical path, a first lens element, a second lens element and a third lens element. Each of the three lens elements has an object-side surface facing toward the object side and an image-side surface facing toward the image side.

Preferably, the third lens element has negative refractive power. Preferably, at least one surface of at least one lens element in the imaging lens assembly has at least one inflection point. Preferably, the imaging lens assembly further includes an aperture stop disposed on an object side of the first lens element.

A curvature radius of the object-side surface of the first lens element is R1, a curvature radius of the image-side surface of the second lens element is R4, an f-number of the imaging lens assembly is Fno, a central thickness of the first lens element is CT1, and a central thickness of the second lens element is CT2; with a wavelength of helium d-line as a reference wavelength for the imaging lens assembly, a maximum field of view of the imaging lens assembly is FOVd, and half of the maximum field of view of the imaging lens assembly is HFOVd; and the following conditions are preferably satisfied:

$$0.35 < \tan(HFOVd) < 0.73;$$

$$0.50 < (R1 - R4)/(R1 + R4) < 3.70;$$

$$36.0 \text{ degrees} < FOVd/Fno;$$

and $$1.05 < CT1/CT2 < 4.80.$$

According to another aspect of the present disclosure, an image capturing unit includes one of the aforementioned imaging lens assemblies and an image sensor, wherein the image sensor is disposed on the image surface of the imaging lens assembly.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

An imaging lens assembly includes three lens elements. The three lens elements are, in order from an object side to an image side along an optical path, a first lens element, a second lens element and a third lens element. Each of the three lens elements of the imaging lens assembly has an object-side surface facing toward the object side and an image-side surface facing toward the image side.

There can be an air gap in a paraxial region between each of all adjacent lens elements of the imaging lens assembly; that is, each of the first through the third lens elements can be a single and non-cemented lens element. The manufacturing process of cemented lenses is more complex than the non-cemented lenses, particularly when an image-side surface of one lens element and an object-side surface of the following lens element need to have accurate curvatures to ensure both lenses being highly cemented. However, during the cementing process, those two lens elements might not be highly cemented due to misalignment and it is thereby not favorable for the image quality. Therefore, having an air gap in a paraxial region between each of all adjacent lens elements of the imaging lens assembly in the present disclosure is favorable for avoiding the problem associated with the cemented lens elements while improving the yield rate, and increasing the design flexibility for satisfying high-end product specifications and excellent quality.

The first lens element can have positive refractive power. Therefore, it is favorable for converging light so as to reduce the total track length. The object-side surface of the first lens element can be convex in a paraxial region thereof. Therefore, it is favorable for adjusting the refractive power of the first lens element so as to reduce coma and spherical aberration.

The object-side surface of the second lens element can be concave in a paraxial region thereof. Therefore, it is favorable for controlling the incident angle of light on the image surface so as to reduce the variability in brightness across different imaging positions. The image-side surface of the second lens element can be convex in a paraxial region thereof. Therefore, it is favorable for controlling the spot size at the periphery of images so as to accurately recognize distance information.

The third lens element can have negative refractive power. Therefore, it is favorable for controlling the back focal length of the imaging lens assembly so as to effectively reduce the total size.

At least one of the second lens element and the third lens element can have negative refractive power. Therefore, it is favorable for balancing the refractive power of the imaging lens assembly imaging lens assembly so as to improve image quality.

Figure 31:
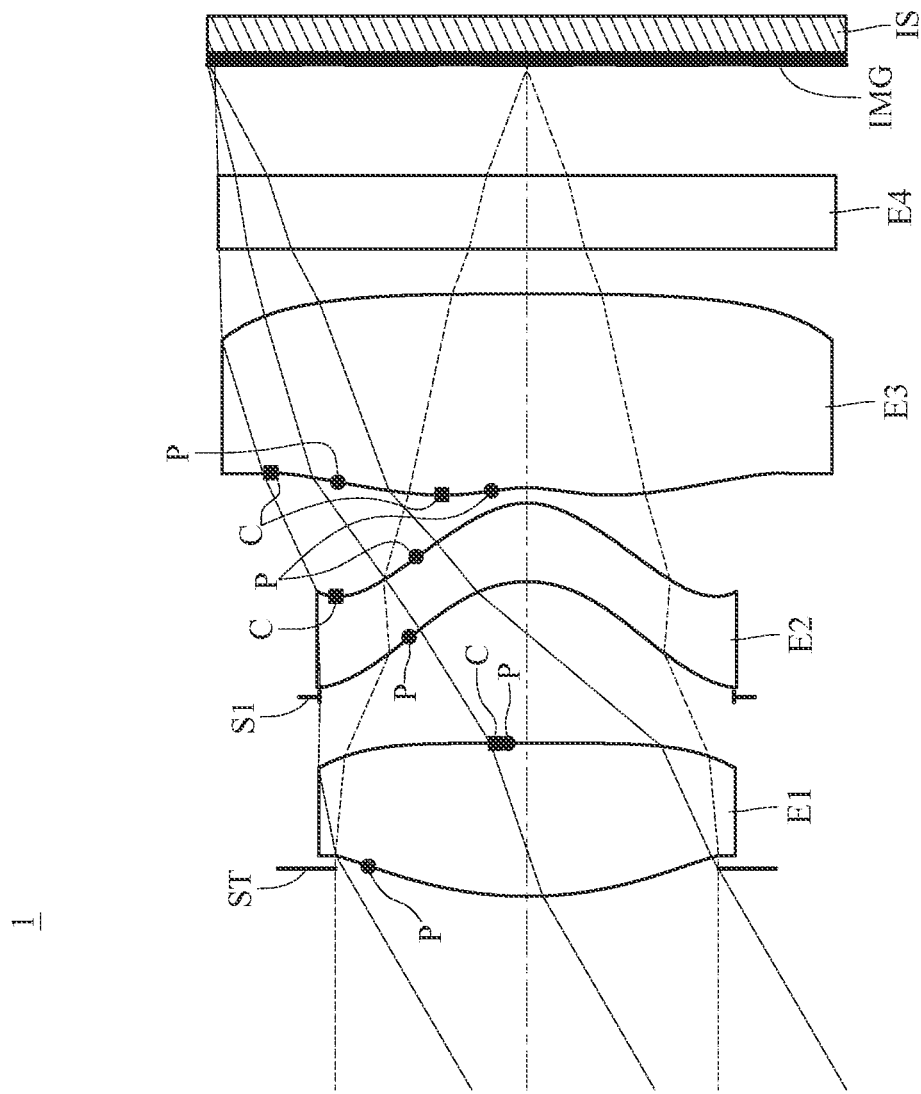
FIG. 31 shows a schematic view of inflection points on lens surfaces and critical points on lens surfaces according to the 1st embodiment of the present disclosure.

Among the three lens elements of the imaging lens assembly, there can be at least one lens element having at least one inflection point. In detail, among the first lens element through the third lens element, there can be one or more lens elements each having at least one inflection point, and said one lens element having at least one inflection point refers to a lens element in which at least one of the object-side surface and the image-side surface has at least one inflection point. Therefore, it is favorable for increasing the design flexibility for controlling peripheral light so as to improve image quality, and improving the response efficiency of the image sensor and preventing crosstalk resulting from large incident angle of light. Moreover, the object-side surface of the third lens element can have at least one inflection point. Therefore, it is favorable for the object-side surface of the third lens element to have sufficient shape variation in the off-axis region so as to correct astigmatism and field curvature. Moreover, at least one surface of each of the first lens element, the second lens element and the third lens element can have at least one inflection point. Therefore, it is favorable for correcting spherical aberration and distortion so as to maintain high resolution in the image. Please refer to FIG. 31, which shows a schematic view of inflection points P of the first lens element E1, the second lens element E2 and the third lens element E3 according to the 1st embodiment of the present disclosure. In FIG. 31, the object-side surface and the image-side surface of the first lens element E1 and the object-side surface and the image-side surface of the second lens element E2 each has an inflection point P, and the object-side surface of the third lens element E3 has two inflection points P. The 1st embodiment of the present disclosure shown in FIG. 31 is only exemplary. Each of the lens elements in various embodiments of the present disclosure can have one or more inflection points.

According to the present disclosure, the imaging lens assembly can include an aperture stop disposed on the object side of the first lens element. Therefore, it is favorable for controlling the imaging range and the incident angle of light projecting onto the image surface so as to increase relative illuminance of peripheral light on the image surface and increase image resolution.

All of the object-side surfaces and the image-side surfaces of the first lens element, the second lens element and the third lens element can be aspheric. Therefore, it is favorable for adjusting the travelling direction of light so as to prevent image deformation and distortion resulting from overly large incident angle of light.

Among the three lens elements of the imaging lens assembly, there can be at least two lens elements made of plastic material. Therefore, it is favorable for reducing the design and manufacturing difficulty of aspheric lens surfaces and reducing manufacturing costs. Moreover, each of the first lens element, the second lens element and the third lens element can be made of plastic material.

According to the present disclosure, some optical parameters can be measured at a wavelength of helium d-line (587.6 nm) by using the wavelength of helium d-line as a reference wavelength for the imaging lens assembly. More specifically, the imaging lens assembly of the present disclosure is applicable within a wide range of wavelength of light, for example, within a wavelength of light from 780 nm to 1200 nm. However, during the design of the imaging lens assembly of the present disclosure, one or more optical parameters of the imaging lens assembly may be determined or measured by using an incident light source having the wavelength of helium d-line.

With a wavelength of helium d-line as a reference wavelength for the imaging lens assembly, an axial distance between the object-side surface of the first lens element and the image surface is TLd, and an entrance pupil diameter of the imaging lens assembly is EPDd, and the following condition can be satisfied: 1.50<TLd/EPDd<2.80. Therefore, it is favorable for effectively balancing the brightness of images and the size of the imaging lens assembly, and for the imaging lens assembly to be applicable under low-light conditions while having good image identification capability. Moreover, the following condition can also be satisfied: 1.75<TLd/EPDd<2.80. Moreover, the following condition can also be satisfied: 2.00<TLd/EPDd<2.70. Moreover, the following condition can also be satisfied: 2.13≤TLd/EPDd≤2.62. In the present disclosure, when parameters (e.g., TLd and EPDd) of the imaging lens assembly are defined with a wavelength of helium d-line as a reference wavelength, these parameters are measured at the wavelength of helium d-line as a reference wavelength. Said axial distance between the object-side surface of the first lens element and the image surface can refer to the total track length of the imaging lens assembly.

When a curvature radius of the object-side surface of the first lens element is R1, and a curvature radius of the object-side surface of the second lens element is R3, the following condition can be satisfied: 0.50<(R1−R3)/(R1+R3)<2.75. Therefore, it is favorable for effectively balancing the surface shapes of the first and second lens elements for correcting spherical aberration in the paraxial region so as to improve image quality. Moreover, the following condition can also be satisfied: 0.75<(R1−R3)/(R1+R3)<2.55. Moreover, the following condition can also be satisfied: $1.20 < (R1-R3)/(R1+R3) < 2.55$. Moreover, the following condition can also be satisfied: $1.40 \leq (R1-R3)/(R1+R3) \leq 2.47$.

When the curvature radius of the object-side surface of the first lens element is R1, and a curvature radius of the image-side surface of the second lens element is R4, the following condition can be satisfied: $0.50 < (R1-R4)/(R1+R4) < 4.20$. Therefore, it is favorable for increasing light converging capability of the lens elements, and for the collaboration of the first lens element and the second lens element so as to improve paraxial image quality. Moreover, the following condition can also be satisfied: $0.50 < (R1-R4)/(R1+R4) < 3.70$. Moreover, the following condition can also be satisfied: $1.00 < (R1-R4)/(R1+R4) < 3.50$. Moreover, the following condition can also be satisfied: $1.43 \leq (R1-R4)/(R1+R4) \leq 3.18$.

With the wavelength of helium d-line as the reference wavelength for the imaging lens assembly, an Abbe number of the first lens element is V1d, an Abbe number of the second lens element is V2d, and an Abbe number of the third lens element is V3d, and the following condition can be satisfied: $30.00 < V1d + V2d + V3d < 105.00$. Therefore, it is favorable for balancing the material arrangement of lens elements of the imaging lens assembly so as to control the manufacturing difficulty of lens elements for ensuring the feasibility of mass production. Moreover, the following condition can also be satisfied: $30.00 < V1d + V2d + V3d < 96.00$. Moreover, the following condition can also be satisfied: $33.00 < V1d + V2d + V3d < 93.00$. Moreover, the following condition can also be satisfied: $58.4 < V1d + V2d + V3d \leq 90.6$. According to the present disclosure, the Abbe number Vd of one lens element is obtained from the following equation: $Vd = (Nd-1)/(NF-NC)$, wherein Nd is the refractive index of said lens element at the wavelength of helium d-line (587.6 nm), NF is the refractive index of said lens element at the wavelength of hydrogen F-line (486.1 nm), and NC is the refractive index of said lens element at the wavelength of hydrogen C-line (656.3 nm).

With the wavelength of helium d-line as the reference wavelength for the imaging lens assembly, a focal length of the imaging lens assembly is fd, and a focal length of the first lens element is f1d, and the following condition can be satisfied: $0.70 < fd/f1d < 1.70$. Therefore, it is favorable for ensuring sufficient light converging capability of the first lens element so as to reduce the total track length of the imaging lens assembly and correct aberrations for improving image quality. Moreover, the following condition can also be satisfied: $0.75 < fd/f1d < 1.50$. Moreover, the following condition can also be satisfied: $0.87 \leq fd/f1d \leq 1.33$.

With the wavelength of helium d-line as the reference wavelength for the imaging lens assembly, half of a maximum field of view of the imaging lens assembly is HFOVd, and the following condition can be satisfied: $0.35 < \tan(HFOVd) < 0.73$. Therefore, it is favorable for the imaging lens assembly to meet the field of view requirements of the device it is applied to, and maintaining good image quality across the field of view. Moreover, the following condition can also be satisfied: $0.38 < \tan(HFOVd) < 0.68$. Moreover, the following condition can also be satisfied: $0.45 < \tan(HFOVd) < 0.68$. Moreover, the following condition can also be satisfied: $0.56 \leq \tan(HFOVd) \leq 0.62$.

With the wavelength of helium d-line as the reference wavelength for the imaging lens assembly, the Abbe number of the first lens element is V1d, the Abbe number of the third lens element is V3d, a refractive index of the first lens element is N1d, and a refractive index of the third lens element is N3d, and the following condition can be satisfied: $19.70 < V1d/N1d + V3d/N3d < 47.80$. Therefore, it is favorable for effectively adjusting the light path in the imaging lens assembly and balancing the light converging capabilities of the lens elements so as to enhance the performance of the imaging lens assembly. Moreover, the following condition can also be satisfied: $21.70 < V1d/N1d + V3d/N3d < 46.30$. Moreover, the following condition can also be satisfied: $23.3 \leq V1d/N1d + V3d/N3d \leq 45.8$.

An f-number of the imaging lens assembly is Fno; with the wavelength of helium d-line as the reference wavelength for the imaging lens assembly, the maximum field of view of the imaging lens assembly is FOVd; and the following condition can be satisfied: $36.0$ degrees $< FOVd/Fno$. Therefore, it is favorable for the imaging lens assembly to have a proper field of view and a relatively large aperture stop so as to ensure that it meets higher specification standards. Moreover, the following condition can also be satisfied: $36.0$ degrees $< FOVd/Fno < 60.0$ degrees. Moreover, the following condition can also be satisfied: $41.7$ degrees $\leq FOVd/Fno \leq 44.4$ degrees.

When a central thickness of the first lens element is CT1, and a central thickness of the second lens element is CT2, the following condition can be satisfied: $1.05 < CT1/CT2 < 4.80$. Therefore, by adjusting the space arrangement of the first lens element and the second lens element, it is favorable for controlling the travelling direction of light at the front part of the imaging lens assembly and also reducing the sensitivity of the imaging lens assembly. Moreover, the following condition can also be satisfied: $1.15 < CT1/CT2 < 4.50$. Moreover, the following condition can also be satisfied: $1.47 \leq CT1/CT2 \leq 3.71$.

When an axial distance between the object-side surface of the first lens element and the image-side surface of the third lens element is TD, and an axial distance between the second lens element and the third lens element is T23, the following condition can be satisfied: $22.90 < TD/T23 < 45.90$. Therefore, it is favorable for balancing the relative spatial arrangement between the second lens element and the third lens element, and also reducing the total length of the lens elements so as to meet the requirement for thinning the device thickness. Moreover, the following condition can also be satisfied: $24.00 < TD/T23 < 45.90$.

With the wavelength of helium d-line as the reference wavelength for the imaging lens assembly, the focal length of the first lens element is f1d, and a composite focal length of the first lens element and the second lens element is f12d, and the following condition can be satisfied: $0.00 < f12d/f1d$. Therefore, it is favorable for the first lens element and the second lens element to collaborate with each other in refractive power arrangement, and adjusting the light path at the front part of the imaging lens assembly so as to achieve the effects such as reducing the total track length and correcting spherical aberration. Moreover, the following condition can also be satisfied: $0.10 < f12d/f1d < 3.00$.

The curvature radius of the object-side surface of the second lens element is R3; with the wavelength of helium d-line as the reference wavelength for the imaging lens assembly, the focal length of the imaging lens assembly is fd, and an axial distance between the aperture stop and the image surface is SLd, and the following condition can be satisfied: $7.30 < |fd/R3| + |SLd/R3| < 13.50$. Therefore, it is favorable for adjusting the position of the aperture stop and the effective focal length of the imaging lens assembly by the aid of the shape of the object-side surface of the second lens element so as to achieve the compactness requirement.

With the wavelength of helium d-line as the reference wavelength for the imaging lens assembly, the composite focal length of the first lens element and the second lens element is f12d, and a composite focal length of the second lens element and the third lens element is f23d, and the following condition can be satisfied: 1.10<|f23d/f12d|<15.10. Therefore, it is favorable for controlling the refractive power between the front part and rear part of the imaging lens assembly so as to enhance the balance of the imaging lens assembly and lower eccentricity sensitivity. Moreover, the following condition can also be satisfied: 1.10<|f23d/f12d|<12.90.

A maximum image height of the imaging lens assembly (which can be half of a diagonal length of an effective photosensitive area of the image sensor) is ImgH; with the wavelength of helium d-line as the reference wavelength for the imaging lens assembly, the axial distance between the object-side surface of the first lens element and the image surface is TLd; and the following condition can be satisfied: 2.00<TLd/ImgH<3.50. Therefore, it is favorable for controlling the total track length of the imaging lens assembly so as to meet more various application requirements. Moreover, the following condition can also be satisfied: 2.15<TLd/ImgH<3.30.

Figure 32:
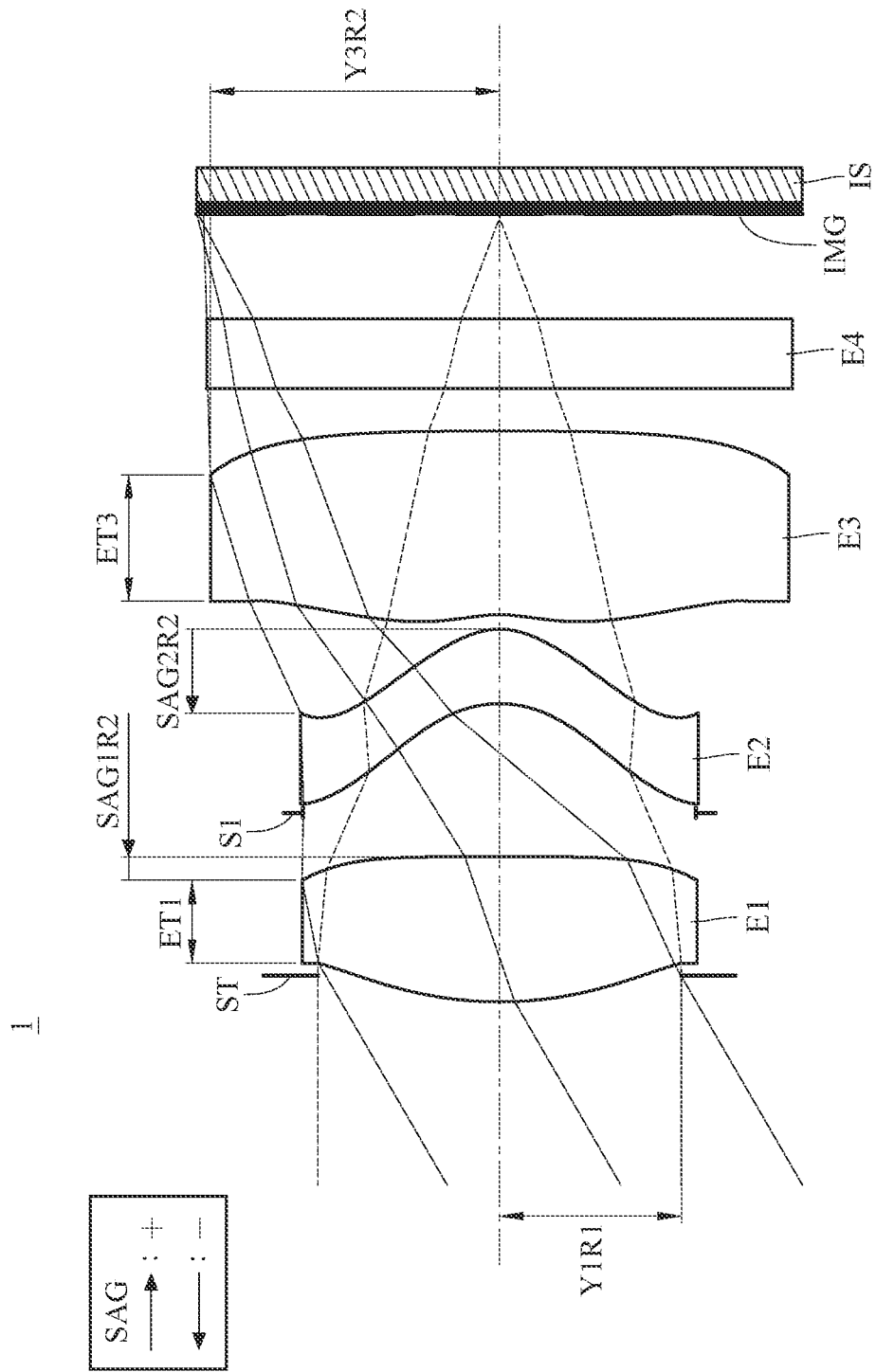
FIG. 32 shows a schematic view of Y1R1, Y3R2, SAG1R2, SAG2R2, ET1 and ET3 according to the 1st embodiment of the present disclosure.

When a maximum effective radius of the object-side surface of the first lens element is Y1R1, and a maximum effective radius of the image-side surface of the third lens element is Y3R2, the following condition can be satisfied: 1.10<Y3R2/Y1R1<2.00. Therefore, it is favorable for adjusting the optical effective radii between the front and rear parts of the imaging lens assembly so as to reduce the outer diameter of the imaging lens assembly for meeting specific application requirements. Moreover, the following condition can also be satisfied: 1.20<Y3R2/Y1R1<1.80. Please refer to FIG. 32, which shows a schematic view of Y1R1 and Y3R2 according to the 1st embodiment of the present disclosure.

When a displacement in parallel with an optical axis from an axial vertex of the image-side surface of the first lens element to a maximum effective radius position of the image-side surface of the first lens element is SAG1R2, and the central thickness of the first lens element is CT1, the following condition can be satisfied: −0.65<SAG1R2/CT1<0. Therefore, it is favorable for adjusting the surface shape of the first lens element so as to reduce both the size of lens element and the occurrence of spherical aberration. Moreover, the following condition can also be satisfied: −0.55<SAG1R2/CT1<0. Please refer to FIG. 32, which shows a schematic view of SAG1R2 according to the 1st embodiment of the present disclosure. When the direction from the axial vertex of one surface to the maximum effective radius position of the same surface is facing towards the image side of the imaging lens assembly, the value of displacement is positive; when the direction from the axial vertex of the surface to the maximum effective radius position of the same surface is facing towards the object side of the imaging lens assembly, the value of displacement is negative.

Figure 33:
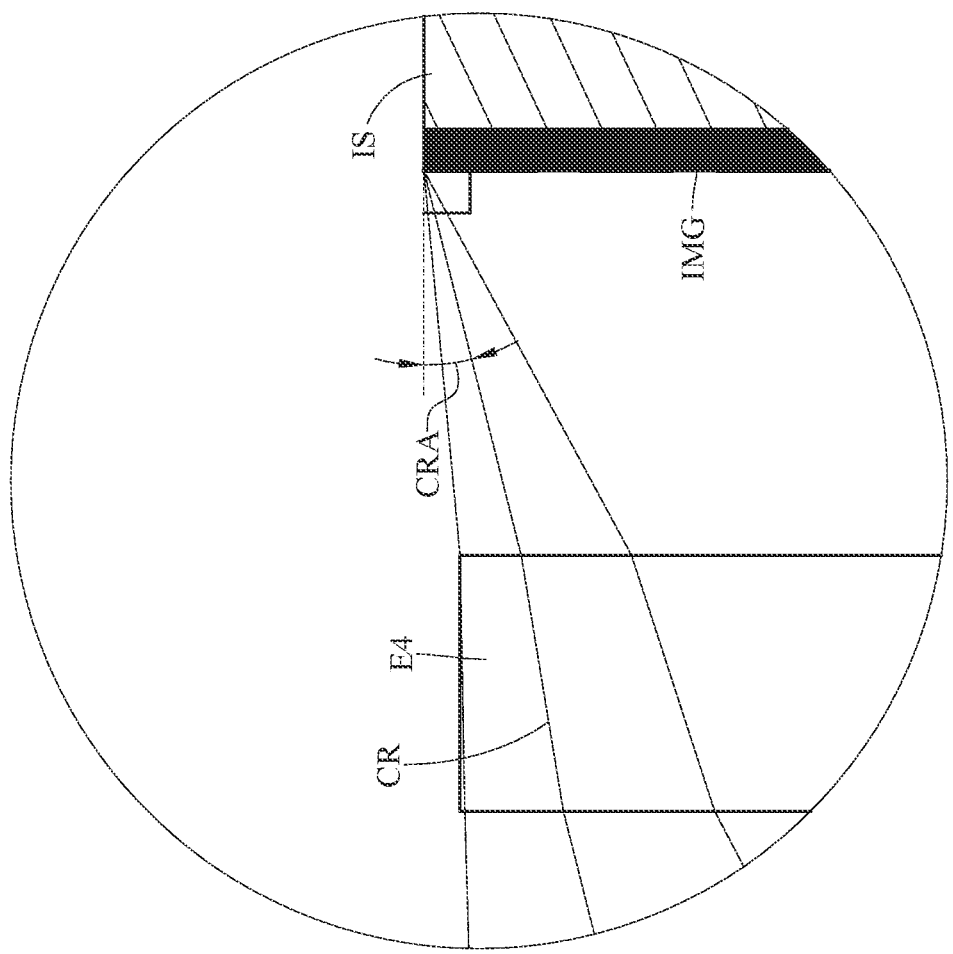
FIG. 33 shows a schematic view of CRA according to the present disclosure.

When a chief ray angle of the maximum field of view on the image surface of the imaging lens assembly is CRA, the following condition can be satisfied: 0.16<tan(CRA)<0.63. Therefore, it is favorable for controlling incident angle of light projected onto the image surface so as to reduce distortion and increase illuminance on the peripheral region of the image surface. Moreover, the following condition can also be satisfied: 0.21<tan(CRA)<0.58. Please refer to FIG. 33, which shows a schematic view of a chief ray angle CRA according to the present disclosure. In FIG. 33, a chief ray CR of the maximum field of view is incident on the image surface IMG at an image position, and the angle between a normal line of the image surface IMG and the chief ray CR of the maximum field of view is the chief ray angle of the maximum field of view CRA.

When a wavelength of light incident into the imaging lens assembly is λ, the following condition can be satisfied: 780 nm<λ<1200 nm. Therefore, it is favorable for providing a specific wavelength range, isolated from the visible light spectrum for reducing the influence of the surrounding environment and enhancing image recognition accuracy. Moreover, the following condition can also be satisfied: 850 nm<λ<1000 nm. Moreover, the following condition can also be satisfied: 930 nm<λ<950 nm.

With the wavelength of helium d-line as the reference wavelength for the imaging lens assembly, the axial distance between the object-side surface of the first lens element and the image surface is TLd, and the following condition can be satisfied: 0.10 mm<TLd<2.2 mm. Therefore, it is favorable for effectively reducing the size of the imaging lens assembly under the conditions of the imaging lens assembly possessing fine recognition capabilities and high imaging quality, thus offering the feasibility of a slimmer electronic device The curvature radius of the image-side surface of the second lens element is R4; with the wavelength of helium d-line as the reference wavelength for the imaging lens assembly, the focal length of the imaging lens assembly is fd, and the following condition can be satisfied: −10.70<fd/R4<−1.50. Therefore, adjusting the ratio between the focal length of the imaging lens assembly and the shape of the image-side surface of the second lens element is favorable for balancing the refraction angles of light and the total track length of the imaging lens assembly, and correcting field curvature. Moreover, the following condition can also be satisfied: −8.70<fd/R4<−1.80.

When the central thickness of the first lens element is CT1, and a distance in parallel with the optical axis between a maximum effective radius position of the object-side surface of the first lens element and the maximum effective radius position of the image-side surface of the first lens element is ET1, the following condition can be satisfied: 1.20<CT1/ET1<2.30. Therefore, it is favorable for controlling the ratio between the central thickness and peripheral thickness of the first lens element, adjusting the light paths in the paraxial region and off-axis region at the front part of the imaging lens assembly, and correcting coma. Moreover, the following condition can also be satisfied: 1.30<CT1/ET1<2.20. Please refer to FIG. 32, which shows a schematic view of ET1 according to the 1st embodiment of the present disclosure.

When a displacement in parallel with the optical axis from an axial vertex of the image-side surface of the second lens element to a maximum effective radius position of the image-side surface of the second lens element is SAG2R2, and the thickness of the second lens element central is CT2, the following condition can be satisfied: −1.50<SAG2R2/CT2<−0.10. Therefore, it is favorable for controlling the degree of curvature at the peripheral region of the image-side surface of the second lens element so as to balance the spherical aberration and field curvature of the imaging lens assembly, thereby improving image quality. Moreover, the following condition can also be satisfied: −1.40<SAG2R2/CT2<−0.20. Please refer to FIG. 32, which shows a schematic view of SAG2R2 according to the 1st embodiment of the present disclosure. When the direction from the axial vertex of one surface to the maximum effective radius position of the same surface is facing towards the image side of the imaging lens assembly, the value of displacement is positive; when the direction from the axial vertex of the surface to the maximum effective radius position of the same surface is facing towards the object With the wavelength of helium d-line as the reference wavelength for the imaging lens assembly, the Abbe number of the first lens element is V1d, the Abbe number of the second lens element is V2d, the refractive index of the first lens element is N1d, and a refractive index of the second lens element is N2d, and the following condition can be satisfied: $19.70 < V1d/N1d + V2d/N2d < 47.80$. Therefore, it is favorable for balancing the material arrangement of the first lens element and the second lens element so as to prevent the occurrence of image overlapping while enhancing the refraction of light path. Moreover, the following condition can also be satisfied: $21.70 < V1d/N1d + V2d/N2d < 46.30$.

The axial distance between the object-side surface of the first lens element and the image-side surface of the third lens element is TD; with the wavelength of helium d-line as the reference wavelength for the imaging lens assembly, the axial distance between the aperture stop and the image surface is SLd; and the following condition can be satisfied: $1.18 < SLd/TD < 2.25$. Therefore, it is favorable for controlling the position of the aperture stop so as to maximize the aperture stop for receiving more light. Moreover, the following condition can also be satisfied: $1.18 < SLd/TD < 1.85$.

The f-number of the imaging lens assembly is Fno; with the wavelength of helium d-line as the reference wavelength for the imaging lens assembly, the maximum field of view of the imaging lens assembly is FOVd; and the following condition can be satisfied: $60.0$ degrees $< Fno \times FOVd < 110.0$ degrees. Therefore, it is favorable for obtaining a balance between the size of the aperture stop and the range of the field of view for meeting specific application requirements. Moreover, the following condition can also be satisfied: $72.0$ degrees $< Fno \times FOVd < 106.0$ degrees.

With the wavelength of helium d-line as the reference wavelength for the imaging lens assembly, an axial distance between the image-side surface of the third lens element and the image surface is BLd, and the entrance pupil diameter of the imaging lens assembly is EPDd; and the following condition can be satisfied: $0.30 < BLd/EPDd < 1.30$. Therefore, it is favorable for controlling the imaging lens assembly to obtain a balance between a large aperture stop and a short back focal length. Moreover, the following condition can also be satisfied: $0.40 < BLd/EPDd < 1.23$. Said axial distance between the image-side surface of the third lens element and the image surface can refer to the back focal length of the imaging lens assembly.

With the wavelength of helium d-line as the reference wavelength for the imaging lens assembly, a maximum value among refractive indexes of all lens elements of the imaging lens assembly is Nmaxd, and the following condition can be satisfied: $1.600 < Nmaxd$. Therefore, it is favorable for adjusting the material distribution so as to reduce the size of the imaging lens assembly and correct aberrations. Moreover, the following condition can also be satisfied: $1.630 < Nmaxd$.

When the axial distance between the second lens element and the third lens element is T23, and a central thickness of the third lens element is CT3, the following condition can be satisfied: $0.35 < 10 \times T23/CT3 < 2.10$. Therefore, it is favorable for controlling the ratio of the distance between the second lens element and the third lens element to the central thickness of the third lens element so as to correct field curvature for providing good manufacturability. Moreover, the following condition can also be satisfied: $0.40 < 10 \times T23/CT3 < 1.80$.

When the central thickness of the first lens element is CT1, the central thickness of the third lens element is CT3, and an axial distance between the first lens element and the second lens element is T12, the following condition can be satisfied: $1.20 < (CT1 + T12)/CT3 < 4.10$. Therefore, it is favorable for adjusting the axial distances between lens elements in the imaging lens assembly so as to balance the spatial arrangement of lens elements, thereby improving space utilization and preventing space wastage and interference of lens elements. Moreover, the following condition can also be satisfied: $1.20 < (CT1 + T12)/CT3 < 3.80$.

When a distance in parallel with the optical axis between a maximum effective radius position of the object-side surface of the third lens element and a maximum effective radius position of the image-side surface of the third lens element is ET3, and the central thickness of the third lens element is CT3, and the following condition can be satisfied: $0.30 < ET3/CT3 < 1.50$. Therefore, it is favorable for adjusting the ratio between the peripheral thickness and central thickness of the third lens element so as to control incident angle of light path onto the image surface and thus improve image quality. Moreover, the following condition can also be satisfied: $0.45 < ET3/CT3 < 1.10$. Please refer to FIG. 32, which shows a schematic view of ET3 according to the 1st embodiment of the present disclosure.

According to the present disclosure, when the parameters of the imaging lens assembly, the image capturing unit and the electronic device are not specifically defined, these parameters may be determined according to the reference wavelength range.

According to the present disclosure, the aforementioned features and conditions can be utilized in numerous combinations so as to achieve corresponding effects.

According to the present disclosure, the lens elements of the imaging lens assembly can be made of either glass or plastic material. When the lens elements are made of glass material, the refractive power distribution of the imaging lens assembly may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the imaging lens assembly can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which generates light absorption and interference effects and alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. Moreover, the additive may be coated on the lens surfaces to provide the abovementioned effects.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis. Please refer to FIG. 31, which shows a schematic view of critical points C of the first lens element E1, the second lens element E2 and the third lens element E3 according to the 1st embodiment of the present disclosure. In FIG. 31, the image-side surface of the first lens element E1 and the image-side surface of the second lens element E2 each has a critical point C in an off-axis region thereof, and the object-side surface of the third lens element E3 has two critical points C in an off-axis region thereof. The 1st embodiment of the present disclosure shown in FIG. 31 is only exemplary. Each of the lens elements in various embodiments of the present disclosure can have one or more critical points in an off-axis region thereof.

According to the present disclosure, the image surface of the imaging lens assembly, based on the corresponding image sensor, can be flat or curved, especially a curved surface being concave facing towards the object side of the imaging lens assembly.

According to the present disclosure, an image correction unit, such as a field flattener, can be optionally disposed between the lens element closest to the image side of the imaging lens assembly along the optical path and the image surface for correction of aberrations such as field curvature. The optical characteristics of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

Figure 34:
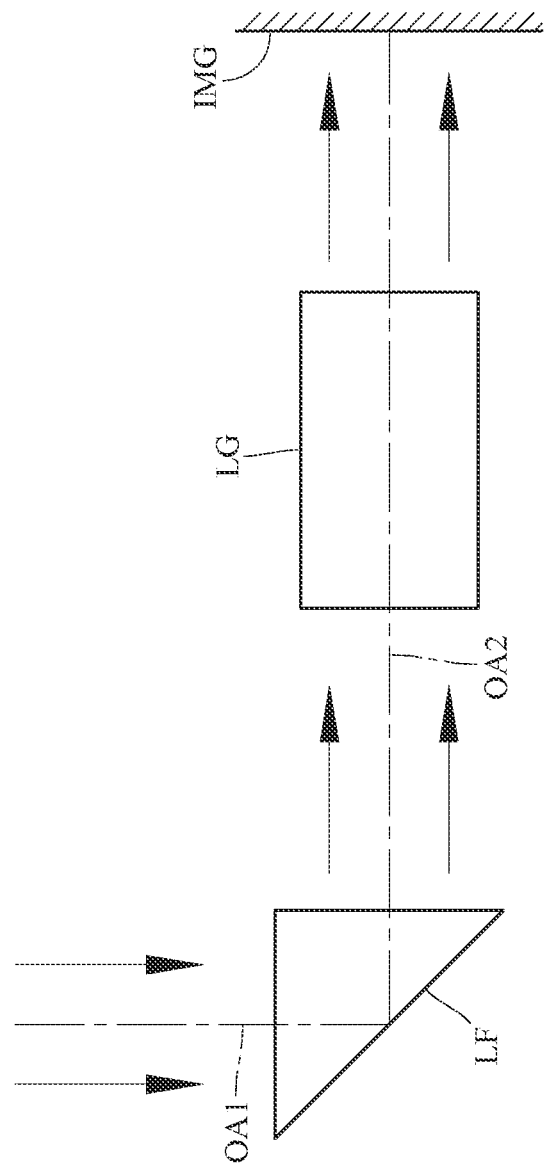
FIG. 34 shows a schematic view of a configuration of one light-folding element in an imaging lens assembly according to one embodiment of the present disclosure.
Figure 35:
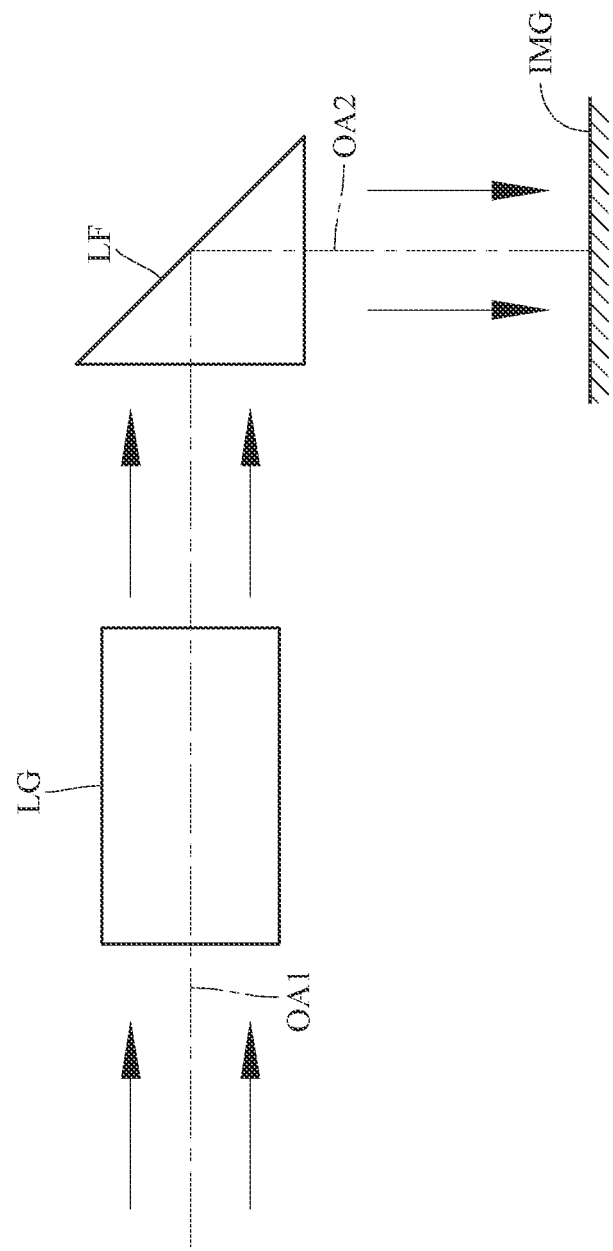
FIG. 35 shows a schematic view of another configuration of one light-folding element in an imaging lens assembly according to one embodiment of the present disclosure.
Figure 36:
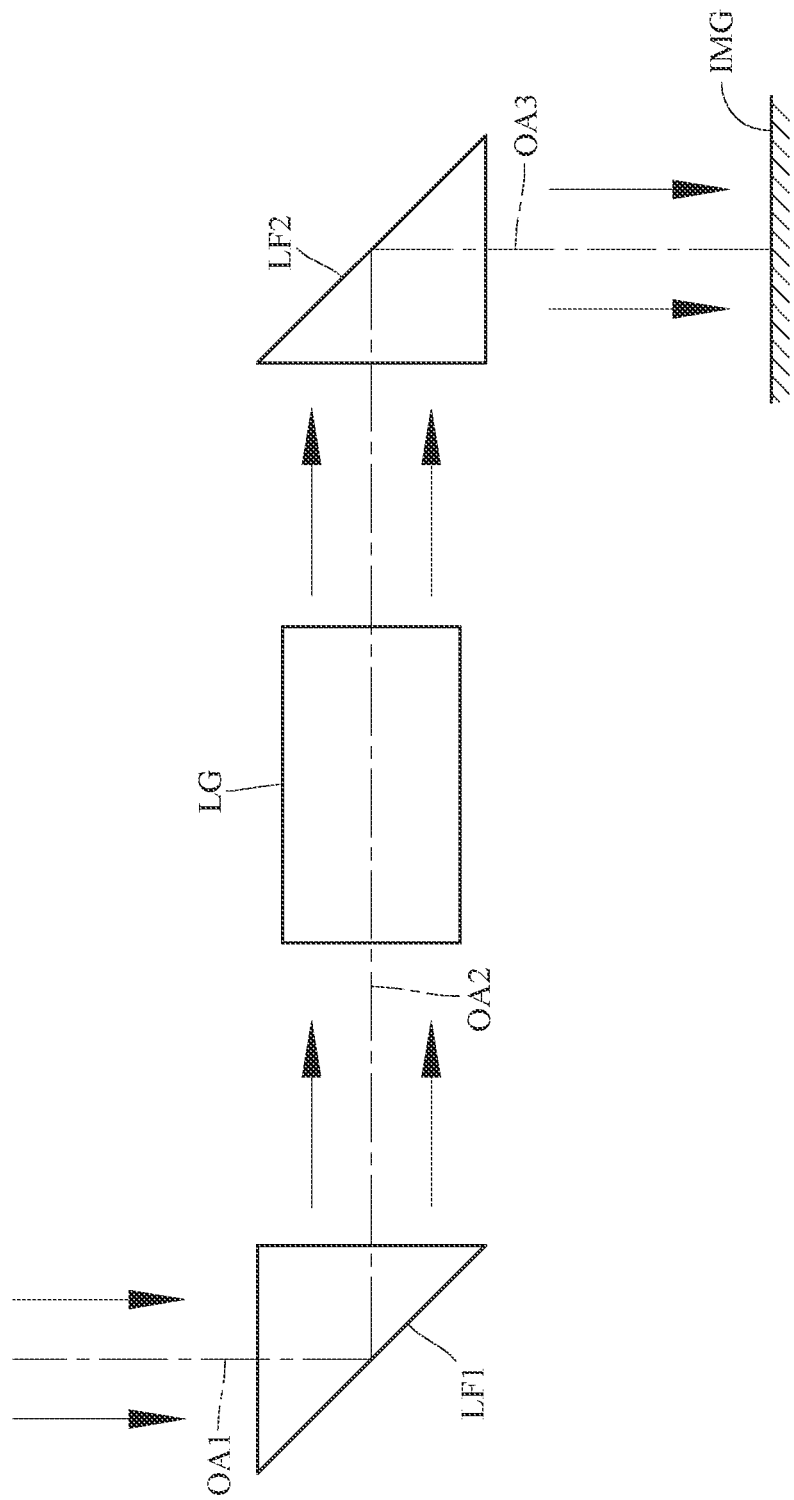
FIG. 36 shows a schematic view of a configuration of two light-folding elements in an imaging lens assembly according to one embodiment of the present disclosure.

According to the present disclosure, at least one light-folding element, such as a prism or a mirror, can be optionally provided between an imaged object and the image surface on the imaging optical path, and the surface shape of the prism or mirror can be planar, spherical, aspheric or freeform surface, such that the imaging lens assembly can be more flexible in space arrangement, and therefore the dimensions of an electronic device is not restricted by the total track length of the imaging lens assembly. Specifically, please refer to FIG. 34 and FIG. 35. FIG. 34 shows a schematic view of a configuration of one light-folding element in an imaging lens assembly according to one embodiment of the present disclosure, and FIG. 35 shows a schematic view of another configuration of one light-folding element in an imaging lens assembly according to one embodiment of the present disclosure. In FIG. 34 and FIG. 35, the imaging lens assembly can have, in order from an imaged object (not shown in the figures) to an image surface IMG along an optical path, a first optical axis OA1, a light-folding element LF and a second optical axis OA2. The light-folding element LF can be disposed between the imaged object and a lens group LG of the imaging lens assembly as shown in FIG. 34, or disposed between a lens group LG and the image surface IMG of the imaging lens assembly as shown in FIG. 35. Furthermore, please refer to FIG. 36, which shows a schematic view of a configuration of two light-folding elements in an imaging lens assembly according to one embodiment of the present disclosure. In FIG. 36, the imaging lens assembly can have, in order from an imaged object (not shown in the figure) to an image surface IMG along an optical path, a first optical axis OA1, a first light-folding element LF1, a second optical axis OA2, a second light-folding element LF2 and a third optical axis OA3. The first light-folding element LF1 is disposed between the imaged object and a lens group LG of the imaging lens assembly, the second light-folding element LF2 is disposed between the lens group LG and the image surface IMG of the imaging lens assembly, and the travelling direction of light on the first optical axis OA1 can be the same direction as the travelling direction of light on the third optical axis OA3 as shown in FIG. 36. The imaging lens assembly can be optionally provided with three or more light-folding elements, and the present disclosure is not limited to the type, amount and position of the light-folding elements of the embodiments disclosed in the aforementioned figures.

According to the present disclosure, the imaging lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the imaging lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the imaging lens assembly and thereby provides a wider field of view for the same.

According to the present disclosure, the imaging lens assembly can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the present disclosure, the imaging lens assembly can include one or more optical elements for limiting the form of light passing through the imaging lens assembly. Each optical element can be, but not limited to, a filter, a polarizer, etc., and each optical element can be, but not limited to, a single-piece element, a composite component, a thin film, etc. The optical element can be located at the object side or the image side of the imaging lens assembly or between any two adjacent lens elements so as to allow light in a specific form to pass through, thereby meeting application requirements.

According to the present disclosure, the imaging lens assembly can include at least one optical lens element, an optical element, or a carrier, which has at least one surface with a low reflection layer. The low reflection layer can effectively reduce stray light generated due to light reflection at the interface. The low reflection layer can be disposed in an optical non-effective area of an object-side surface or an image-side surface of the said optical lens element, or a connection surface between the object-side surface and the image-side surface. The said optical element can be a light-blocking element, an annular spacer, a barrel element, a cover glass, a blue glass, a filter, a color filter, an optical path folding element (e.g., a reflective element), a prism, a mirror, etc. The said carrier can be a base for supporting a lens assembly, a micro lens disposed on an image sensor, a substrate surrounding the image sensor, a glass plate for protecting the image sensor, etc.

According to the present disclosure, the object side and image side are defined in accordance with the direction of the optical axis, and the axial optical data are calculated along the optical axis. Furthermore, if the optical axis is deflected by a light-folding element, the axial optical data are also calculated along the deflected optical axis.

According to the above description of the present disclosure, the following specific embodiments are provided for further explanation.

1st Embodiment

Figure 1:
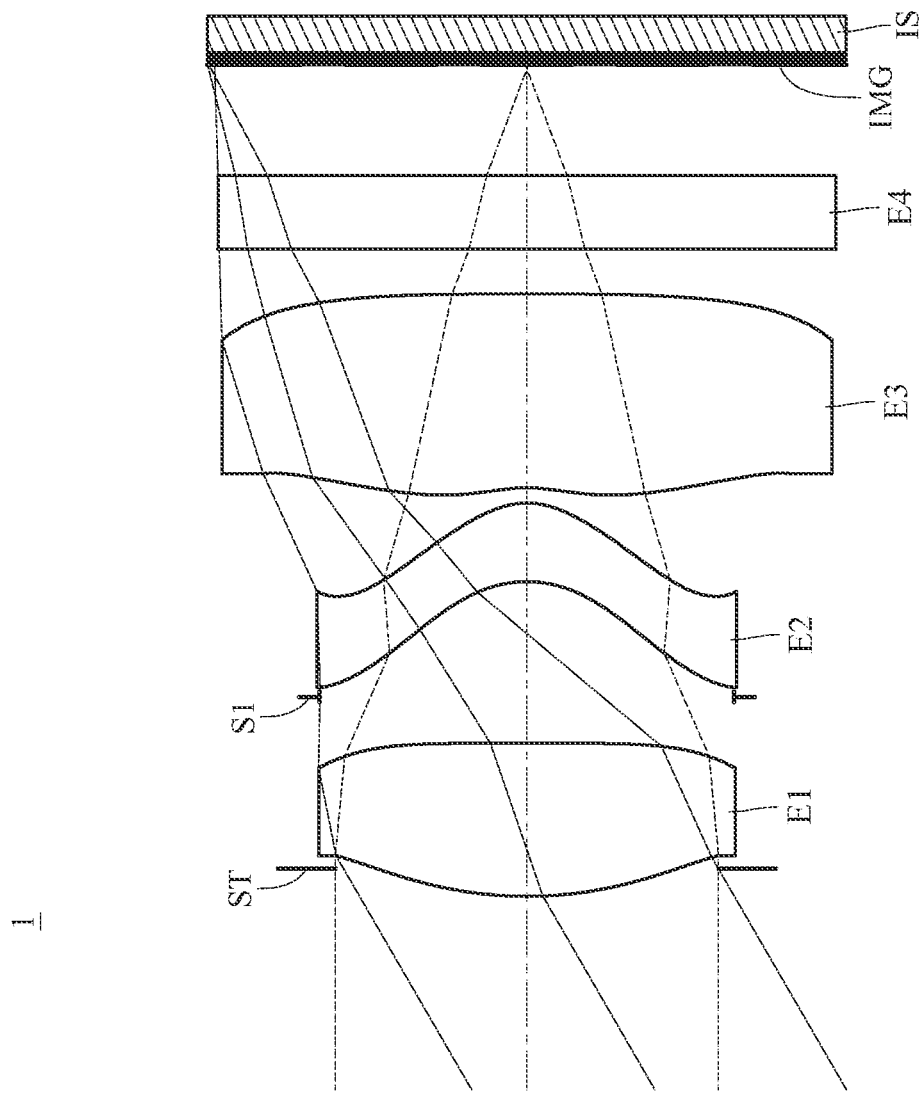
FIG. 1 is a schematic view of an image capturing unit according to the 1st embodiment of the present disclosure.
Figure 2:
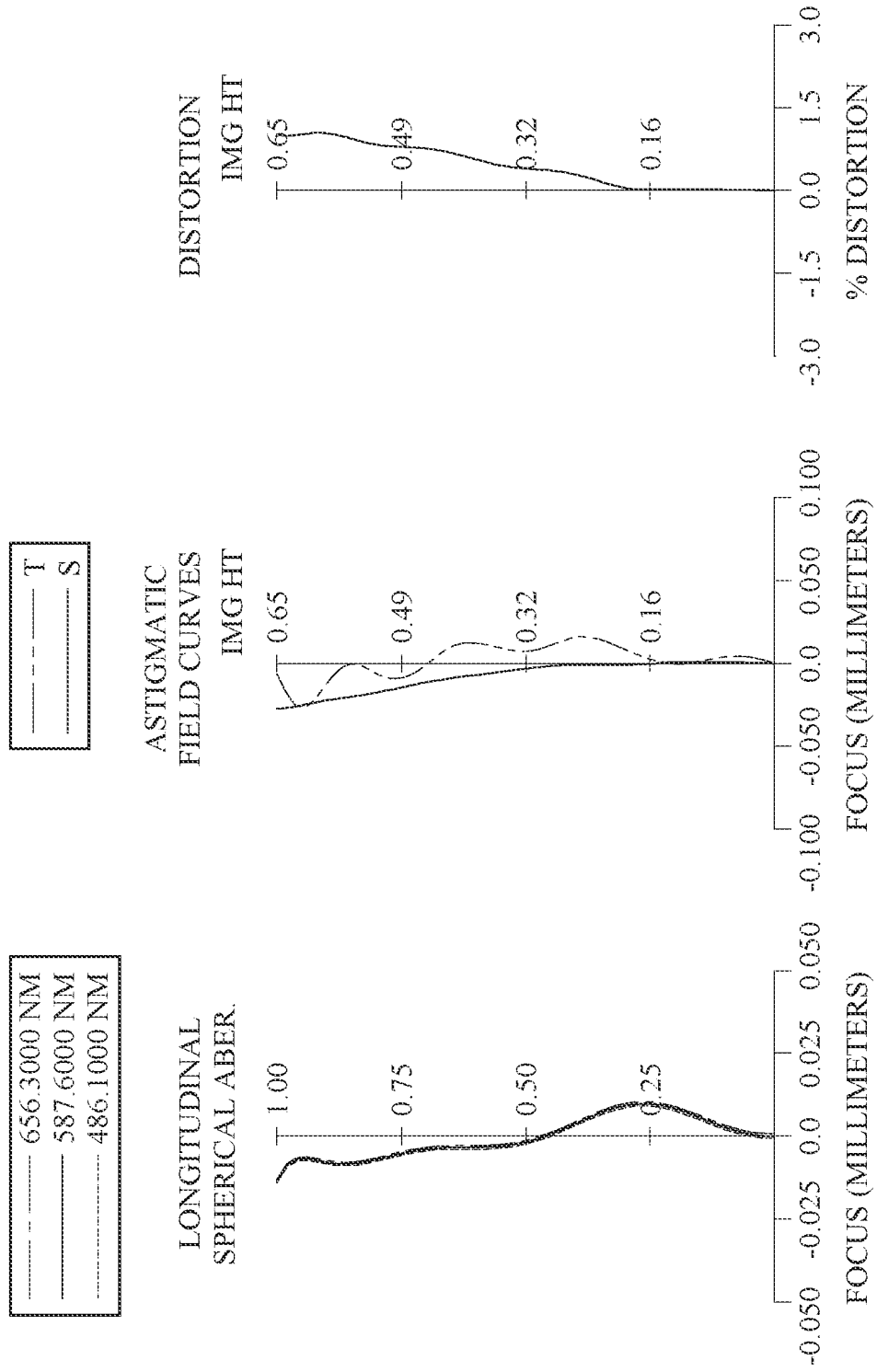
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit 1 includes the imaging lens assembly (its reference numeral is omitted) of the present disclosure and an image sensor IS. The imaging lens assembly includes, in order from an object side to an image side along an optical axis, an aperture stop ST, a first lens element E1, a stop S1, a second lens element E2, a third lens element E3, a filter E4 and an image surface IMG. The imaging lens assembly includes three single and non-cemented lens elements (E1, E2 and E3) with no additional lens element disposed between each of the adjacent three lens elements. In addition, there is an air gap in a paraxial region between each of all adjacent lens elements among the first lens element E1 through the third lens element E3.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The object-side surface of the first lens element E1 has one inflection point. The image-side surface of the first lens element E1 has one inflection point. The image-side surface of the first lens element E1 has one critical point in an off-axis region thereof.

The second lens element E2 with positive refractive power has an object-side surface being concave in a paraxial region thereof and an image-side surface being convex in a paraxial region thereof. The second lens element E2 is made of plastic material and has the object-side surface and the image-side surface being both aspheric. The object-side surface of the second lens element E2 has one inflection point. The image-side surface of the second lens element E2 has one inflection point. The image-side surface of the second lens element E2 has one critical point in an off-axis region thereof.

The third lens element E3 with negative refractive power has an object-side surface being concave in a paraxial region thereof and an image-side surface being convex in a paraxial region thereof. The third lens element E3 is made of plastic material and has the object-side surface and the image-side surface being both aspheric. The object-side surface of the third lens element E3 has two inflection points. The object-side surface of the third lens element E3 has two critical points in an off-axis region thereof.

The filter E4 is made of glass material and located between the third lens element E3 and the image surface IMG, and will not affect the focal length of the imaging lens assembly. The image sensor IS is disposed on or near the image surface IMG of the imaging lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i)$$

where,

X is the displacement in parallel with the optical axis from an axial vertex on the aspheric surface to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18, 20, 22, 24, 26, 28, and 30.

In this embodiment, with a wavelength of 940 nm as a reference wavelength for the imaging lens assembly, a focal length of the imaging lens assembly is f, an f-number of the imaging lens assembly is Fno, and half of a maximum field of view of the imaging lens assembly is HFOV, and these parameters have the following values: f=1.11 millimeters (mm), Fno=1.43, and HFOV=30.0 degrees (deg.). With a wavelength of helium d-line as a reference wavelength for the imaging lens assembly of the image capturing unit 1 according to the 1st embodiment, a focal length of the imaging lens assembly is fd, a total track length of the imaging lens assembly is TLd, a back focal length of the imaging lens assembly is BLd, and half of a maximum field of view of the imaging lens assembly is HFOVd, and these parameters have the following values: fd=1.06 mm, TLd=1.64 mm, BLd=0.42 mm, and HFOVd=30.7 degrees.

Some of the following parameters are measured at the wavelength of helium d-line, and there would be descriptions of "at the wavelength of helium d-line" noted in the definitions of these parameters. However, when the parameters are not specifically defined, these parameters may be determined according to a default of the reference wavelength for the imaging lens assembly, such as 940 nm in this embodiment.

When the maximum field of view of the imaging lens assembly at the wavelength of helium d-line is FOVd, the following condition is satisfied: FOVd=61.4 degrees.

When an axial distance between the object-side surface of the first lens element E1 and the image surface IMG at the wavelength of helium d-line is TLd, and a maximum image height of the imaging lens assembly is ImgH, the following condition is satisfied: TLd/ImgH=2.54.

When half of the maximum field of view of the imaging lens assembly at the wavelength of helium d-line is HFOVd, the following condition is satisfied: tan(HFOVd)=0.59.

When the maximum field of view of the imaging lens assembly at the wavelength of helium d-line is FOVd, and the f-number of the imaging lens assembly is Fno, the following condition is satisfied: FOVd/Fno=42.9 degrees.

When the f-number of the imaging lens assembly is Fno, and the maximum field of view of the imaging lens assembly at the wavelength of helium d-line is FOVd, the following condition is satisfied: Fno×FOVd=87.8 degrees.

When the axial distance between the object-side surface of the first lens element E1 and the image surface IMG at the wavelength of helium d-line is TLd, and an entrance pupil diameter of the imaging lens assembly the imaging lens assembly at the wavelength of helium d-line is EPDd, the following condition is satisfied: TLd/EPDd=2.22.

When an axial distance between the image-side surface of the third lens element E3 and the image surface IMG at the wavelength of helium d-line is BLd, and the entrance pupil diameter of the imaging lens assembly the imaging lens assembly at the wavelength of helium d-line is EPDd, the following condition is satisfied: BLd/EPDd=0.57.

When an axial distance between the aperture stop ST and the image surface IMG at the wavelength of helium d-line is SLd, and an axial distance between the object-side surface of the first lens element E1 and the image-side surface of the third lens element E3 is TD, the following condition is satisfied: SLd/TD=1.30.

When the focal length of imaging lens assembly at the wavelength of helium d-line is fd, and a focal length of the first lens element E1 at the wavelength of helium d-line is f1d, the following condition is satisfied: fd/f1d=0.87.

When the focal length of the first lens element E1 at the wavelength of helium d-line is f1d, and a composite focal length of the first lens element E1 and the second lens element E2 at the wavelength of helium d-line is f12d, the following condition is satisfied: f12d/f1d=0.37.

When the composite focal length of the first lens element E1 and the second lens element E2 at the wavelength of helium d-line is f12d, and a composite focal length of the second lens element E2 and the third lens element E3 at the wavelength of helium d-line is f23d, the following condition is satisfied: |f23d/f12d|=4.46.

When the focal length of imaging lens assembly at the wavelength of helium d-line is fd, and a curvature radius of the image-side surface of the second lens element E2 is R4, the following condition is satisfied: fd/R4=−7.30.

When the focal length of imaging lens assembly at the wavelength of helium d-line is fd, a curvature radius of the object-side surface of the second lens element E2 is R3, and the axial distance between the aperture stop ST and the image surface IMG at the wavelength of helium d-line is SLd, the following condition is satisfied: |fd/R3|+|SLd/R3|=10.60.

When a curvature radius of the object-side surface of the first lens element E1 is R1, and the curvature radius of the object-side surface of the second lens element E2 is R3, the following condition is satisfied: (R1−R3)/(R1+R3)=1.91.

When the curvature radius of the object-side surface of the first lens element E1 is R1, and the curvature radius of the image-side surface of the second lens element E2 is R4, the following condition is satisfied: (R1−R4)/(R1+R4)=1.44.

When the axial distance between the object-side surface of the first lens element E1 and the image-side surface of the third lens element E3 is TD, and an axial distance between the second lens element E2 and the third lens element E3 is T23, the following condition is satisfied: TD/T23=39.48. In this embodiment, an axial distance between two adjacent lens elements is a distance in a paraxial region between two adjacent lens surfaces of the two adjacent lens elements.

When a central thickness of the first lens element E1 is CT1, and a central thickness of the second lens element E2 is CT2, the following condition is satisfied: CT1/CT2=1.94.

When the axial distance between the second lens element E2 and the third lens element E3 is T23, and a central thickness of the third lens element E3 is CT3, the following condition is satisfied: 10×T23/CT3=0.79.

When the central thickness of the first lens element E1 is CT1, the central thickness of the third lens element E3 is CT3, and an axial distance between the first lens element E1 and the second lens element E2 is T12, the following condition is satisfied: (CT1+T12)/CT3=1.62.

When an Abbe number of the first lens element E1 at the wavelength of helium d-line is V1d, an Abbe number of the second lens element E2 at the wavelength of helium d-line is V2d, and an Abbe number the third lens element E3 at the wavelength of helium d-line is V3d, the following condition is satisfied: V1d+V2d+V3d=64.3.

When the Abbe number of the first lens element E1 at the wavelength of helium d-line is V1d, the Abbe number of the second lens element E2 at the wavelength of helium d-line is V2d, a refractive index of the first lens element E1 at the wavelength of helium d-line is N1d, and a refractive index of the second lens element E2 at the wavelength of helium d-line is N2d, the following condition is satisfied: V1d/N1d+V2d/N2d=24.6.

When the Abbe number of the first lens element E1 at the wavelength of helium d-line is V1d, the Abbe number the third lens element E3 at the wavelength of helium d-line is V3d, the refractive index of the first lens element E1 at the wavelength of helium d-line is N1d, and a refractive index of the third lens element E3 at the wavelength of helium d-line is N3d, the following condition is satisfied: V1d/N1d+V3d/N3d=26.6.

When a maximum value among refractive indexes of all lens elements of the imaging lens assembly at the wavelength of helium d-line is Nmaxd, the following condition is satisfied: Nmaxd=1.660. In this embodiment, among the first lens element E1 through the third lens element E3, the refractive index of the first lens element E1 at the wavelength of helium d-line and the refractive index of the second lens element E2 at the wavelength of helium d-line are equal and larger than the refractive index of the third lens element E3 at the wavelength of helium d-line, and Nmaxd equals to the refractive index of the first lens element E1 at the wavelength of helium d-line and the refractive index of the second lens element E2 at the wavelength of helium d-line.

When a chief ray angle of the maximum field of view on the image surface IMG of the imaging lens assembly is CRA, the following condition is satisfied: tan(CRA)=0.25.

When a maximum effective radius of the object-side surface of the first lens element E1 is Y1R1, and a maximum effective radius of the image-side surface of the third lens element E3 is Y3R2, the following condition is satisfied: Y3R2/Y1R1=1.54.

When a displacement in parallel with the optical axis from an axial vertex of the image-side surface of the first lens element E1 to a maximum effective radius position of the image-side surface of the first lens element E1 is SAG1R2, and the central thickness of the first lens element E1 is CT1, the following condition is satisfied: SAG1R2/CT1=−0.18. In this embodiment, the direction of SAG1R2 faces towards the object side of the imaging lens assembly, and the value of SAG1R2 is negative.

When a displacement in parallel with the optical axis from an axial vertex of the image-side surface of the second lens element E2 to a maximum effective radius position of the image-side surface of the second lens element E2 is SAG2R2, and the central thickness of the second lens element E2 is CT2, the following condition is satisfied: SAG2R2/CT2=−1.13. In this embodiment, the direction of SAG2R2 faces towards the object side of the imaging lens assembly, and the value of SAG1R2 is negative.

When the central thickness of the first lens element E1 is CT1, and a distance in parallel with the optical axis between a maximum effective radius position of the object-side surface of the first lens element E1 and the maximum effective radius position of the image-side surface of the first lens element E1 is ET 1, the following condition is satisfied: CT1/ET1=1.82.

When a distance in parallel with the optical axis between a maximum effective radius position of the object-side surface of the third lens element E3 and a maximum effective radius position of the image-side surface of the third lens element E3 is ET3, and the central thickness of the third lens element E3 is CT3, the following condition is satisfied: ET3/CT3=0.69.

The detailed optical data of the 1st embodiment are shown in Table 1A and the aspheric surface data are shown in Table 1B below.

TABLE 1A

1st Embodiment f = 1.11 mm, Fno = 1.43, HFOV = 30.0 deg.

| Surface # | | Curvature Radius | Thickness | Material | Index 940 nm | Index d-line | Abbe # | Focal Length 940 nm | Focal Length d-line |
|---|---|---|---|---|---|---|---|---|---|
| 0 | Object | Plano | Infinity | | | | | | |
| 1 | Ape. Stop | Plano | −0.056 | | | | | | |
| 2 | Lens 1 | 0.7975 (ASP) | 0.311 | Plastic | 1.634 | 1.660 | 20.4 | 1.27 | 1.22 |
| 3 | | 103.5225 (ASP) | 0.094 | | | | | | |
| 4 | Stop | Plano | 0.234 | | | | | | |
| 5 | Lens 2 | −0.2495 (ASP) | 0.160 | Plastic | 1.634 | 1.660 | 20.4 | 0.34 | 0.33 |
| 6 | | −0.1451 (ASP) | 0.031 | | | | | | |
| 7 | Lens 3 | −0.2816 (ASP) | 0.394 | Plastic | 1.616 | 1.639 | 23.5 | −0.48 | −0.46 |
| 8 | | −10.2137 (ASP) | 0.090 | | | | | | |
| 9 | Filter | Plano | 0.150 | Glass | 1.508 | 1.517 | 64.2 | — | — |
| 10 | | Plano | 0.226 | | | | | | |
| 11 | Image | Plano | — | | | | | | |

Note:

Reference wavelength is 940 nm.

An effective radius of the stop S1 (Surface 4) is 0.420 mm.

When reference wavelength is 587.6 nm (d-line), fd = 1.06 mm, TLd = 1.64 mm, BLd = 0.42 mm, and HFOVd = 30.7 degrees.

TABLE 1B

Aspheric Coefficients

| Surface # | 2 | 3 | 5 |
|---|---|---|---|
| k= | −1.2763200E+00 | 0.0000000E+00 | −1.0821600E+00 |
| A4= | −3.4143799E−02 | −5.4555502E−01 | −1.8386827E+01 |
| A6= | 3.1877358E+00 | −2.2268547E+01 | 7.8528843E+02 |
| A8= | −1.1170837E+02 | 4.5600249E+02 | −1.6355629E+04 |
| A10= | 1.1354586E+03 | −6.1688774E+03 | 2.2873742E+05 |
| A12= | −6.1913631E+03 | 4.5018103E+04 | −2.1144982E+06 |
| A14= | 1.2050764E+04 | −1.6726253E+05 | 1.2637684E+07 |
| A16= | — | 2.4954892E+05 | −4.6889255E+07 |
| A18= | — | — | 9.8189215E+07 |
| A20= | — | — | −8.8678313E+07 |

| Surface # | 6 | 7 | 8 |
|---|---|---|---|
| k= | −3.5960300E+00 | −1.6904700E+01 | 0.0000000E+00 |
| A4= | −2.0437147E+01 | 3.3291869E+01 | 5.2566232E−01 |
| A6= | 5.6783908E+02 | −1.0403513E+03 | −1.4349075E+01 |
| A8= | −1.0153746E+04 | 2.4715061E+04 | −1.5612009E+02 |
| A10= | 1.3004677E+05 | −4.4360356E+05 | 9.2605791E+03 |
| A12= | −1.1329188E+06 | 5.8606329E+06 | −1.6097930E+05 |
| A14= | 6.6200745E+06 | −5.6603299E+07 | 1.6124264E+06 |
| A16= | −2.5042119E+07 | 4.0004043E+08 | −1.0624055E+07 |
| A18= | 5.5622213E+07 | −2.0692474E+09 | 4.8419828E+07 |
| A20= | −5.5016180E+07 | 7.7925169E+09 | −1.5550192E+08 |
| A22= | — | −2.1059928E+10 | 3.5129371E+08 |
| A24= | — | 3.9690190E+10 | −5.4630021E+08 |
| A26= | — | −4.9423273E+10 | 5.5633573E+08 |
| A28= | — | 3.6483741E+10 | −3.3361278E+08 |
| A30= | — | −1.2073867E+10 | 8.9182656E+07 |

In Table 1A, the curvature radius, the thickness and the focal length are shown in millimeters (mm). Surface numbers 0-11 represent the surfaces sequentially arranged from the object side to the image side along the optical axis. In Table 1B, k represents the conic coefficient of the equation of the aspheric surface profiles. A4-A30 represent the aspheric coefficients ranging from the 4th order to the 30th order. The tables presented below for each embodiment are the corresponding schematic parameter and aberration curves, and the definitions of the tables are the same as Table 1A and Table 1B of the 1st embodiment.

Figure 3:
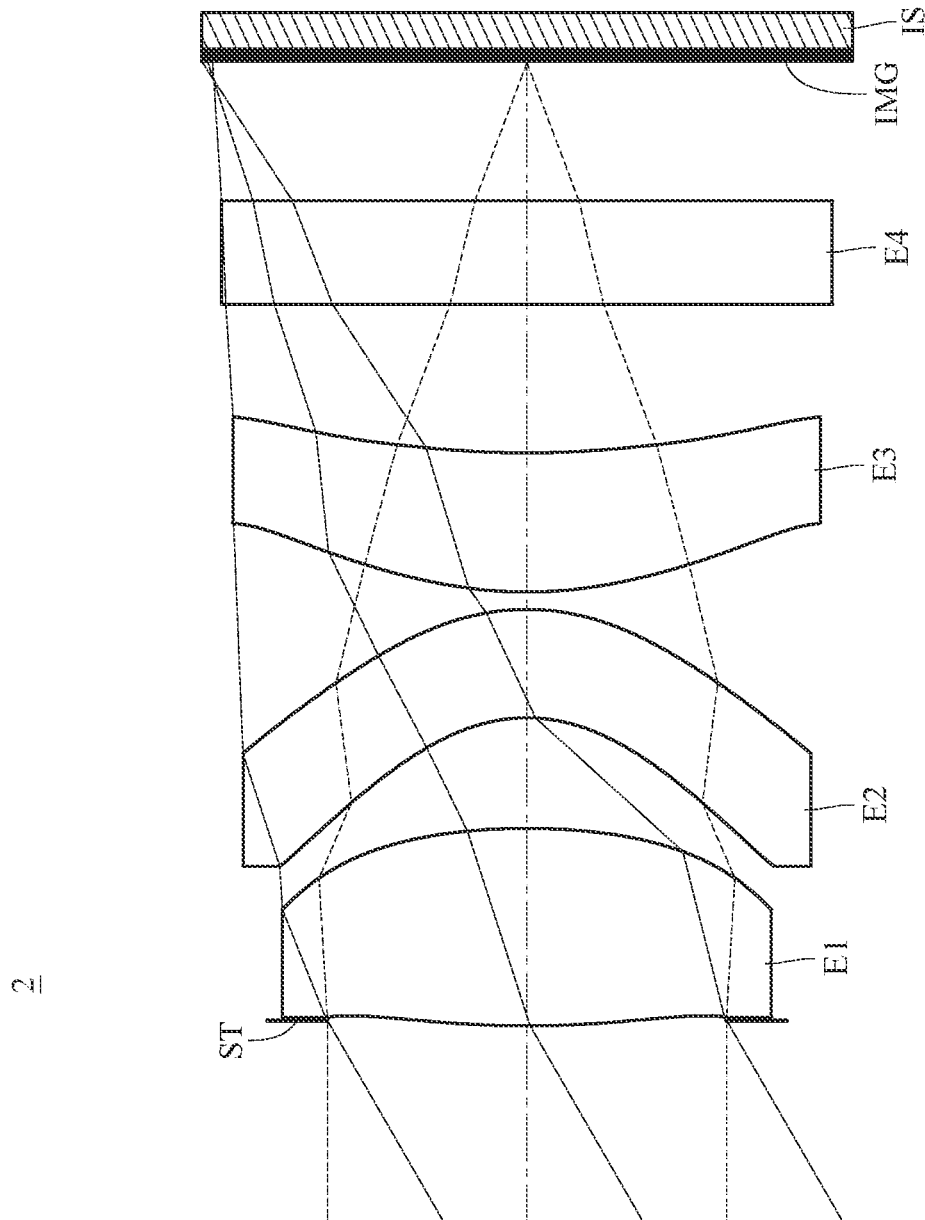
FIG. 3 is a schematic view of an image capturing unit according to the 2nd embodiment of the present disclosure.
Figure 4:
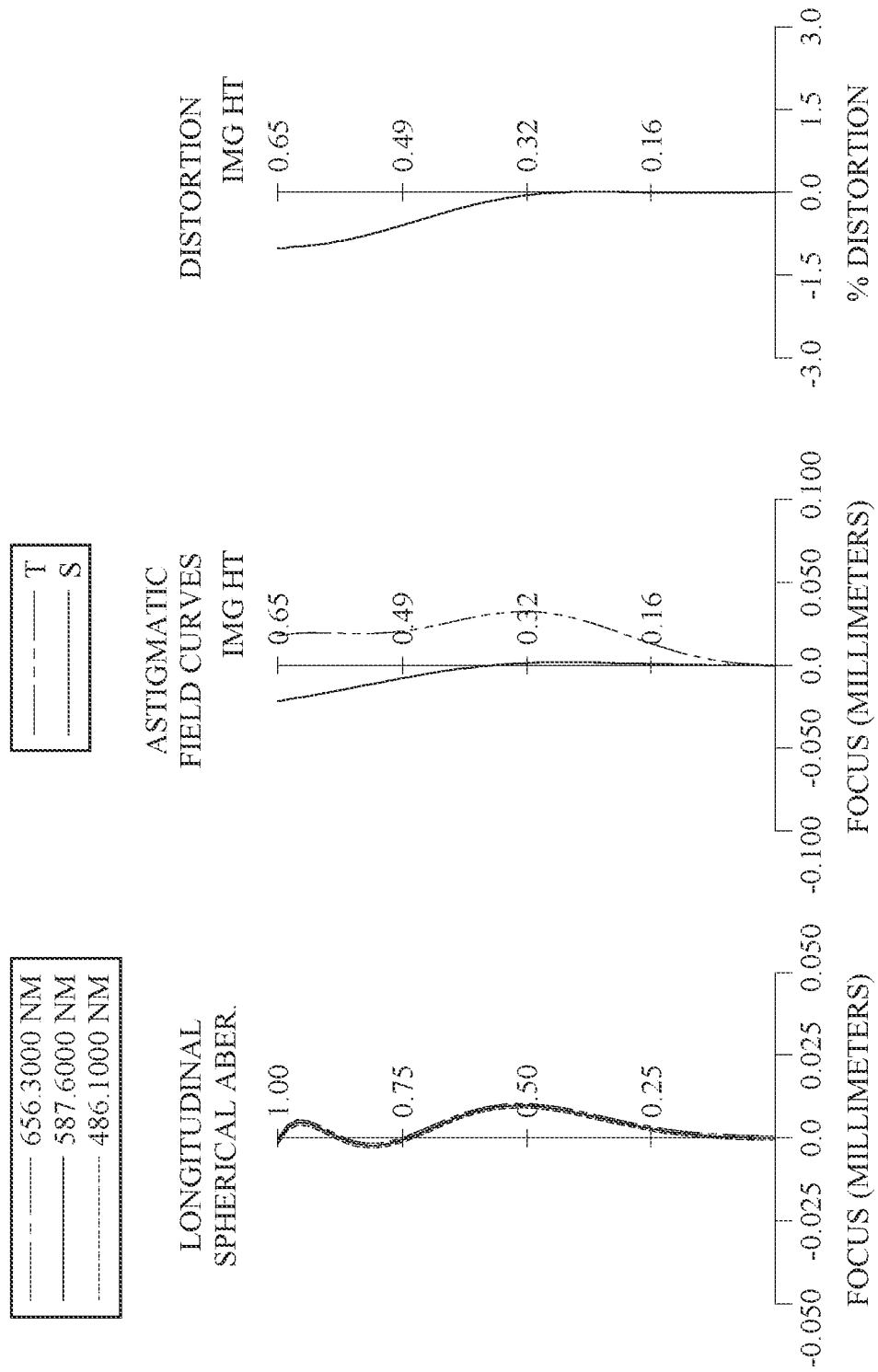
FIG. 4 shows spherical aberration curves, astigmatic field curves and a distortion curve of the image capturing unit according to the 2nd embodiment.

Therefore, an explanation in this regard will not be provided again. 2nd Embodiment FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit 2 includes the imaging lens assembly (its reference numeral is omitted) of the present disclosure and an image sensor IS. The imaging lens assembly includes, in order from an object side to an image side along an optical axis, an aperture stop ST, a first lens element E1, a second lens element E2, a third lens element E3, a filter E4 and an image surface IMG. The imaging lens assembly includes three single and non-cemented lens elements (E1, E2 and E3) with no additional lens element disposed between each of the adjacent three lens elements. In addition, there is an air gap in a paraxial region between each of all adjacent lens elements among the first lens element E1 through the third lens element E3.

The first lens element E1 with positive refractive power has an object-side surface being convex in a paraxial region thereof and an image-side surface being convex in a paraxial region thereof. The first lens element E1 is made of plastic material and has the object-side surface and the image-side surface being both aspheric. The object-side surface of the first lens element E1 has one inflection point. The object-side surface of the first lens element E1 has one critical point in an off-axis region thereof.

The second lens element E2 with negative refractive power has an object-side surface being concave in a paraxial region thereof and an image-side surface being convex in a paraxial region thereof. The second lens element E2 is made of plastic material and has the object-side surface and the image-side surface being both aspheric. The object-side surface of the second lens element E2 has one inflection point.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has one inflection point. The image-side surface of the third lens element E3 has one inflection point.

The filter E4 is made of glass material and located between the third lens element E3 and the image surface IMG, and will not affect the focal length of the imaging lens assembly. The image sensor IS is disposed on or near the image surface IMG of the imaging lens assembly.

The detailed optical data of the 2nd embodiment are shown in Table 2A and the aspheric surface data are shown in Table 2B below.

TABLE 2A

2nd Embodiment
f = 1.13 mm, Fno = 1.40, HFOV = 30.0 deg.

| Surface # | | Curvature Radius | Thickness | Material | Index | | Abbe # | Focal Length | |
|---|---|---|---|---|---|---|---|---|---|
| | | | | | 940 nm | d-line | | 940 nm | d-line |
| 0 | Object | Plano | Infinity | | | | | | |
| 1 | Ape. Stop | Plano | −0.011 | | | | | | |
| 2 | Lens 1 | 1.9481 (ASP) | 0.401 | Plastic | 1.641 | 1.669 | 19.5 | 1.31 | 1.25 |
| 3 | | −1.3494 (ASP) | 0.225 | | | | | | |
| 4 | Lens 2 | −0.3266 (ASP) | 0.220 | Plastic | 1.641 | 1.669 | 19.5 | −4.40 | −4.40 |
| 5 | | −0.4665 (ASP) | 0.035 | | | | | | |
| 6 | Lens 3 | 0.8306 (ASP) | 0.283 | Plastic | 1.641 | 1.669 | 19.5 | 2.06 | 1.97 |
| 7 | | 1.9397 (ASP) | 0.302 | | | | | | |
| 8 | Filter | Plano | 0.210 | Glass | 1.508 | 1.517 | 64.2 | — | — |
| 9 | | Plano | 0.284 | | | | | | |
| 10 | Image | Plano | — | | | | | | |

Note:
Reference wavelength is 940 nm.
When reference wavelength is 587.6 nm (d-line), fd = 1.08 mm, TLd = 1.91 mm, BLd = 0.75 mm, and HFOVd = 31.0 degrees.

TABLE 2B

Aspheric Coefficients

| Surface # | 2 | 3 | 4 |
|---|---|---|---|
| k= | −3.3102700E+00 | −1.3564900E+00 | −1.0000000E+00 |
| A4= | −3.2327996E−01 | −8.8511616E−01 | 9.4953085E−01 |
| A6= | −5.7182939E+00 | −1.3168453E+00 | 8.0849988E+00 |
| A8= | 5.6811235E+01 | 8.8396106E−01 | −6.0672033E+01 |
| A10= | −3.6011167E+02 | −4.0705184E+00 | 1.6850588E+02 |
| A12= | 6.0838131E+02 | −2.3614401E+01 | −1.0253170E+02 |
| A14= | — | 7.8752194E+01 | −1.0177740E+02 |

| Surface # | 5 | 6 | 7 |
|---|---|---|---|
| k= | −1.0000000E+00 | −1.7966400E+00 | −2.6451500E+00 |
| A4= | −3.1281972E−01 | −1.2499733E+00 | −4.4732275E−01 |
| A6= | 1.1050942E+01 | 9.8977054E+00 | 1.9653659E+00 |
| A8= | −5.4024076E+01 | −4.9284228E+01 | 3.7819351E+00 |
| A10= | 1.3740674E+02 | 1.4883313E+02 | −3.9237790E+01 |
| A12= | −1.9154647E+02 | −2.7916850E+02 | 7.2859008E+01 |
| A14= | 1.1652053E+02 | 2.5406162E+02 | −4.5931253E+01 |
| A16= | — | −7.6479636E+01 | 4.9181635E+00 |

In the 2nd embodiment, the equation of the aspheric surface profiles of the aforementioned lens elements is the same as the equation of the 1st embodiment. Also, the definitions of these parameters shown in Table 2C below are the same as those stated in the 1st embodiment with corresponding values for the 2nd embodiment, so an explanation in this regard will not be provided again.

Moreover, these parameters can be calculated from Table 2A and Table 2B as the following values and satisfy the following conditions:

TABLE 2C

Values of Conditional Expressions

| f [mm] | 1.08 | (R1 − R3)/(R1 + R3) | 1.40 |
|---|---|---|---|
| Fno | 1.40 | (R1 − R4)/(R1 + R4) | 1.63 |
| HFOV [deg.] | 31.0 | TD/T23 | 33.26 |
| FOV [deg.] | 62.0 | CT1/CT2 | 1.82 |
| TLd [mm] | 1.91 | 10 × T23/CT3 | 1.24 |
| TLd/ImgH | 2.95 | (CT1 + T12)/CT3 | 2.21 |
| tan(HFOVd) | 0.60 | V1d + V2d + V3d | 58.4 |
| FOVd/Fno [deg.] | 44.3 | V1d/N1d + V2d/N2d | 23.3 |
| Fno × FOVd [deg.] | 86.8 | V1d/N1d + V3d/N3d | 23.3 |
| TLd/EPDd | 2.47 | Nmaxd | 1.669 |
| BLd/EPDd | 0.97 | tan(CRA) | 0.32 |
| SLd/TD | 1.63 | Y3R2/Y1R1 | 1.46 |
| fd/f1d | 0.87 | SAG1R2/CT1 | −0.41 |
| f12d/f1d | 1.66 | SAG2R2/CT2 | −1.33 |
| |f23d/f12d| | 1.17 | CT1/ET1 | 1.83 |
| fd/R4 | −2.33 | ET3/CT3 | 0.77 |
| |fd/R3| + |SLd/R3| | 9.15 | — | — |

3rd Embodiment

Figure 5:
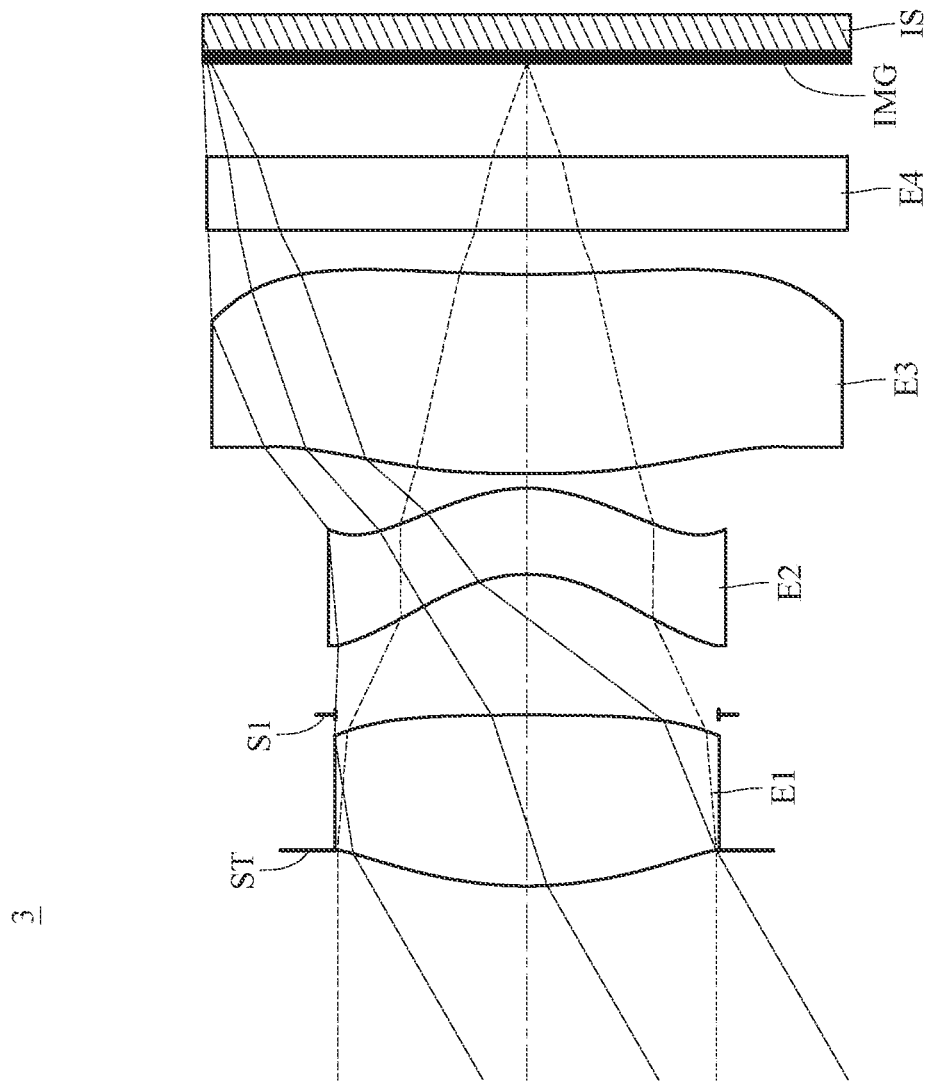
FIG. 5 is a schematic view of an image capturing unit according to the 3rd embodiment of the present disclosure.
Figure 6:
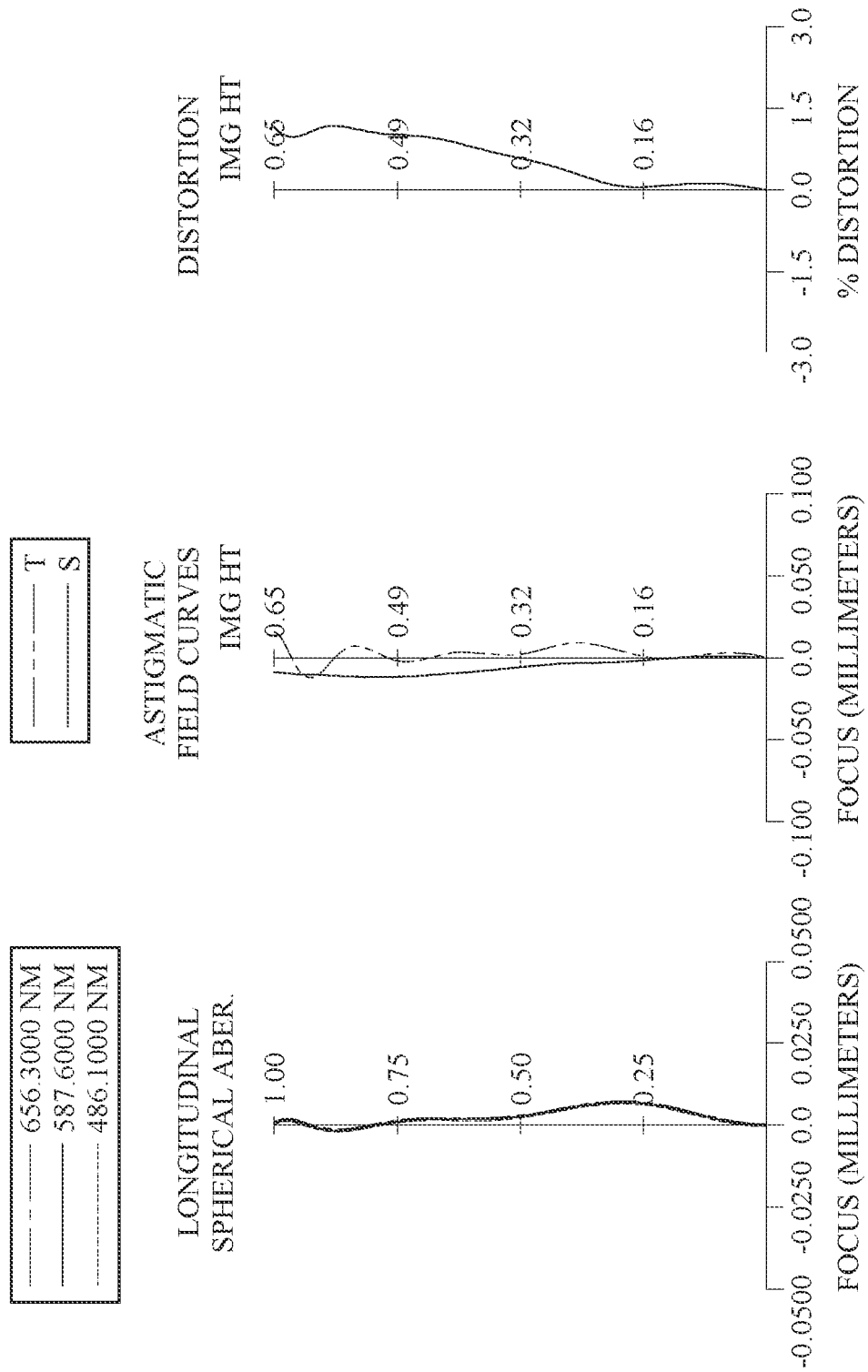
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit 3 includes the imaging lens assembly (its reference numeral is omitted) of the present disclosure and an image sensor IS. The imaging lens assembly includes, in order from an object side to an image side along an optical axis, an aperture stop ST, a first lens element E1, a stop S1, a second lens element E2, a third lens element E3, a filter E4 and an image surface IMG. The imaging lens assembly includes three single and non-cemented lens elements (E1, E2 and E3) with no additional lens element disposed between each of the adjacent three lens elements. In addition, there is an air gap in a paraxial region between each of all adjacent lens elements among the first lens element E1 through the third lens element E3.

The first lens element E1 with positive refractive power has an object-side surface being convex in a paraxial region thereof and an image-side surface being convex in a paraxial region thereof. The first lens element E1 is made of glass material and has the object-side surface and the image-side surface being both aspheric. The object-side surface of the first lens element E1 has one inflection point.

The second lens element E2 with positive refractive power has an object-side surface being concave in a paraxial region thereof and an image-side surface being convex in a paraxial region thereof. The second lens element E2 is made of glass material and has the object-side surface and the image-side surface being both aspheric. The object-side surface of the second lens element E2 has one inflection point. The image-side surface of the second lens element E2 has one inflection point. The image-side surface of the second lens element E2 has one critical point in an off-axis region thereof.

The third lens element E3 with negative refractive power has an object-side surface being concave in a paraxial region thereof and an image-side surface being concave in a paraxial region thereof. The third lens element E3 is made of glass material and has the object-side surface and the image-side surface being both aspheric. The object-side surface of the third lens element E3 has two inflection points. The image-side surface of the third lens element E3 has one inflection point. The object-side surface of the third lens element E3 has two critical points in an off-axis region thereof. The image-side surface of the third lens element E3 has one critical point in an off-axis region thereof.

The filter E4 is made of glass material and located between the third lens element E3 and the image surface IMG, and will not affect the focal length of the imaging lens assembly. The image sensor IS is disposed on or near the image surface IMG of the imaging lens assembly.

The detailed optical data of the 3rd embodiment are shown in Table 3A and the aspheric surface data are shown in Table 3B below.

TABLE 3A

3rd Embodiment
f = 1.11 mm, Fno = 1.45, HFOV = 29.9 deg.

| | | | | | Index | | | Focal Length | |
|---|---|---|---|---|---|---|---|---|---|
| Surface # | | Curvature Radius | Thickness | Material | 940 nm | d-line | Abbe # | 940 nm | d-line |
| 0 | Object | Plano | Infinity | | | | | | |
| 1 | Ape. Stop | Plano | −0.072 | | | | | | |
| 2 | Lens 1 | 0.8440 (ASP) | 0.347 | Glass | 1.730 | 1.749 | 35.0 | 1.08 | 1.05 |

TABLE 3A-continued

3rd Embodiment
f = 1.11 mm, Fno = 1.45, HFOV = 29.9 deg.

| Surface # | | Curvature Radius | Thickness | Material | Index 940 nm | Index d-line | Abbe # | Focal Length 940 nm | Focal Length d-line |
|---|---|---|---|---|---|---|---|---|---|
| 3 | | −9.2959 (ASP) | 0.001 | | | | | | |
| 4 | Stop | Plano | 0.285 | | | | | | |
| 5 | Lens 2 | −0.3006 (ASP) | 0.175 | Glass | 1.731 | 1.755 | 27.5 | 1.67 | 1.59 |
| 6 | | −0.3006 (ASP) | 0.030 | | | | | | |
| 7 | Lens 3 | −12.8775 (ASP) | 0.404 | Glass | 1.731 | 1.755 | 27.5 | −2.66 | −2.57 |
| 8 | | 2.3203 (ASP) | 0.090 | | | | | | |
| 9 | Filter | Plano | 0.150 | Glass | 1.508 | 1.517 | 64.2 | — | — |
| 10 | | Plano | 0.190 | | | | | | |
| 11 | Image | Plano | — | | | | | | |

Note:
Reference wavelength is 940 nm.
An effective radius of the stop S1 (Surface 4) is 0.388 mm.
When reference wavelength is 587.6 nm (d-line), fd = 1.08 mm, TLd = 1.65 mm, BLd = 0.40 mm, and HFOVd = 30.2 degrees.

TABLE 3B

Aspheric Coefficients

| Surface # | 2 | 3 | 5 |
|---|---|---|---|
| k= | −2.0332100E+00 | 8.8455800E+01 | −1.1334100E+00 |
| A4= | −1.4392069E−01 | −9.0227566E−01 | 2.0121702E+00 |
| A6= | 6.2617572E+00 | −1.2207659E+01 | 7.5644345E+01 |
| A8= | −1.5870876E+02 | 2.4675306E+02 | −1.8614517E+03 |
| A10= | 1.4347317E+03 | −3.5460662E+03 | 3.3824066E+04 |
| A12= | −6.7700639E+03 | 2.8500729E+04 | −4.0546961E+05 |
| A14= | 1.1614282E+04 | −1.1868191E+05 | 3.0656312E+06 |
| A16= | — | 1.9966363E+05 | −1.4119786E+07 |
| A18= | — | — | 3.6143596E+07 |
| A20= | — | — | −3.9168557E+07 |

| Surface # | 6 | 7 | 8 |
|---|---|---|---|
| k= | −6.7939000E+00 | 3.1073400E+01 | 1.3557000E+00 |
| A4= | −5.6421060E+00 | 1.8633041E+01 | −1.9249635E+00 |
| A6= | 1.0391739E+02 | −6.6698217E+02 | 1.8697957E+01 |
| A8= | −1.2284406E+03 | 1.7580183E+04 | −2.5493667E+02 |
| A10= | 1.8136281E+04 | −3.3870532E+05 | 2.8080557E+03 |
| A12= | −2.1663610E+05 | 4.7330303E+06 | −2.3520780E+04 |
| A14= | 1.7466114E+06 | −4.8150367E+07 | 1.4136009E+05 |
| A16= | −8.7410068E+06 | 3.5837464E+08 | −5.9306241E+05 |
| A18= | 2.4443506E+07 | −1.9542204E+09 | 1.7046691E+06 |
| A20= | −2.9108666E+07 | 7.7694464E+09 | −3.2734680E+06 |
| A22= | — | −2.2204465E+10 | 4.0032306E+06 |
| A24= | — | 4.4336418E+10 | −2.8146500E+06 |
| A26= | — | −5.8618650E+10 | 8.6495814E+05 |
| A28= | — | 4.6052705E+10 | — |
| A30= | — | −1.6260163E+10 | — |

In the 3rd embodiment, the equation of the aspheric surface profiles of the aforementioned lens elements is the same as the equation of the 1 st embodiment. Also, the definitions of these parameters shown in Table 3C below are the same as those stated in the 1st embodiment with corresponding values for the 3rd embodiment, so an explanation in this regard will not be provided again.

Moreover, these parameters can be calculated from Table 3A and Table 3B as the following values and satisfy the following conditions:

TABLE 3C

Values of Conditional Expressions

| f [mm] | 1.08 | (R1 − R3)/(R1 + R3) | 2.11 |
|---|---|---|---|
| Fno | 1.45 | (R1 − R4)/(R1 + R4) | 2.11 |

TABLE 3C-continued

Values of Conditional Expressions

| HFOV [deg.] | 30.2 | TD/T23 | 41.40 |
|---|---|---|---|
| FOV [deg.] | 60.4 | CT1/CT2 | 1.98 |
| TLd [mm] | 1.65 | 10 × T23/CT3 | 0.74 |
| TLd/ImgH | 2.54 | (CT1 + T12)/CT3 | 1.57 |
| tan(HFOVd) | 0.58 | V1d + V2d + V3d | 90.1 |
| FOVd/Fno [deg.] | 41.7 | V1d/N1d + V2d/N2d | 35.7 |
| Fno × FOVd [deg.] | 87.6 | V1d/N1d + V3d/N3d | 35.7 |
| TLd/EPDd | 2.20 | Nmaxd | 1.755 |
| BLd/EPDd | 0.54 | tan(CRA) | 0.22 |
| SLd/TD | 1.27 | Y3R2/Y1R1 | 1.66 |
| fd/f1d | 1.03 | SAG1R2/CT1 | −0.13 |
| f12d/f1d | 0.90 | SAG2R2/CT2 | −0.48 |
| |f23d/f12d| | 5.37 | CT1/ET1 | 1.53 |
| fd/R4 | −3.60 | ET3/CT3 | 0.63 |
| |fd/R3| + |SLd/R3| | 8.84 | — | — |

4th Embodiment

Figure 7:
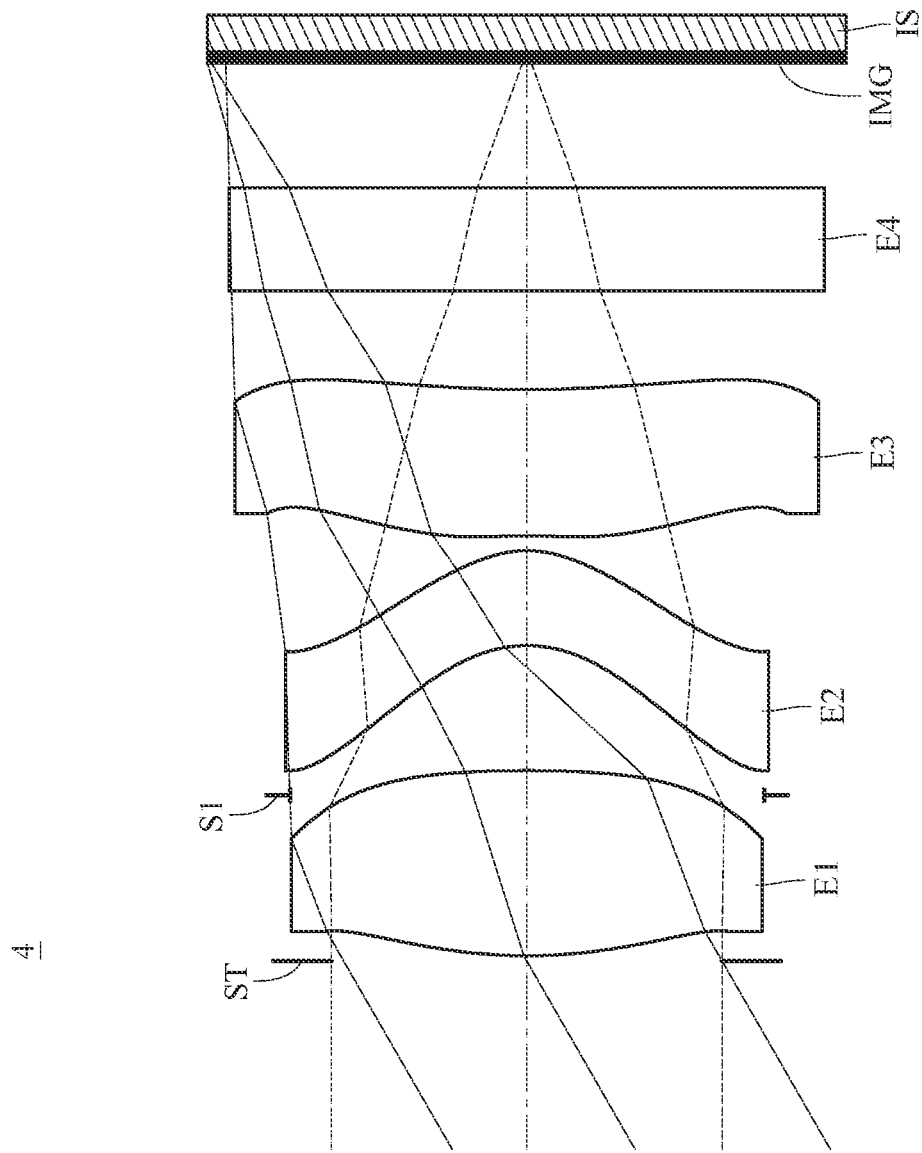
FIG. 7 is a schematic view of an image capturing unit according to the 4th embodiment of the present disclosure.
Figure 8:
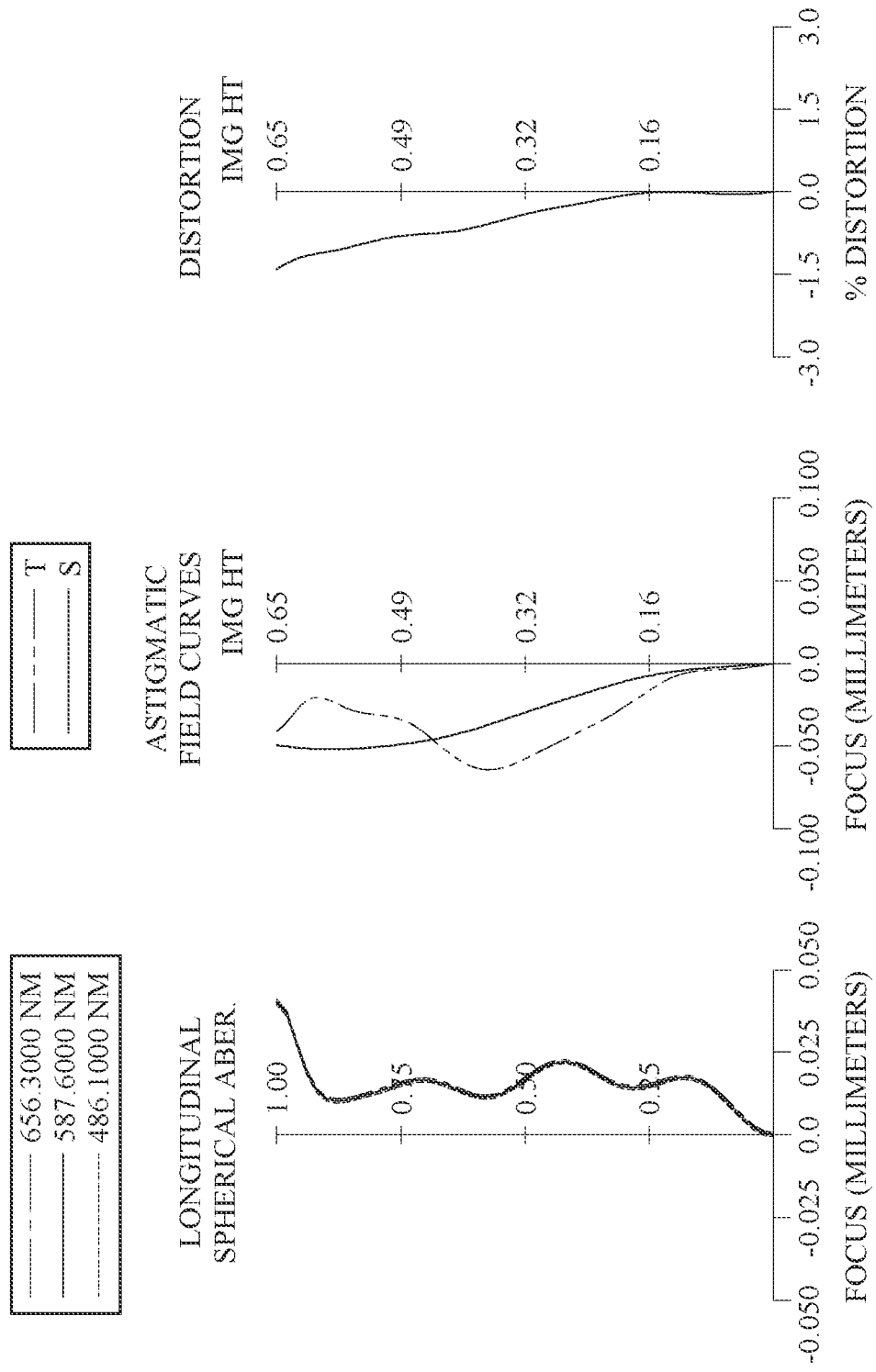
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit 4 includes the imaging lens assembly (its reference numeral is omitted) of the present disclosure and an image sensor IS. The imaging lens assembly includes, in order from an object side to an image side along an optical axis, an aperture stop ST, a first lens element E11, a stop S1, a second lens element E2, a third lens element E3, a filter E4 and an image surface IMG. The imaging lens assembly includes three single and non-cemented lens elements (E1, E2 and E3) with no additional lens element disposed between each of the adjacent three lens elements. In addition, there is an air gap in a paraxial region between each of all adjacent lens elements among the first lens element E1 through the third lens element E3.

The first lens element E1 with positive refractive power has an object-side surface being convex in a paraxial region thereof and an image-side surface being convex in a paraxial region thereof. The first lens element E1 is made of plastic material and has the object-side surface and the image-side surface being both aspheric. The object-side surface of the first lens element E1 has one inflection point. The object-side surface of the first lens element E1 has one critical point in an off-axis region thereof.

The second lens element E2 with positive refractive power has an object-side surface being concave in a paraxial region thereof and an image-side surface being convex in a paraxial region thereof. The second lens element E2 is made of plastic material and has the object-side surface and the image-side surface being both aspheric. The object-side surface of the second lens element E2 has one inflection point. The image-side surface of the second lens element E2 has one inflection point. The image-side surface of the second lens element E2 has one critical point in an off-axis region thereof.

The third lens element E3 with negative refractive power has an object-side surface being concave in a paraxial region thereof and an image-side surface being concave in a paraxial region thereof. The third lens element E3 is made of plastic material and has the object-side surface and the image-side surface being both aspheric. The object-side surface of the third lens element E3 has two inflection points. The image-side surface of the third lens element E3 has one inflection point. The object-side surface of the third lens element E3 has two critical points in an off-axis region thereof. The image-side surface of the third lens element E3 has one critical point in an off-axis region thereof.

The filter E4 is made of glass material and located between the third lens element E3 and the image surface IMG, and will not affect the focal length of the imaging lens assembly. The image sensor IS is disposed on or near the image surface IMG of the imaging lens assembly.

The detailed optical data of the 4th embodiment are shown in Table 4A and the aspheric surface data are shown in Table 4B below.

TABLE 4A

4th Embodiment
f = 1.14 mm, Fno = 1.43, HFOV = 29.9 deg.

| Surface # | | Curvature Radius | Thickness | Material | Index 940 nm | Index d-line | Abbe # | Focal Length 940 nm | Focal Length d-line |
|---|---|---|---|---|---|---|---|---|---|
| 0 | Object | Plano | Infinity | | | | | | |
| 1 | Ape. Stop | Plano | 0.011 | | | | | | |
| 2 | Lens 1 | 1.0090 (ASP) | 0.376 | Plastic | 1.634 | 1.660 | 20.4 | 1.25 | 1.20 |
| 3 | | −3.1048 (ASP) | −0.050 | | | | | | |
| 4 | Stop | Plano | 0.304 | | | | | | |
| 5 | Lens 2 | −0.2642 (ASP) | 0.193 | Plastic | 1.634 | 1.660 | 20.4 | 0.67 | 0.63 |
| 6 | | −0.2090 (ASP) | 0.030 | | | | | | |
| 7 | Lens 3 | −0.9783 (ASP) | 0.297 | Plastic | 1.634 | 1.660 | 20.4 | −1.01 | −0.97 |
| 8 | | 2.0578 (ASP) | 0.200 | | | | | | |
| 9 | Filter | Plano | 0.210 | Glass | 1.508 | 1.517 | 64.2 | — | — |
| 10 | | Plano | 0.253 | | | | | | |
| 11 | Image | Plano | — | | | | | | |

Note:
Reference wavelength is 940 nm.
An effective radius of the stop S1 (Surface 4) is 0.481 mm.
When reference wavelength is 587.6 nm (d-line), fd = 1.09 mm, TLd = 1.77 mm, BLd = 0.62 mm, and HFOVd = 30.7 degrees.

TABLE 4B

Aspheric Coefficients

| Surface # | 2 | 3 | 5 |
|---|---|---|---|
| k = | 0.0000000E+00 | 0.0000000E+00 | −1.0019400E+00 |
| A4 = | −5.9188186E+00 | −6.3911036E+00 | −8.8751264E+00 |
| A6 = | 5.5630914E+02 | 4.2565823E+02 | 7.3705064E+02 |
| A8 = | −3.2104778E+04 | −2.0603195E+04 | −2.8308073E+04 |
| A10 = | 1.1547883E+06 | 6.2459954E+05 | 7.1192783E+05 |
| A12 = | −2.7705762E+07 | −1.2716078E+07 | −1.2010122E+07 |
| A14 = | 4.6156616E+08 | 1.8103429E+08 | 1.4021001E+08 |
| A16 = | −5.4733648E+09 | −1.8471269E+09 | −1.1586979E+09 |
| A18 = | 4.6788541E+10 | 1.3672590E+10 | 6.8607840E+09 |
| A20 = | −2.8888492E+11 | −7.3492177E+10 | −2.9152167E+10 |
| A22 = | 1.2758327E+12 | 2.8369189E+11 | 8.7990819E+10 |
| A24 = | −3.9297296E+12 | −7.6548304E+11 | −1.8380863E+11 |
| A26 = | 8.0199350E+12 | 1.3690580E+12 | 2.5221285E+11 |
| A28 = | −9.7500764E+12 | −1.4564370E+12 | −2.0416265E+11 |
| A30 = | 5.3472150E+12 | 6.9681377E+11 | 7.3767735E+10 |

| Surface # | 6 | 7 | 8 |
|---|---|---|---|
| k = | −1.0207800E+00 | 0.0000000E+00 | 7.8347100E−01 |
| A4 = | 2.9018327E+01 | 3.4865655E+01 | −2.9280944E+00 |
| A6 = | −5.3626215E+02 | −8.4983421E+02 | 9.2651795E+01 |
| A8 = | 5.3404324E+03 | 1.4227262E+04 | −2.2953921E+03 |

TABLE 4B-continued

| Aspheric Coefficients | | | |
|---|---|---|---|
| A10 = | 2.4894070E+04 | −1.6623877E+05 | 3.5910887E+04 |
| A12 = | −1.6684795E+06 | 1.3685122E+06 | −3.6418915E+05 |
| A14 = | 2.7600504E+07 | −7.9841164E+06 | 2.4640923E+06 |
| A16 = | −2.7372932E+08 | 3.2929428E+07 | −1.1290156E+07 |
| A18 = | 1.8391187E+09 | −9.4760317E+07 | 3.4818118E+07 |
| A20 = | −8.6583260E+09 | 1.8491684E+08 | −6.9475865E+07 |
| A22 = | 2.8603528E+10 | −2.3178491E+08 | 7.8984439E+07 |
| A24 = | −6.4891698E+10 | 1.6737415E+08 | −2.3575220E+07 |
| A26 = | 9.6117881E+10 | −5.2632489E+07 | −5.7985683E+07 |
| A28 = | −8.3550901E+10 | — | 7.3997976E+07 |
| A30 = | 3.2268438E+10 | — | −2.7972422E+07 |

In the 4th embodiment, the equation of the aspheric surface profiles of the aforementioned lens elements is the same as the equation of the 1st embodiment. Also, the definitions of these parameters shown in Table 4C below are the same as those stated in the 1st embodiment with corresponding values for the 4th embodiment, so an explanation in this regard will not be provided again.

Moreover, these parameters can be calculated from Table 4A and Table 4B as the following values and satisfy the following conditions:

TABLE 4C

| Values of Conditional Expressions | | | |
|---|---|---|---|
| f [mm] | 1.09 | (R1 − R3)/(R1 + R3) | 1.71 |
| Fno | 1.43 | (R1 − R4)/(R1 + R4) | 1.52 |
| HFOV [deg.] | 30.7 | TD/T23 | 38.33 |
| FOV [deg.] | 61.4 | CT1/CT2 | 1.95 |
| TLd [mm] | 1.77 | 10 × T23/CT3 | 1.01 |
| TLd/ImgH | 2.73 | (CT1 + T12)/CT3 | 2.12 |
| tan(HFOVd) | 0.59 | V1d + V2d + V3d | 61.2 |
| FOVd/Fno [deg.] | 42.9 | V1d/N1d + V2d/N2d | 24.6 |
| Fno × FOVd [deg.] | 87.8 | V1d/N1d + V3d/N3d | 24.6 |
| TLd/EPDd | 2.33 | Nmaxd | 1.660 |
| BLd/EPDd | 0.82 | tan(CRA) | 0.29 |
| SLd/TD | 1.55 | Y3R2/Y1R1 | 1.41 |
| fd/f1d | 0.91 | SAG1R2/CT1 | −0.38 |
| f12d/f1d | 0.54 | SAG2R2/CT2 | −1.06 |
| |f23d/f12d| | 4.03 | CT1/ET1 | 2.04 |
| fd/R4 | −5.20 | ET3/CT3 | 0.77 |
| |fd/R3| + |SLd/R3| | 10.85 | — | — |

5th Embodiment

Figure 9:
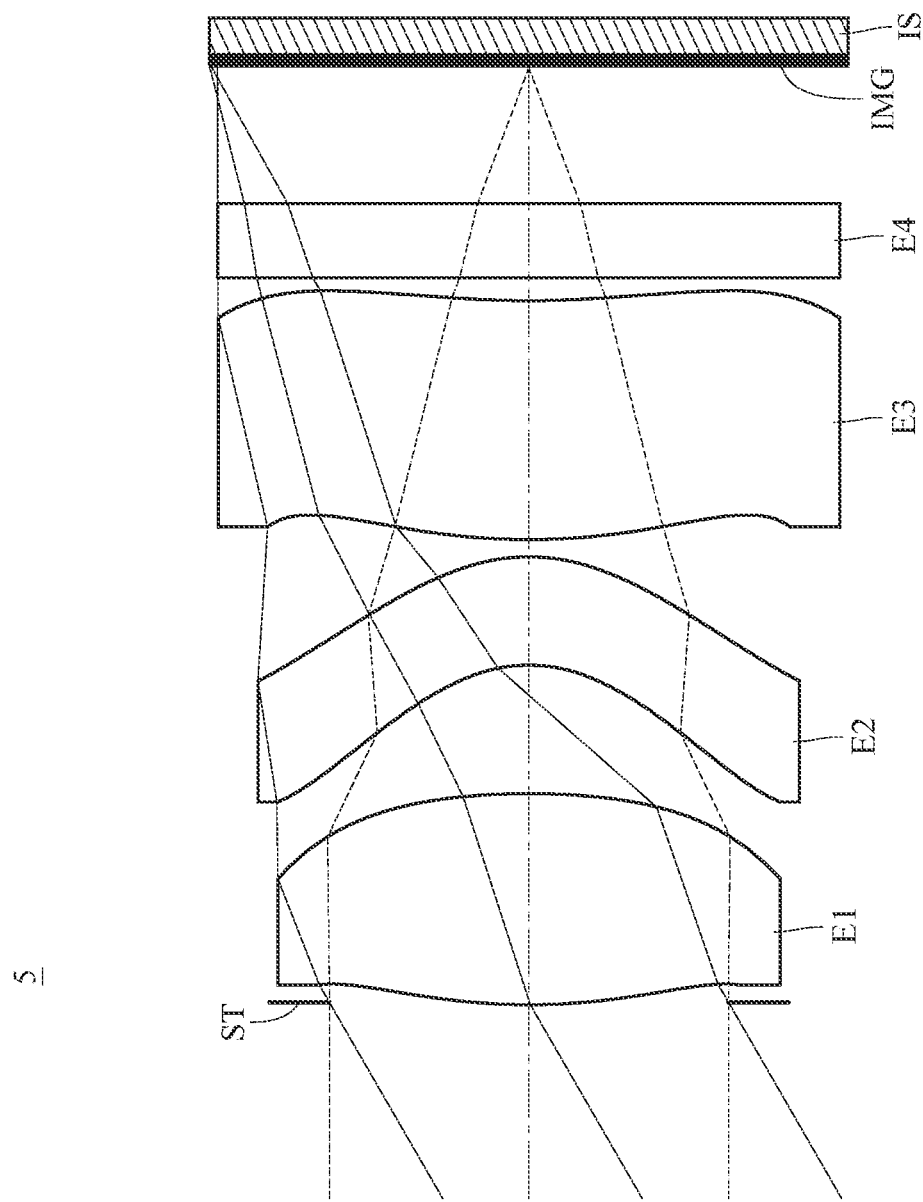
FIG. 9 is a schematic view of an image capturing unit according to the 5th embodiment of the present disclosure.
Figure 10:
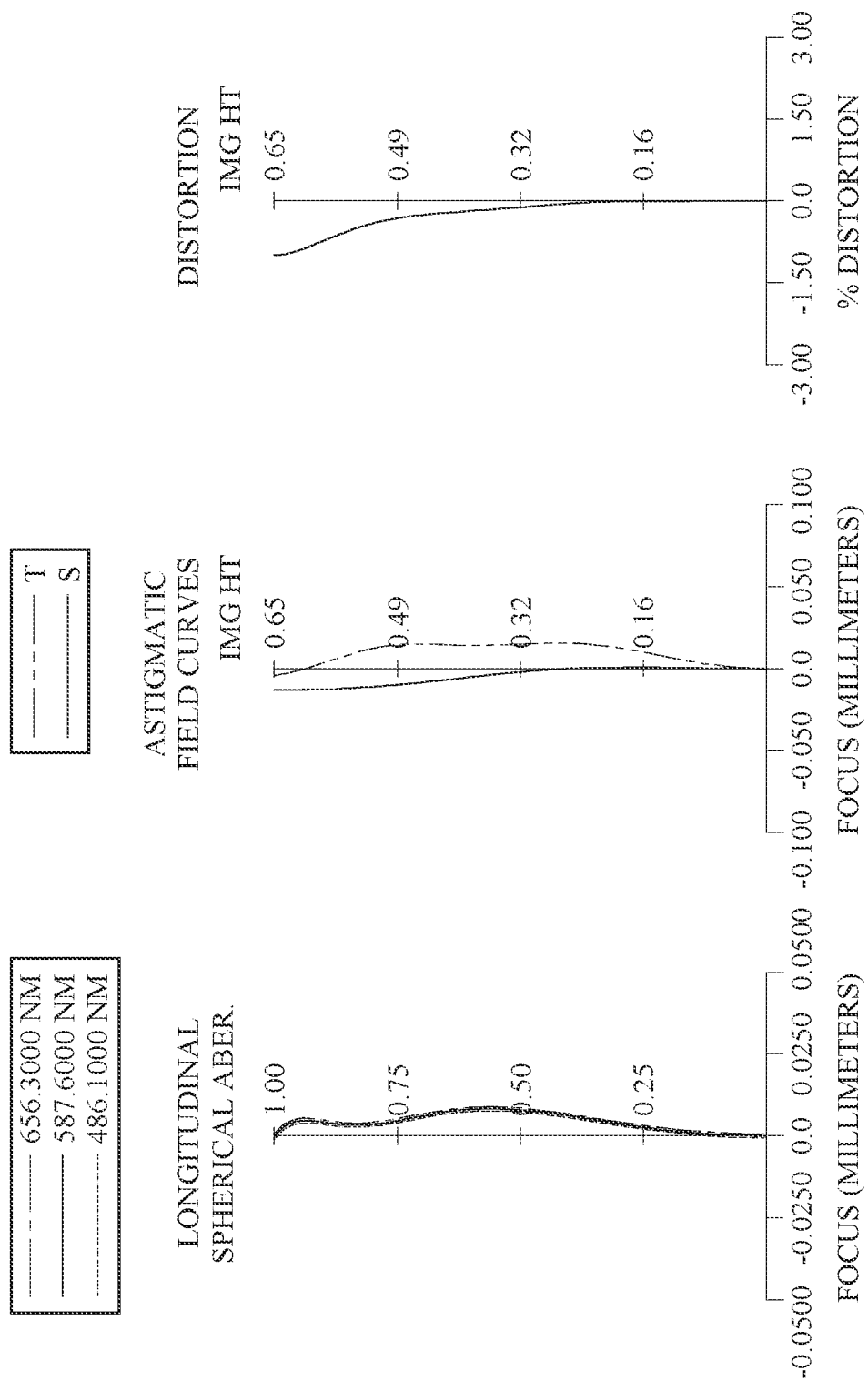
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit 5 includes the imaging lens assembly (its reference numeral is omitted) of the present disclosure and an image sensor IS. The imaging lens assembly includes, in order from an object side to an image side along an optical axis, an aperture stop ST, a first lens element E1, a second lens element E2, a third lens element E3, a filter E4 and an image surface IMG. The imaging lens assembly includes three single and non-cemented lens elements (E1, E2 and E3) with no additional lens element disposed between each of the adjacent three lens elements. In addition, there is an air gap in a paraxial region between each of all adjacent lens elements among the first lens element E1 through the third lens element E3.

The first lens element E1 with positive refractive power has an object-side surface being convex in a paraxial region thereof and an image-side surface being convex in a paraxial region thereof. The first lens element E1 is made of plastic material and has the object-side surface and the image-side surface being both aspheric. The object-side surface of the first lens element E1 has one inflection point. The object-side surface of the first lens element E1 has one critical point in an off-axis region thereof.

The second lens element E2 with positive refractive power has an object-side surface being concave in a paraxial region thereof and an image-side surface being convex in a paraxial region thereof. The second lens element E2 is made of plastic material and has the object-side surface and the image-side surface being both aspheric. The object-side surface of the second lens element E2 has one inflection point. The image-side surface of the second lens element E2 has one inflection point.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has one inflection point. The image-side surface of the third lens element E3 has one inflection point. The object-side surface of the third lens element E3 has one critical point in an off-axis region thereof. The image-side surface of the third lens element E3 has one critical point in an off-axis region thereof.

The filter E4 is made of glass material and located between the third lens element E3 and the image surface IMG, and will not affect the focal length of the imaging lens assembly. The image sensor IS is disposed on or near the image surface IMG of the imaging lens assembly.

The detailed optical data of the 5th embodiment are shown in Table 5A and the aspheric surface data are shown in Table 5B below.

TABLE 5A

5th Embodiment
f = 1.13 mm, Fno = 1.40, HFOV = 30.0 deg.

| Surface # | | Curvature Radius | Thickness | Material | Index | | | Focal Length | |
|---|---|---|---|---|---|---|---|---|---|
| | | | | | 940 nm | d-line | Abbe # | 940 nm | d-line |
| 0 | Object | Plano | Infinity | | | | | | |
| 1 | Ape. Stop | Plano | −0.005 | | | | | | |
| 2 | Lens 1 | 1.2542 (ASP) | 0.429 | Plastic | 1.634 | 1.660 | 20.4 | 1.14 | 1.10 |
| 3 | | −1.4775 (ASP) | 0.261 | | | | | | |
| 4 | Lens 2 | −0.3032 (ASP) | 0.220 | Plastic | 1.634 | 1.660 | 20.4 | 37.68 | 25.30 |
| 5 | | −0.3837 (ASP) | 0.035 | | | | | | |
| 6 | Lens 3 | 1.3430 (ASP) | 0.485 | Plastic | 1.634 | 1.660 | 20.4 | 6.30 | 6.01 |

TABLE 5A-continued

5th Embodiment
f = 1.13 mm, Fno = 1.40, HFOV = 30.0 deg.

| Surface # | | Curvature Radius | Thickness | Material | Index 940 nm | d-line | Abbe # | Focal Length 940 nm | d-line |
|---|---|---|---|---|---|---|---|---|---|
| 7 | | 1.7397 (ASP) | 0.047 | | | | | | |
| 8 | Filter | Plano | 0.150 | Glass | 1.508 | 1.517 | 64.2 | — | — |
| 9 | | Plano | 0.280 | | | | | | |
| 10 | Image | Plano | — | | | | | | |

Note:
Reference wavelength is 940 nm.
When reference wavelength is 587.6 nm (d-line), fd = 1.09 mm, TLd = 1.87 mm, BLd = 0.44 mm, and HFOVd = 30.7 degrees.

TABLE 5B

Aspheric Coefficients

| Surface # | 2 | 3 | 4 |
|---|---|---|---|
| k = | 3.147000000E−01 | 2.704910000E−01 | −1.000000000E+00 |
| A4 = | −4.598435500E−01 | −8.261682000E−01 | 8.233794300E−01 |
| A6 = | −2.076471600E+00 | −1.412535300E+00 | 3.588495200E+01 |
| A8 = | 3.019164100E+00 | −2.561359600E+00 | −4.286401100E+02 |
| A10 = | −1.496922900E+01 | 1.849635000E+01 | 2.780367800E+03 |
| A12 = | −3.770239800E+02 | −3.727353600E+01 | −1.017255300E+04 |
| A14 = | 8.756147500E+02 | 3.838217600E+00 | 1.993218300E+04 |
| A16 = | — | — | −1.622601200E+04 |

| Surface # | 5 | 6 | 7 |
|---|---|---|---|
| k = | −1.000000000E+00 | −1.877770000E−01 | −3.263010000E+00 |
| A4 = | 1.412347600E+00 | −1.700499400E−01 | −1.828465800E+00 |
| A6 = | 1.005591600E+01 | 1.089050700E+00 | 1.164257000E+01 |
| A8 = | −1.094418900E+02 | −2.779623100E+01 | −5.855463100E+01 |
| A10 = | 5.682849700E+02 | 1.060728500E+02 | 1.596031200E+02 |
| A12 = | −1.624291800E+03 | −5.580791700E+01 | −2.517655900E+02 |
| A14 = | 2.355755500E+03 | −6.760563700E+02 | 2.084174200E+02 |
| A16 = | −1.293230400E+03 | 9.524756300E+02 | −6.352474800E+01 |

In the 5th embodiment, the equation of the aspheric surface profiles of the aforementioned lens elements is the same as the equation of the 1st embodiment. Also, the definitions of these parameters shown in Table 5C below are the same as those stated in the 1st embodiment with corresponding values for the 5th embodiment, so an explanation in this regard will not be provided again.

Moreover, these parameters can be calculated from Table 5A and Table 5B as the following values and satisfy the following conditions:

TABLE 5C

Values of Conditional Expressions

| f [mm] | 1.09 | (R1 − R3)/(R1 + R3) | 1.64 |
|---|---|---|---|
| Fno | 1.40 | (R1 − R4)/(R1 + R4) | 1.88 |
| HFOV [deg.] | 30.7 | TD/T23 | 40.86 |
| FOV [deg.] | 61.4 | CT1/CT2 | 1.95 |
| TLd [mm] | 1.87 | 10 × T23/CT3 | 0.72 |
| TLd/ImgH | 2.88 | (CT1 + T12)/CT3 | 1.42 |
| tan(HFOVd) | 0.59 | V1d + V2d + V3d | 61.2 |
| FOVd/Fno [deg.] | 43.9 | V1d/N1d + V2d/N2d | 24.6 |
| Fno × FOVd [deg.] | 86.0 | V1d/N1d + V3d/N3d | 24.6 |
| TLd/EPDd | 2.40 | Nmaxd | 1.660 |
| BLd/EPDd | 0.56 | tan(CRA) | 0.25 |
| SLd/TD | 1.30 | Y3R2/Y1R1 | 1.48 |
| fd/f1d | 0.99 | SAG1R2/CT1 | −0.40 |
| f12d/f1d | 1.25 | SAG2R2/CT2 | −1.15 |

TABLE 5C-continued

Values of Conditional Expressions

| |f23d/f12d| | 2.82 | CT1/ET1 | 1.99 |
|---|---|---|---|
| fd/R4 | −2.83 | ET3/CT3 | 0.88 |
| |fd/R3| + |SLd/R3| | 9.73 | — | — |

6th Embodiment

Figure 11:
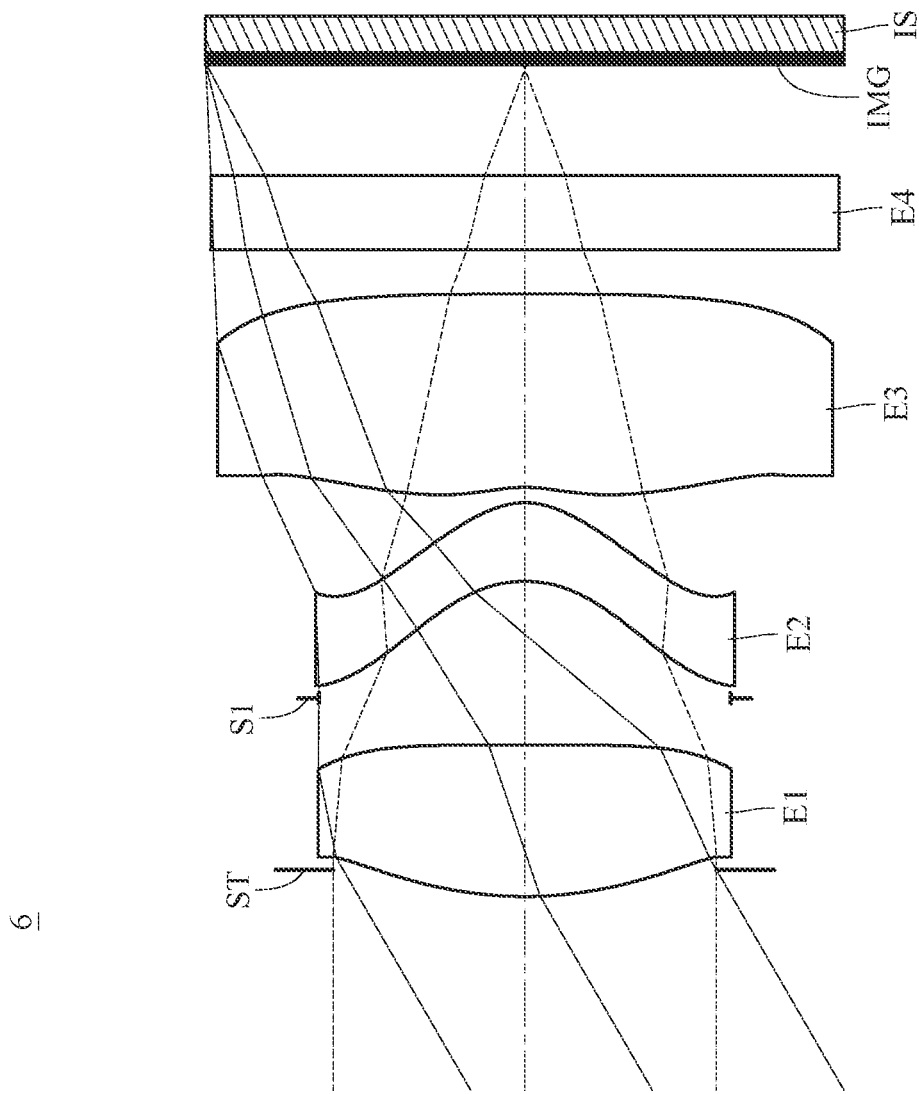
FIG. 11 is a schematic view of an image capturing unit according to the 6th embodiment of the present disclosure.
Figure 12:
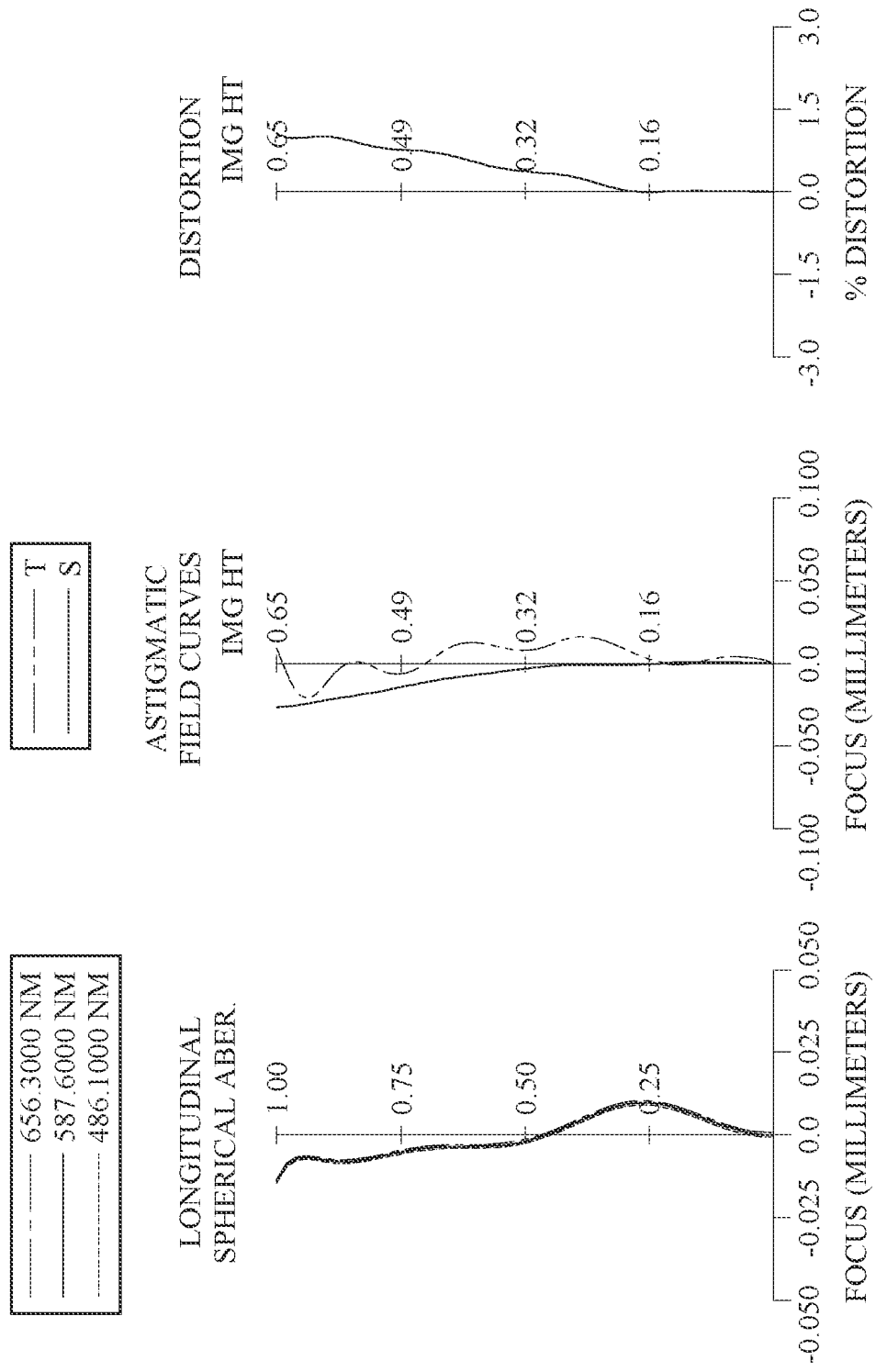
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit 6 includes the imaging lens assembly (its reference numeral is omitted) of the present disclosure and an image sensor IS. The imaging lens assembly includes, in order from an object side to an image side along an optical axis, an aperture stop ST, a first lens element E1, a stop S1, a second lens element E2, a third lens element E3, a filter E4 and an image surface IMG. The imaging lens assembly includes three single and non-cemented lens elements (E1, E2 and E3) with no additional lens element disposed between each of the adjacent three lens elements. In addition, there is an air gap in a paraxial region between each of all adjacent lens elements among the first lens element E1 through the third lens element E3.

The first lens element E1 with positive refractive power has an object-side surface being convex in a paraxial region thereof and an image-side surface being convex in a paraxial region thereof. The first lens element E1 is made of plastic material and has the object-side surface and the image-side surface being both aspheric. The object-side surface of the first lens element E1 has one inflection point.

The second lens element E2 with positive refractive power has an object-side surface being concave in a paraxial region thereof and an image-side surface being convex in a paraxial region thereof. The second lens element E2 is made of plastic material and has the object-side surface and the image-side surface being both aspheric. The object-side surface of the second lens element E2 has one inflection point. The image-side surface of the second lens element E2 has one inflection point. The image-side surface of the second lens element E2 has one critical point in an off-axis region thereof.

The third lens element E3 with negative refractive power has an object-side surface being concave in a paraxial region thereof and an image-side surface being convex in a paraxial region thereof. The third lens element E3 is made of plastic material and has the object-side surface and the image-side surface being both aspheric. The object-side surface of the third lens element E3 has two inflection points. The object-side surface of the third lens element E3 has two critical points in an off-axis region thereof.

The filter E4 is made of glass material and located between the third lens element E3 and the image surface IMG, and will not affect the focal length of the imaging lens assembly. The image sensor IS is disposed on or near the image surface IMG of the imaging lens assembly.

The detailed optical data of the 6th embodiment are shown in Table 6A and the aspheric surface data are shown in Table 6B below.

TABLE 6A

6th Embodiment f = 1.11 mm, Fno = 1.43, HFOV = 30.0 deg.

| Surface # | | Curvature Radius | Thickness | Material | Index 940 nm | d-line | Abbe # | Focal Length 940 nm | d-line |
|---|---|---|---|---|---|---|---|---|---|
| 0 | Object | Plano | Infinity | | | | | | |
| 1 | Ape. Stop | Plano | −0.054 | | | | | | |
| 2 | Lens 1 | 0.8092 (ASP) | 0.308 | Plastic | 1.634 | 1.660 | 20.4 | 1.27 | 1.22 |
| 3 | | −99.5025 (ASP) | 0.095 | | | | | | |
| 4 | Stop | Plano | 0.237 | | | | | | |
| 5 | Lens 2 | −0.2511 (ASP) | 0.160 | Plastic | 1.634 | 1.660 | 20.4 | 0.34 | 0.32 |
| 6 | | −0.1443 (ASP) | 0.031 | | | | | | |
| 7 | Lens 3 | −0.2762 (ASP) | 0.393 | Plastic | 1.616 | 1.639 | 23.5 | −0.47 | −0.45 |
| 8 | | −10.0771 (ASP) | 0.090 | | | | | | |
| 9 | Filter | Plano | 0.150 | Glass | 1.508 | 1.517 | 64.2 | — | — |
| 10 | | Plano | 0.226 | | | | | | |
| 11 | Image | Plano | — | | | | | | |

Note:

Reference wavelength is 940 nm.

An effective radius of the stop S1 (Surface 4) is 0.418 mm.

When reference wavelength is 587.6 nm (d-line), fd = 1.06 mm, TLd = 1.64 mm, BLd = 0.42 mm, and HFOVd = 30.6 degrees.

TABLE 6B

Aspheric Coefficients

| Surface # | 2 | 3 | 5 |
|---|---|---|---|
| k = | −1.0079300E+00 | 0.0000000E+00 | −1.0964700E+00 |
| A4 = | −5.6153252E−02 | −4.2804229E−01 | −1.8985906E+01 |
| A6 = | 2.6196810E−01 | −2.7678104E+01 | 8.1219879E+02 |
| A8 = | −5.9507483E+01 | 5.8068729E+02 | −1.7033568E+04 |
| A10 = | 6.6572334E+02 | −7.6225157E+03 | 2.3906902E+05 |
| A12 = | −4.1551005E+03 | 5.4220219E+04 | −2.2155486E+06 |
| A14 = | 8.7439357E+03 | −1.9709854E+05 | 1.3271019E+07 |
| A16 = | — | 2.8820087E+05 | −4.9316502E+07 |
| A18 = | — | — | 1.0329518E+08 |
| A20 = | — | — | −9.3129217E+07 |

| Surface # | 6 | 7 | 8 |
|---|---|---|---|
| k = | −3.5949400E+00 | −1.6432500E+01 | 0.0000000E+00 |
| A4 = | −2.0957501E+01 | 3.3337291E+01 | 8.1122114E−01 |
| A6 = | 5.9376481E+02 | −1.0417259E+03 | −2.7201675E+01 |
| A8 = | −1.0787438E+04 | 2.4895774E+04 | 1.7763994E+02 |
| A10 = | 1.3963697E+05 | −4.5178110E+05 | 3.7200430E+03 |
| A12 = | −1.2270395E+06 | 6.0500354E+06 | −9.8905418E+04 |
| A14 = | 7.2077650E+06 | −5.9293579E+07 | 1.1255380E+06 |
| A16 = | −2.7267229E+07 | 4.2536234E+08 | −7.8892175E+06 |
| A18 = | 6.0224901E+07 | −2.2330584E+09 | 3.7296104E+07 |
| A20 = | −5.8945300E+07 | 8.5311691E+09 | −1.2272890E+08 |
| A22 = | — | −2.3374204E+10 | 2.8215790E+08 |
| A24 = | — | 4.4619894E+10 | −4.4469034E+08 |
| A26 = | — | −5.6218481E+10 | 4.5769338E+08 |
| A28 = | — | 4.1938874E+10 | −2.7684574E+08 |
| A30 = | — | −1.4006972E+10 | 7.4536485E+07 |

In the 6th embodiment, the equation of the aspheric surface profiles of the aforementioned lens elements is the same as the equation of the 1st embodiment. Also, the definitions of these parameters shown in Table 6C below are the same as those stated in the 1st embodiment with corresponding values for the 6th embodiment, so an explanation in this regard will not be provided again.

Moreover, these parameters can be calculated from Table 6A and Table 6B as the following values and satisfy the following conditions:

TABLE 6C

Values of Conditional Expressions

| f [mm] | 1.06 | (R1 − R3)/(R1 + R3) | 1.90 |
|---|---|---|---|
| Fno | 1.43 | (R1 − R4)/(R1 + R4) | 1.43 |
| HFOV [deg.] | 30.6 | TD/T23 | 39.48 |
| FOV [deg.] | 61.2 | CT1/CT2 | 1.93 |
| TLd [mm] | 1.64 | 10 × T23/CT3 | 0.79 |
| TLd/ImgH | 2.54 | (CT1 + T12)/CT3 | 1.63 |
| tan(HFOVd) | 0.59 | V1d + V2d + V3d | 64.3 |
| FOVd/Fno [deg.] | 42.8 | V1d/N1d + V2d/N2d | 24.6 |
| Fno × FOVd [deg.] | 87.5 | V1d/N1d + V3d/N3d | 26.6 |
| TLd/EPDd | 2.22 | Nmaxd | 1.660 |
| BLd/EPDd | 0.57 | tan(CRA) | 0.25 |
| SLd/TD | 1.30 | Y3R2/Y1R1 | 1.55 |
| fd/f1d | 0.87 | SAG1R2/CT1 | −0.18 |
| f12d/f1d | 0.37 | SAG2R2/CT2 | −1.14 |
| |f23d/f12d| | 4.54 | CT1/ET1 | 1.81 |
| fd/R4 | −7.34 | ET3/CT3 | 0.69 |
| |fd/R3| + |SLd/R3| | 10.55 | — | — |

7th Embodiment

Figure 13:
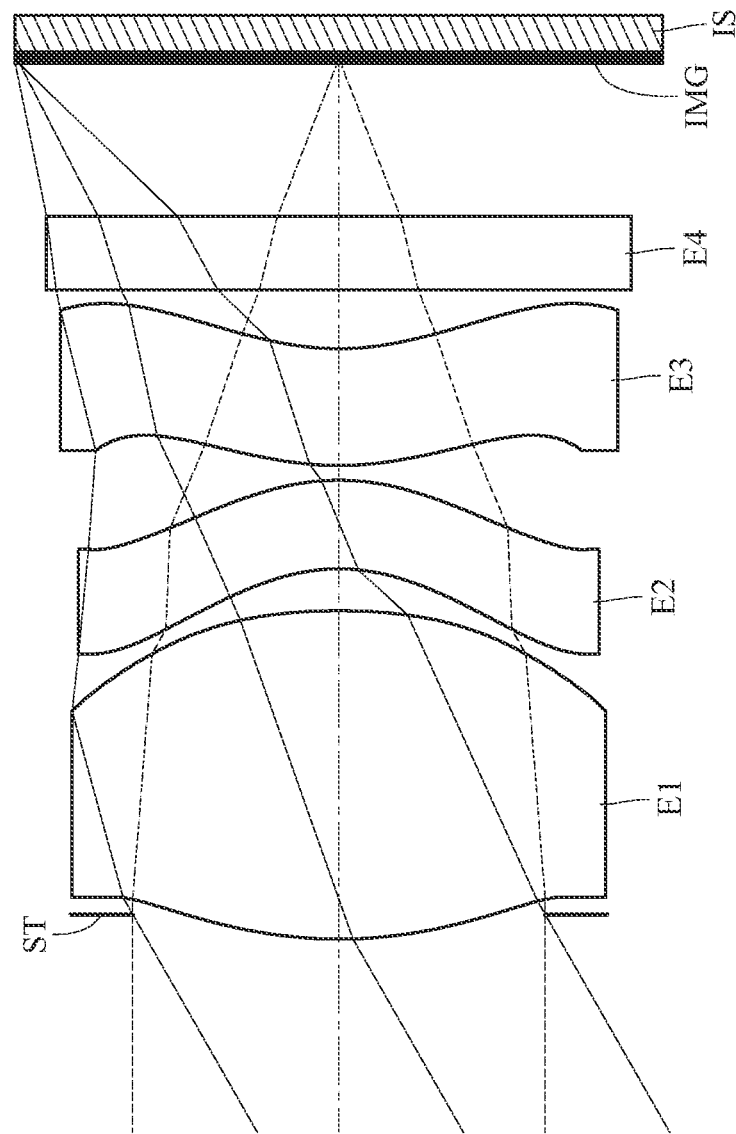
FIG. 13 is a schematic view of an image capturing unit according to the 7th embodiment of the present disclosure.
Figure 14:
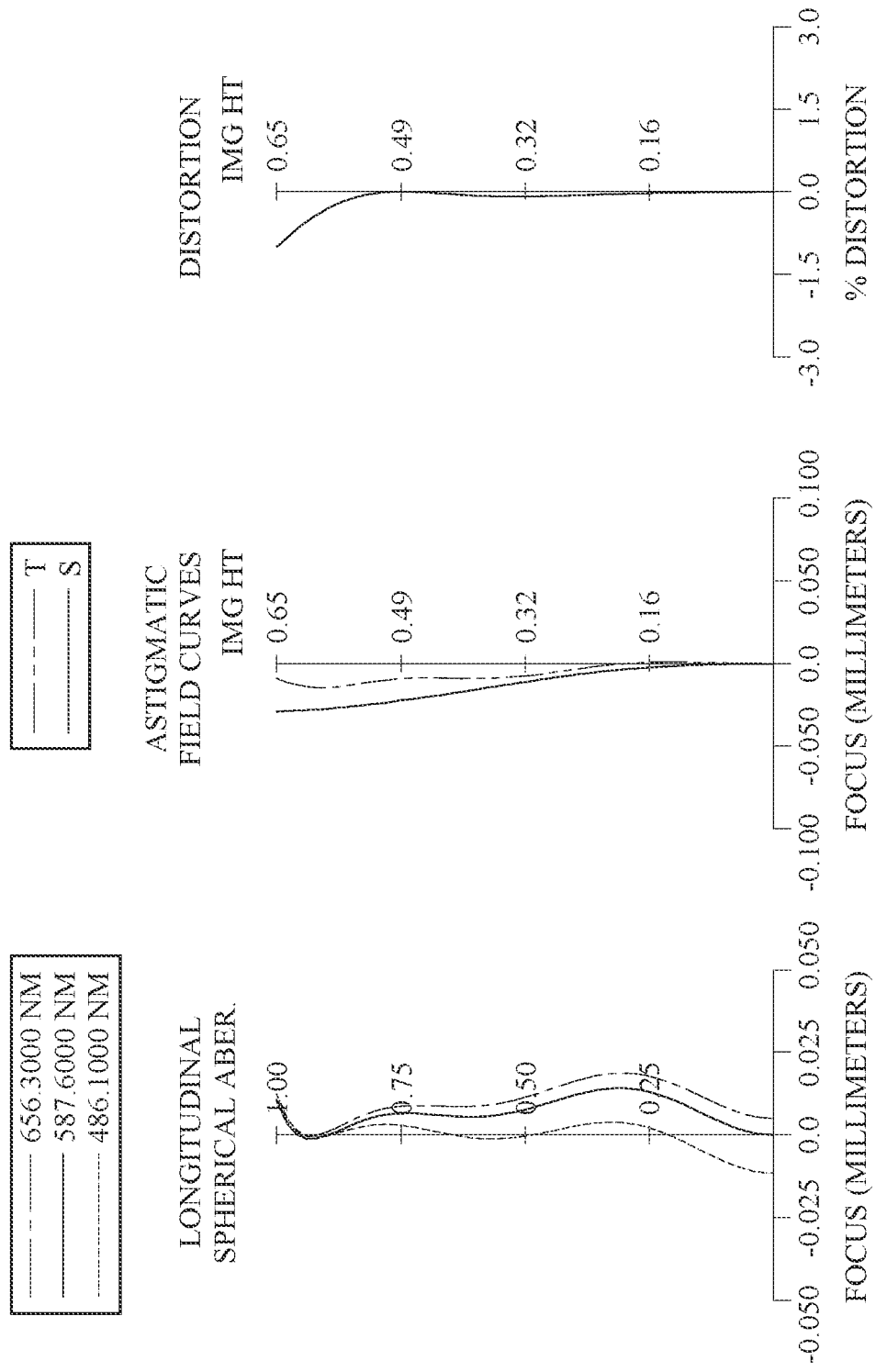
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit 7 includes the imaging lens assembly (its reference numeral is omitted) of the present disclosure and an image sensor IS. The imaging lens assembly includes, in order from an object side to an image side along an optical axis, an aperture stop ST, a first lens element E1, a second lens element E2, a third lens element E3, a filter E4 and an image surface IMG. The imaging lens assembly includes three single and non-cemented lens elements (E1, E2 and E3) with no additional lens element disposed between each of the adjacent three lens elements. In addition, there is an air gap in a paraxial region between each of all adjacent lens elements among the first lens element E1 through the third lens element E3.

The first lens element E1 with positive refractive power has an object-side surface being convex in a paraxial region thereof and an image-side surface being convex in a paraxial region thereof. The first lens element E1 is made of plastic material and has the object-side surface and the image-side surface being both aspheric. The object-side surface of the first lens element E1 has one inflection point.

The second lens element E2 with negative refractive power has an object-side surface being concave in a paraxial region thereof and an image-side surface being convex in a paraxial region thereof. The second lens element E2 is made of plastic material and has the object-side surface and the image-side surface being both aspheric. The object-side surface of the second lens element E2 has one inflection point. The image-side surface of the second lens element E2 has one inflection point. The object-side surface of the second lens element E2 has one critical point in an off-axis region thereof. The image-side surface of the second lens element E2 has one critical point in an off-axis region thereof.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has one inflection point. The image-side surface of the third lens element E3 has one inflection point. The object-side surface of the third lens element E3 has one critical point in an off-axis region thereof. The image-side surface of the third lens element E3 has one critical point in an off-axis region thereof.

The filter E4 is made of glass material and located between the third lens element E3 and the image surface IMG, and will not affect the focal length of the imaging lens assembly. The image sensor IS is disposed on or near the image surface IMG of the imaging lens assembly.

The detailed optical data of the 7th embodiment are shown in Table 7A and the aspheric surface data are shown in Table 7B below.

TABLE 7A

7th Embodiment
fd = 1.15 mm, Fno = 1.37, HFOVd = 29.7 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.050 | | | | |
| 2 | Lens 1 | 0.9074 (ASP) | 0.667 | Plastic | 1.544 | 56.0 | 1.07 |
| 3 | | −1.1884 (ASP) | 0.085 | | | | |
| 4 | Lens 2 | −0.3838 (ASP) | 0.180 | Plastic | 1.697 | 16.3 | −16.96 |
| 5 | | −0.4731 (ASP) | 0.030 | | | | |
| 6 | Lens 3 | 0.6461 (ASP) | 0.237 | Plastic | 1.697 | 16.3 | −37.47 |
| 7 | | 0.5355 (ASP) | 0.119 | | | | |
| 8 | Filter | Plano | 0.150 | Glass | 1.517 | 64.2 | — |
| 9 | | Plano | 0.310 | | | | |
| 10 | Image | Plano | — | | | | |

Note:
Reference wavelength is 587.6 nm (d-line).

TABLE 7B

Aspheric Coefficients

| Surface # | 2 | 3 | 4 |
|---|---|---|---|
| k = | −2.2087300E+01 | 5.0947500E−01 | −1.2738200E+00 |
| A4 = | 2.6163455E+00 | −1.8398493E+00 | 2.3905249E+00 |
| A6 = | −1.7300444E+01 | 7.6797301E+00 | −3.6243324E+00 |
| A8 = | 4.4020012E+01 | −5.3892332E+01 | −3.2060850E+01 |
| A10 = | 4.0552741E+01 | 3.3317225E+02 | 4.2208744E+02 |
| A12 = | −4.3182932E+02 | −9.2071719E+02 | −1.7146708E+03 |
| A14 = | — | 8.3936675E+02 | 3.3463884E+03 |
| A16 = | — | — | −2.8755574E+03 |

| Surface # | 5 | 6 | 7 |
|---|---|---|---|
| k = | −1.9616800E+00 | −3.1434400E+00 | −2.1138800E+00 |
| A4 = | 1.3936833E−01 | −2.6528581E+00 | −3.7532343E+00 |
| A6 = | 2.4772688E+01 | 2.6579062E+01 | 3.3238520E+01 |
| A8 = | −2.9326453E+02 | −2.8808032E+02 | −2.6542788E+02 |
| A10 = | 2.0005529E+03 | 1.6905968E+03 | 1.3256376E+03 |
| A12 = | −8.0436554E+03 | −5.8768859E+03 | −4.1751587E+03 |
| A14 = | 1.7578117E+04 | 1.0437276E+04 | 7.9887937E+03 |
| A16 = | −1.5563005E+04 | −6.9813127E+03 | −8.3783509E+03 |
| A18 = | — | — | 3.6521322E+03 |

In the 7th embodiment, the equation of the aspheric surface profiles of the aforementioned lens elements is the same as the equation of the 1st embodiment. Also, the definitions of these parameters shown in Table 7C below are the same as those stated in the 1st embodiment with corresponding values for the 7th embodiment, so an explanation in this regard will not be provided again.

Moreover, these parameters can be calculated from Table 7A and Table 7B as the following values and satisfy the following conditions:

TABLE 7C

Values of Conditional Expressions

| f [mm] | 1.15 | (R1 − R3)/(R1 + R3) | 2.47 |
|---|---|---|---|
| Fno | 1.37 | (R1 − R4)/(R1 + R4) | 3.18 |
| HFOV [deg.] | 29.7 | TD/T23 | 39.97 |
| FOV [deg.] | 59.4 | CT1/CT2 | 3.71 |
| TLd [mm] | 1.78 | 10 × T23/CT3 | 1.27 |
| TLd/ImgH | 2.74 | (CT1 + T12)/CT3 | 3.17 |
| tan(HFOVd) | 0.57 | V1d + V2d +V3d | 88.5 |
| FOVd/Fno [deg.] | 43.4 | V1d/N1d + V2d/N2d | 45.8 |
| Fno × FOVd [deg.] | 81.4 | V1d/N1d + V3d/N3d | 45.8 |
| TLd/EPDd | 2.13 | Nmaxd | 1.697 |
| BLd/EPDd | 0.69 | tan(CRA) | 0.51 |
| SLd/TD | 1.44 | Y3R2/Y1R1 | 1.29 |
| fd/f1d | 1.08 | SAG1R2/CT1 | −0.31 |

TABLE 7C-continued

Values of Conditional Expressions

| f12d/f1d | 1.25 | SAG2R2/CT2 | −0.78 |
|---|---|---|---|
| |f23d/f12d| | 7.41 | CT1/ET1 | 1.76 |
| fd/R4 | −2.42 | ET3/CT3 | 1.20 |
| |fd/R3| + |SLd/R3| | 7.49 | — | — |

8th Embodiment

Figure 15:
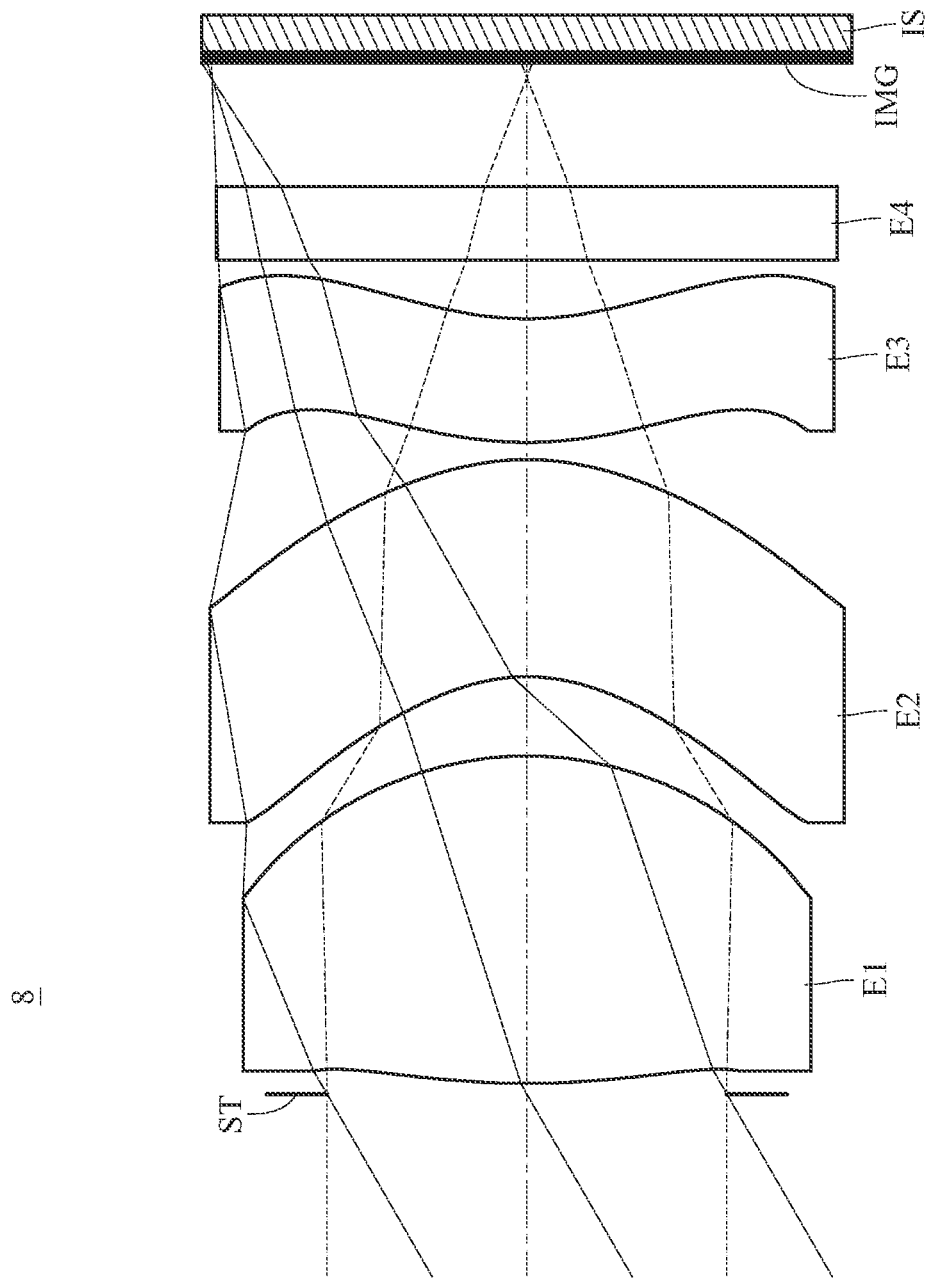
FIG. 15 is a schematic view of an image capturing unit according to the 8th embodiment of the present disclosure.
Figure 16:
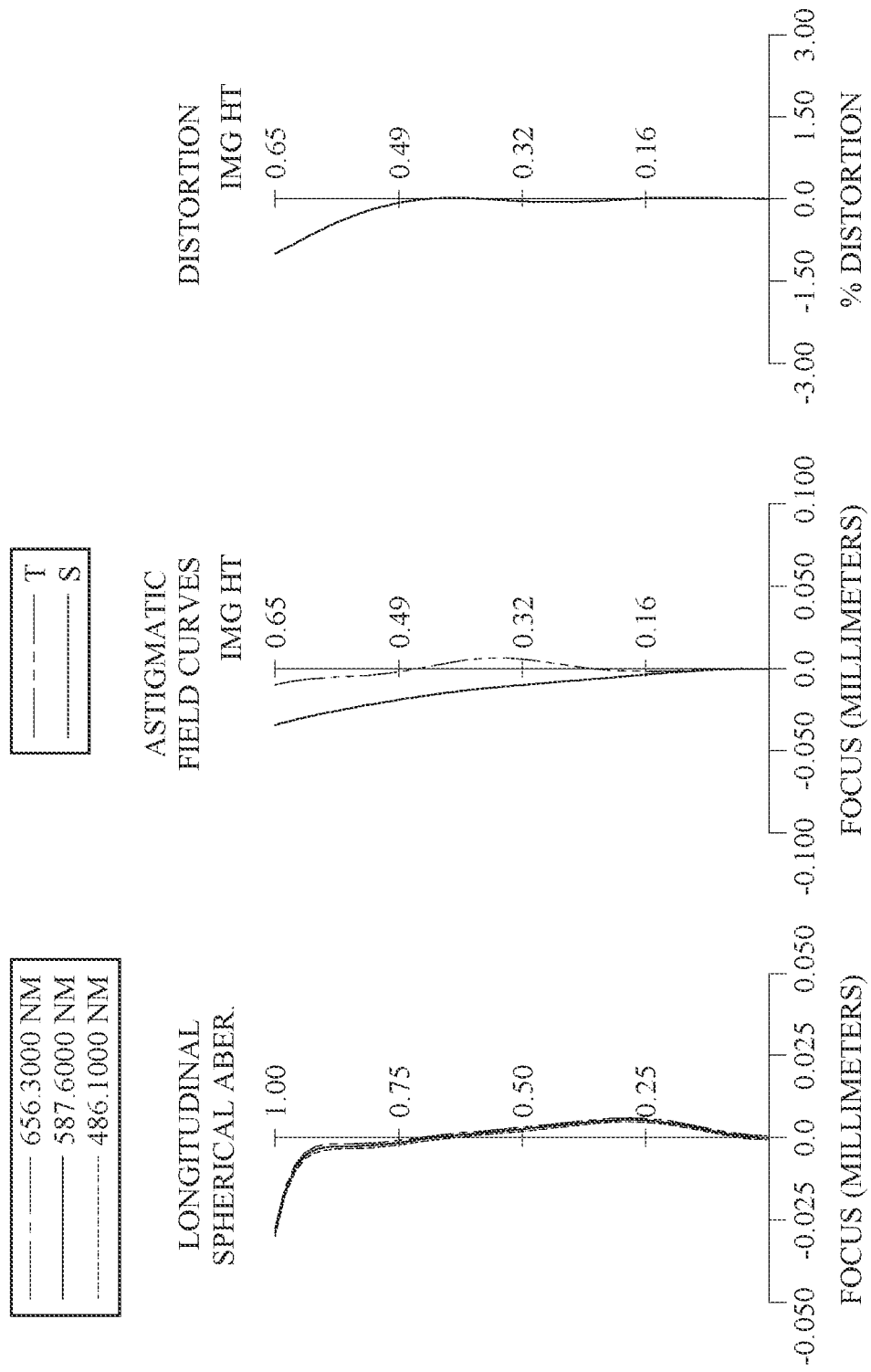
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit 8 includes the imaging lens assembly (its reference numeral is omitted) of the present disclosure and an image sensor IS. The imaging lens assembly includes, in order from an object side to an image side along an optical axis, an aperture stop ST, a first lens element E1, a second lens element E2, a third lens element E3, a filter E4 and an image surface IMG. The imaging lens assembly includes three single and non-cemented lens elements (E1, E2 and E3) with no additional lens element disposed between each of the adjacent three lens elements. In addition, there is an air gap in a paraxial region between each of all adjacent lens elements among the first lens element E1 through the third lens element E3.

The first lens element E1 with positive refractive power has an object-side surface being convex in a paraxial region thereof and an image-side surface being convex in a paraxial region thereof. The first lens element E1 is made of plastic material and has the object-side surface and the image-side surface being both aspheric. The object-side surface of the first lens element E1 has one inflection point. The object-side surface of the first lens element E1 has one critical point in an off-axis region thereof.

The second lens element E2 with positive refractive power has an object-side surface being concave in a paraxial region thereof and an image-side surface being convex in a paraxial region thereof. The second lens element E2 is made of plastic material and has the object-side surface and the image-side surface being both aspheric. The object-side surface of the second lens element E2 has one inflection point. The image-side surface of the second lens element E2 has one inflection point.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has one inflection point. The image-side surface of the third lens element E3 has one inflection point. The object-side surface of the third lens element E3 has one critical point in an off-axis region thereof. The image-side surface of the third lens element E3 has one critical point in an off-axis region thereof.

The filter E4 is made of glass material and located between the third lens element E3 and the image surface IMG, and will not affect the focal length of the imaging lens assembly. The image sensor IS is disposed on or near the image surface IMG of the imaging lens assembly.

The detailed optical data of the 8th embodiment are shown in Table 8A and the aspheric surface data are shown in Table 8B below.

TABLE 8A

8th Embodiment
f = 1.14 mm, Fno = 1.40, HFOV = 29.9 deg.

| Surface # | | Curvature Radius | Thickness | Material | Index 940 nm | Index d-line | Abbe # | Focal Length 940 nm | Focal Length d-line |
|---|---|---|---|---|---|---|---|---|---|
| 0 | Object | Plano | Infinity | | | | | | |
| 1 | Ape. Stop | Plano | 0.022 | | | | | | |
| 2 | Lens 1 | 1.6954 (ASP) | 0.665 | Plastic | 1.641 | 1.669 | 19.5 | 0.85 | 0.81 |
| 3 | | −0.6749 (ASP) | 0.161 | | | | | | |
| 4 | Lens 2 | −0.3755 (ASP) | 0.441 | Plastic | 1.641 | 1.669 | 19.5 | 39.02 | 24.08 |
| 5 | | −0.5397 (ASP) | 0.035 | | | | | | |
| 6 | Lens 3 | 0.8262 (ASP) | 0.251 | Plastic | 1.641 | 1.669 | 19.5 | −8.91 | −8.78 |
| 7 | | 0.6361 (ASP) | 0.119 | | | | | | |
| 8 | Filter | Plano | 0.150 | Glass | 1.508 | 1.517 | 64.2 | — | — |
| 9 | | Plano | 0.250 | | | | | | |
| 10 | Image | Plano | — | | | | | | |

Note:
Reference wavelength is 940 nm.
When reference wavelength is 587.6 nm (d-line), fd = 1.09 mm, TLd = 2.03 mm, BLd = 0.36 mm, and HFOVd = 31.1 degrees.

TABLE 8B

Aspheric Coefficients

| Surface # | 2 | 3 | 4 |
|---|---|---|---|
| k = | −9.0000000E+01 | −1.0587300E+00 | −1.0000000E+00 |
| A4 = | 1.5414395E+00 | 3.6054184E−01 | 3.8296228E+00 |
| A6 = | −1.8339457E+01 | −4.8537202E+00 | −2.8242036E+01 |
| A8 = | 1.1122528E+02 | 1.4216535E+01 | 1.6098648E+02 |
| A10 = | −4.3376119E+02 | −1.6115405E+01 | −6.3653866E+02 |
| A12 = | 5.5630952E+02 | −5.3208494E+01 | 1.5770844E+03 |
| A14 = | 0.0000000E+00 | 1.2367245E+02 | −1.9849844E+03 |
| A16 = | — | — | 9.1518698E+02 |

| Surface # | 5 | 6 | 7 |
|---|---|---|---|
| k = | −1.0000000E+00 | −6.2507600E−01 | −1.0000000E+00 |
| A4 = | 2.0143068E+00 | −5.3063073E−01 | −2.7509212E+00 |
| A6 = | −1.3000888E+01 | −1.0770483E+01 | 1.0686837E+01 |
| A8 = | 5.5055519E+01 | 6.0023993E+01 | −5.5324101E+01 |
| A10 = | −1.4610504E+02 | −2.1143763E+02 | 1.9365241E+02 |
| A12 = | 2.2657707E+02 | 3.8338268E+02 | −4.4668776E+02 |
| A14 = | −1.7724548E+02 | −3.4055758E+02 | 6.4197926E+02 |
| A16 = | 5.4647623E+01 | 1.6282750E+02 | −5.0268176E+02 |
| A18 = | — | −4.8195041E+01 | 1.6048523E+02 |

In the 8th embodiment, the equation of the aspheric surface profiles of the aforementioned lens elements is the same as the equation of the 1st embodiment. Also, the definitions of these parameters shown in Table 8C below are the same as those stated in the 1st embodiment with corresponding values for the 8th embodiment, so an explanation in this regard will not be provided again.

Moreover, these parameters can be calculated from Table 8A and Table 8B as the following values and satisfy the following conditions:

TABLE 8C

Values of Conditional Expressions

| | | | |
|---|---|---|---|
| f [mm] | 1.09 | (R1 − R3)/(R1 + R3) | 1.57 |
| Fno | 1.40 | (R1 − R4)/(R1 + R4) | 1.93 |
| HFOV [deg.] | 31.1 | TD/T23 | 44.37 |
| FOV [deg.] | 62.2 | CT1/CT2 | 1.51 |
| TLd [mm] | 2.03 | 10 × T23/CT3 | 1.39 |
| TLd/ImgH | 3.13 | (CT1 + T12)/CT3 | 3.29 |
| tan(HFOVd) | 0.60 | V1d + V2d + V3d | 58.4 |
| FOVd/Fno [deg.] | 44.4 | V1d/N1d + V2d/N2d | 23.3 |
| Fno × FOVd [deg.] | 87.1 | V1d/N1d + V3d/N3d | 23.3 |
| TLd/EPDd | 2.62 | Nmaxd | 1.669 |
| BLd/EPDd | 0.62 | tan(CRA) | 0.31 |
| SLd/TD | 1.32 | Y3R2/Y1R1 | 1.44 |
| fd/f1d | 1.33 | SAG1R2/CT1 | −0.44 |
| f12d/f1d | 1.44 | SAG2R2/CT2 | −0.68 |
| |f23d/f12d| | 7.16 | CT1/ET1 | 1.90 |

TABLE 8C-continued

Values of Conditional Expressions

| fd/R4 | −2.01 | ET3/CT3 | 1.16 |
|---|---|---|---|
| \|fd/R3\| + \|SLd/R3\| | 8.35 | — | — |

| f12d/f1d | 1.44 | SAG2R2/CT2 | −0.68 |
|---|---|---|---|
| \|f23d/f12d\| | 7.16 | CT1/ET1 | 1.90 |
| fd/R4 | −2.01 | ET3/CT3 | 1.16 |
| \|fd/R3\|+\|SLd/R3\| | 8.35 | | - |

9th Embodiment

Figure 17:
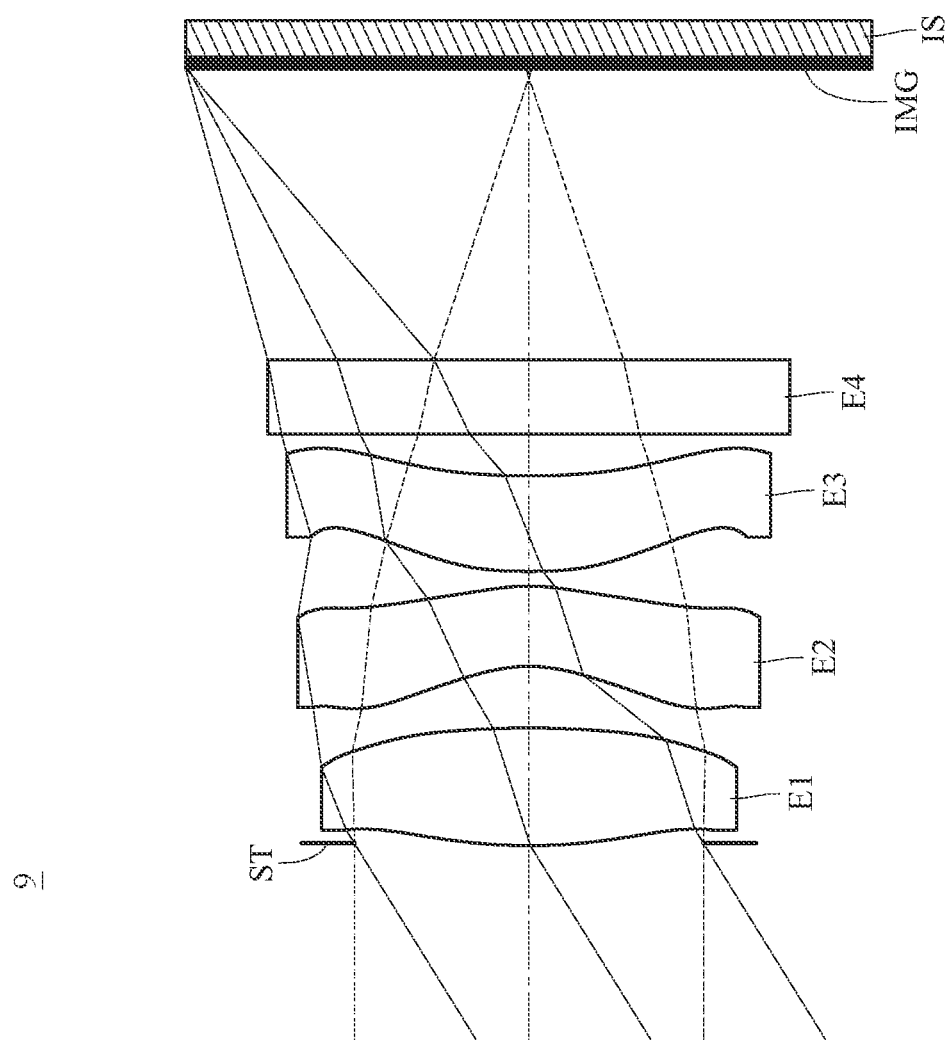
FIG. 17 is a schematic view of an image capturing unit according to the 9th embodiment of the present disclosure.
Figure 18:
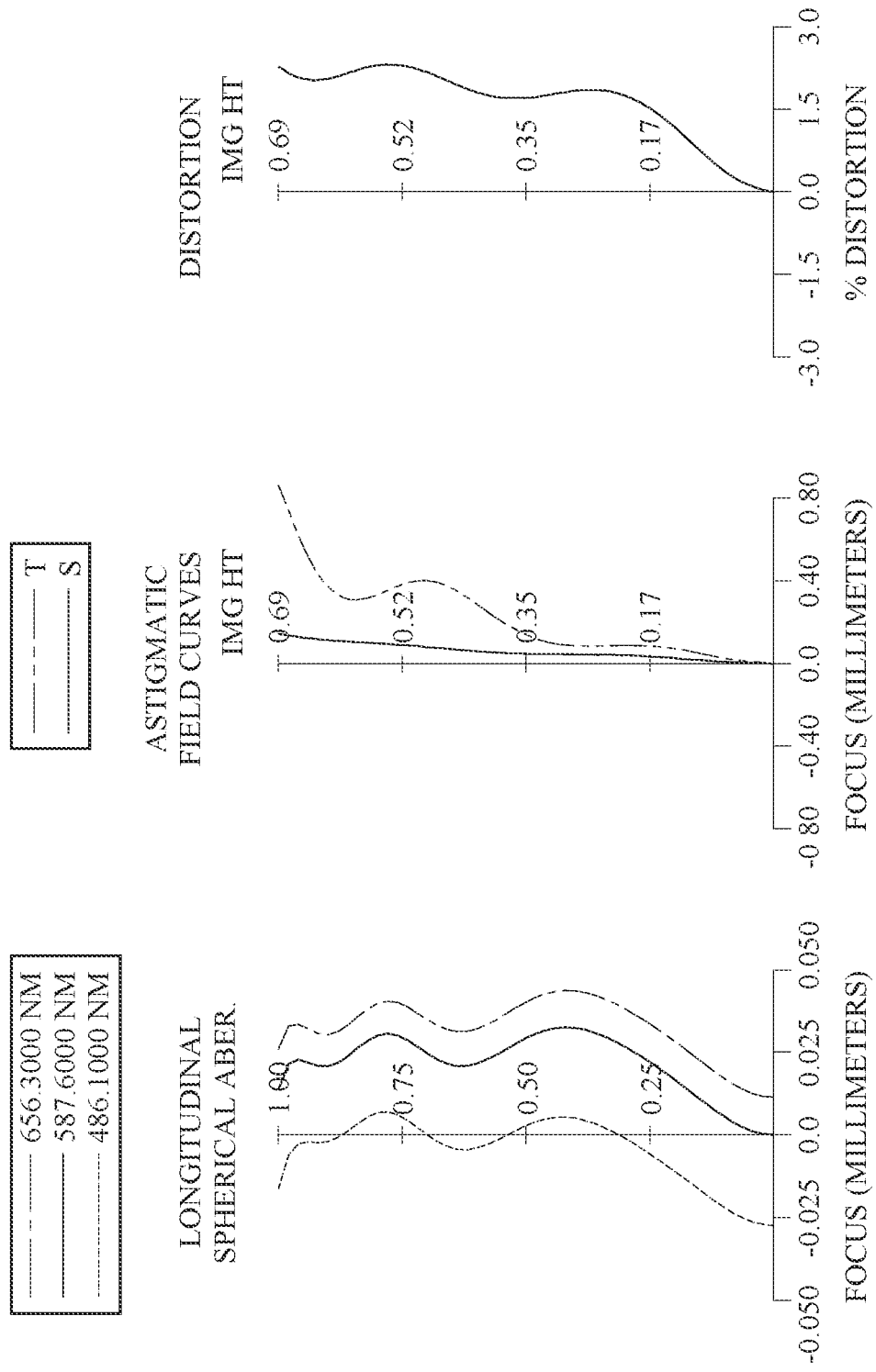
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit 9 includes the imaging lens assembly (its reference numeral is omitted) of the present disclosure and an image sensor IS. The imaging lens assembly includes, in order from an object side to an image side along an optical axis, an aperture stop ST, a first lens element E1, a second lens element E2, a third lens element E3, a filter E4 and an image surface IMG. The imaging lens assembly includes three single and non-cemented lens elements (E1, E2 and E3) with no additional lens element disposed between each of the adjacent three lens elements. In addition, there is an air gap in a paraxial region between each of all adjacent lens elements among the first lens element E1 through the third lens element E3.

The first lens element E1 with positive refractive power has an object-side surface being convex in a paraxial region thereof and an image-side surface being convex in a paraxial region thereof. The first lens element E1 is made of glass material and has the object-side surface and the image-side surface being both aspheric. The object-side surface of the first lens element E1 has one inflection point. The image-side surface of the first lens element E1 has one inflection point.

The second lens element E2 with negative refractive power has an object-side surface being concave in a paraxial region thereof and an image-side surface being convex in a paraxial region thereof. The second lens element E2 is made of plastic material and has the object-side surface and the image-side surface being both aspheric. The object-side surface of the second lens element E2 has two inflection points. The image-side surface of the second lens element E2 has four inflection points. The object-side surface of the second lens element E2 has two critical points in an off-axis region thereof. The image-side surface of the second lens element E2 has two critical points in an off-axis region thereof.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has one inflection point. The image-side surface of the third lens element E3 has one inflection point. The object-side surface of the third lens element E3 has one critical point in an off-axis region thereof. The image-side surface of the third lens element E3 has one critical point in an off-axis region thereof.

The filter E4 is made of glass material and located between the third lens element E3 and the image surface IMG, and will not affect the focal length of the imaging lens assembly. The image sensor IS is disposed on or near the image surface IMG of the imaging lens assembly.

The detailed optical data of the 9th embodiment are shown in Table 9A and the aspheric surface data are shown in Table 9B below.

TABLE 9A

9th Embodiment
fd = 1.06 mm, Fno = 1.50, HFOVd = 31.8 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.005 | | | | |
| 2 | Lens 1 | 1.2840 (ASP) | 0.239 | Glass | 1.741 | 27.8 | 0.96 |
| 3 | | −1.4665 (ASP) | 0.125 | | | | |
| 4 | Lens 2 | −0.3023 (ASP) | 0.163 | Plastic | 1.686 | 18.4 | −11.43 |
| 5 | | −0.3834 (ASP) | 0.030 | | | | |
| 6 | Lens 3 | 1.3668 (ASP) | 0.194 | Plastic | 1.697 | 16.3 | 7.50 |
| 7 | | 1.7425 (ASP) | 0.085 | | | | |
| 8 | Filter | Plano | 0.150 | Glass | 1.517 | 64.2 | — |
| 9 | | Plano | 0.591 | | | | |
| 10 | Image | Plano | — | | | | |

Note:
Reference wavelength is 587.6 nm (d-line).

TABLE 9B

Aspheric Coefficients

| Surface # | 2 | 3 | 4 |
|---|---|---|---|
| k = | 1.0347800E+00 | 1.2236600E+00 | −3.1575700E+00 |
| A4 = | 5.6564240E+00 | 9.5698901E+00 | 1.1579432E+01 |
| A6 = | −2.3359252E+02 | −4.1659217E+02 | −2.6736572E+02 |
| A8 = | 3.9003831E+03 | 9.1005994E+03 | 4.1694856E+03 |
| A10 = | −2.2419488E+04 | −1.1815637E+05 | −4.4700838E+04 |
| A12 = | −2.7056704E+05 | 8.8186801E+05 | 3.5364634E+05 |
| A14 = | 5.4815078E+06 | −3.3298987E+06 | −1.8943629E+06 |
| A16 = | −3.8146758E+07 | 3.1716701E+06 | 6.1781923E+06 |
| A18 = | 1.2308706E+08 | 1.4895768E+07 | −1.0972006E+07 |
| A20 = | −1.5315108E+08 | −3.3155415E+07 | 8.1439933E+06 |

| Surface # | 5 | 6 | 7 |
|---|---|---|---|
| k = | −2.1663400E+00 | −2.3053200E+00 | −2.7071900E+00 |
| A4 = | 3.5833422E+01 | 2.6908721E+01 | 3.7215202E+00 |
| A6 = | −9.9113849E+02 | −8.1132627E+02 | −3.9815440E+01 |
| A8 = | 1.7577692E+04 | 1.4539675E+04 | 2.1617827E+02 |
| A10 = | −2.0641587E+05 | −1.6987533E+05 | −9.9488929E+02 |
| A12 = | 1.6072497E+06 | 1.3032408E+06 | 4.5544527E+03 |
| A14 = | −8.0843477E+06 | −6.5299126E+06 | −2.2778001E+04 |
| A16 = | 2.4984746E+07 | 2.0663961E+07 | 7.8165310E+04 |
| A18 = | −4.2933677E+07 | −3.7823159E+07 | −1.3223727E+05 |
| A20 = | 3.1337243E+07 | 3.0716561E+07 | 8.3159108E+04 |

In the 9th embodiment, the equation of the aspheric surface profiles of the aforementioned lens elements is the same as the equation of the 1st embodiment. Also, the definitions of these parameters shown in Table 9C below are the same as those stated in the 1st embodiment with corresponding values for the 9th embodiment, so an explanation in this regard will not be provided again.

Moreover, these parameters can be calculated from Table 9A and Table 9B as the following values and satisfy the following conditions:

TABLE 9C

Values of Conditional Expressions

| f [mm] | 1.06 | (R1 − R3)/(R1 + R3) | 1.62 |
|---|---|---|---|
| Fno | 1.50 | (R1 − R4)/(R1 + R4) | 1.85 |
| HFOV [deg.] | 31.8 | TD/T23 | 25.03 |
| FOV [deg.] | 63.6 | CT1/CT2 | 1.47 |
| TLd [mm] | 1.58 | 10 × T23/CT3 | 1.55 |
| TLd/ImgH | 2.28 | (CT1 + T12)/CT3 | 1.88 |
| tan(HFOVd) | 0.62 | V1d + V2d + V3d | 62.4 |
| FOVd/Fno [deg.] | 42.4 | V1d/N1d + V2d/N2d | 26.9 |
| Fno × FOVd [deg.] | 95.4 | V1d/N1d + V3d/N3d | 25.5 |
| TLd/EPDd | 2.23 | Nmaxd | 1.741 |
| BLd/EPDd | 1.17 | tan(CRA) | 0.51 |
| SLd/TD | 2.09 | Y3R2/Y1R1 | 1.32 |
| fd/f1d | 1.11 | SAG1R2/CT1 | −0.34 |
| f12d/f1d | 1.31 | SAG2R2/CT2 | −0.39 |
| |f23d/f12d| | 11.09 | CT1/ET1 | 1.88 |
| fd/R4 | −2.77 | ET3/CT3 | 0.87 |
| |fd/R3| + |SLd/R3| | 8.72 | — | — |

10th Embodiment

Figure 19:
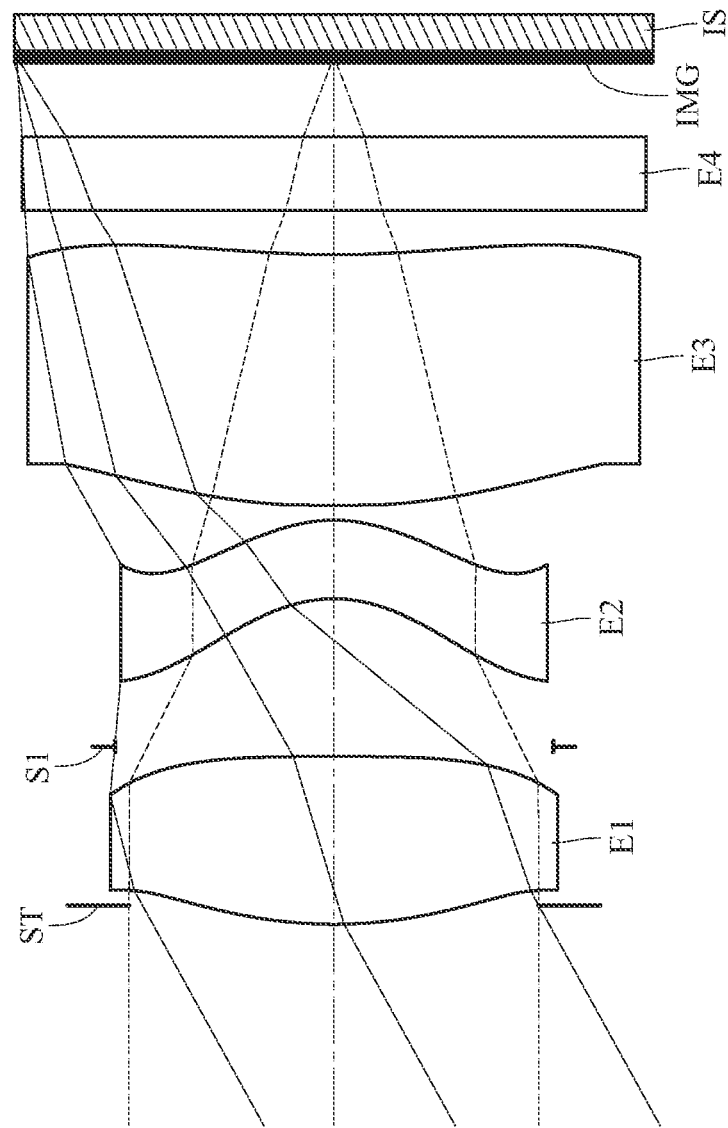
FIG. 19 is a schematic view of an image capturing unit according to the 10th embodiment of the present disclosure.
Figure 20:
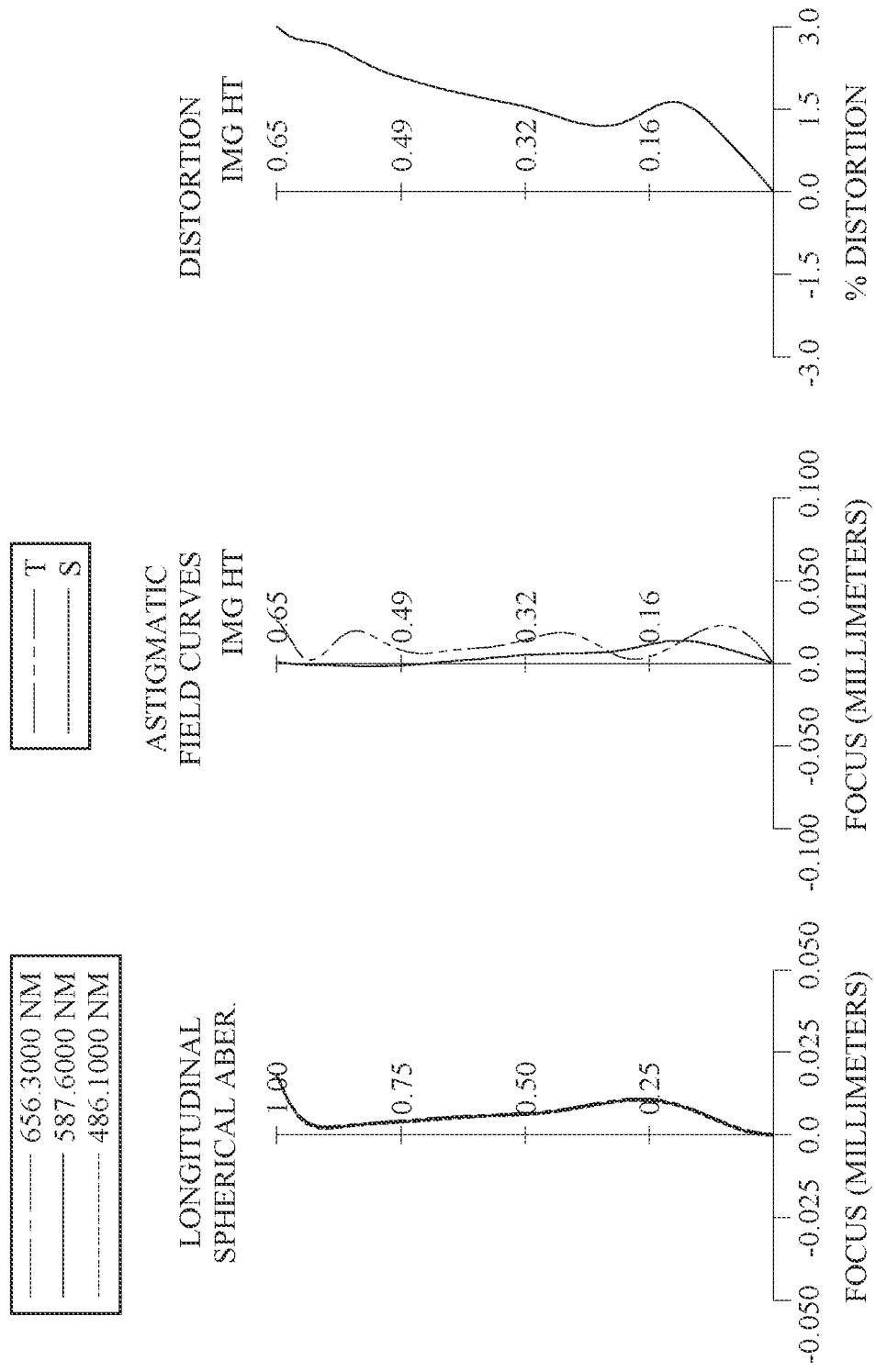
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit 10 includes the imaging lens assembly (its reference numeral is omitted) of the present disclosure and an image sensor IS. The imaging lens assembly includes, in order from an object side to an image side along an optical axis, an aperture stop ST, a first lens element E1, a stop S1, a second lens element E2, a third lens element E3, a filter E4 and an image surface IMG. The imaging lens assembly includes three single and non-cemented lens elements (E1, E2 and E3) with no additional lens element disposed between each of the adjacent three lens elements. In addition, there is an air gap in a paraxial region between each of all adjacent lens elements among the first lens element E1 through the third lens element E3.

The first lens element E1 with positive refractive power has an object-side surface being convex in a paraxial region thereof and an image-side surface being convex in a paraxial region thereof. The first lens element E1 is made of glass material and has the object-side surface and the image-side surface being both aspheric. The object-side surface of the first lens element E1 has one inflection point. The object-side surface of the first lens element E1 has one critical point in an off-axis region thereof.

The second lens element E2 with positive refractive power has an object-side surface being concave in a paraxial region thereof and an image-side surface being convex in a paraxial region thereof. The second lens element E2 is made of glass material and has the object-side surface and the image-side surface being both aspheric. The object-side surface of the second lens element E2 has one inflection point. The image-side surface of the second lens element E2 has one inflection point. The image-side surface of the second lens element E2 has one critical point in an off-axis region thereof.

The third lens element E3 with negative refractive power has an object-side surface being concave in a paraxial region thereof and an image-side surface being concave in a paraxial region thereof. The third lens element E3 is made of glass material and has the object-side surface and the image-side surface being both aspheric. The object-side surface of the third lens element E3 has two inflection points. The image-side surface of the third lens element E3 has one inflection point. The object-side surface of the third lens element E3 has one critical point in an off-axis region thereof. The image-side surface of the third lens element E3 has one critical point in an off-axis region thereof.

The filter E4 is made of glass material and located between the third lens element E3 and the image surface IMG, and will not affect the focal length of the imaging lens assembly. The image sensor IS is disposed on or near the image surface IMG of the imaging lens assembly.

The detailed optical data of the 10th embodiment are shown in Table 10A and the aspheric surface data are shown in Table 10B below.

TABLE 10A

10th Embodiment
f= 1.14 mm, Fno = 1.37, HFOV = 28.9 deg.

| Surface # | Curvature Radius | Thickness | Material | Index 940 nm | Index d-line | Abbe # | Focal Length 940 nm | Focal Length d-line |
|---|---|---|---|---|---|---|---|---|
| 0 | Object Plano | Infinity | | | | | | |
| 1 | Ape. Stop Plano | −0.038 | | | | | | |
| 2 | Lens 1 0.9194 (ASP) | 0.341 | Glass | 1.730 | 1.749 | 35.0 | 1.14 | 1.11 |
| 3 | −7.4337 (ASP) | 0.020 | | | | | | |
| 4 | Stop Plano | 0.300 | | | | | | |
| 5 | Lens 2 −0.2815 (ASP) | 0.160 | Glass | 1.717 | 1.741 | 27.8 | 1.76 | 1.67 |
| 6 | −0.2849 (ASP) | 0.030 | | | | | | |
| 7 | Lens 3 −67.5976 (ASP) | 0.509 | Glass | 1.717 | 1.741 | 27.8 | −2.68 | −2.59 |
| 8 | 1.9826 (ASP) | 0.090 | | | | | | |
| 9 | Filter Plano | 0.150 | Glass | 1.508 | 1.517 | 64.2 | — | — |
| 10 | Plano | 0.150 | | | | | | |
| 11 | Image Plano | — | | | | | | |

Note:
Reference wavelength is 940 nm.
An effective radius of the stop S1 (Surface 4) is 0.445 mm.
When reference wavelength is 587.6 nm (d-line), fd = 1.10 mm, TLd = 1.72 mm, BLd = 0.36 mm, and HFOVd = 29.3 degrees.

TABLE 10B

Aspheric Coefficients

| Surface # | 2 | 3 | 5 |
|---|---|---|---|
| k = | −2.1061100E+00 | −9.0000000E+01 | −1.0546500E+00 |
| A4 = | 1.5813184E−02 | −9.7069846E−01 | 4.9884942E+00 |
| A6 = | −2.7870971E+00 | −5.1956669E+00 | −6.9660586E+01 |
| A8 = | −1.1550682E+01 | 3.3399611E+01 | 2.3065180E+03 |
| A10 = | 3.6784495E+02 | −2.1026108E+02 | −4.0231951E+04 |
| A12 = | −4.8368131E+03 | 7.0294379E+02 | 4.6909585E+05 |
| A14 = | 2.5343240E+04 | −5.7756859E+02 | −3.8954632E+06 |
| A16 = | −5.1426553E+04 | −1.8773211E+03 | 2.2517327E+07 |
| A18 = | — | — | −8.4872262E+07 |
| A20 = | — | — | 1.8551136E+08 |
| A22 = | — | — | −1.7721625E+08 |

| Surface # | 6 | 7 | 8 |
|---|---|---|---|
| k = | −8.3710600E+00 | 9.0000000E+01 | 5.9217500E−01 |
| A4 = | −1.2183665E+01 | 2.0062981E+01 | −1.2437819E−01 |
| A6 = | 3.1991442E+02 | −7.3691093E+02 | −6.7446842E+01 |
| A8 = | −6.7052160E+03 | 1.9213516E+04 | 2.1374943E+03 |
| A10 = | 1.1179200E+05 | −3.6349728E+05 | −3.8465254E+04 |
| A12 = | −1.2674060E+06 | 5.0179568E+06 | 4.5135691E+05 |
| A14 = | 9.4522773E+06 | −5.0823405E+07 | −3.6511474E+06 |
| A16 = | −4.5170141E+07 | 3.7915481E+08 | 2.0963020E+07 |
| A18 = | 1.3082229E+08 | −2.0839209E+09 | −8.6635314E+07 |
| A20 = | −2.0272779E+08 | 8.3895898E+09 | 2.5824950E+08 |
| A22 = | 1.2065750E+08 | −2.4376157E+10 | −5.4959212E+08 |
| A24 = | — | 4.9657236E+10 | 8.1342905E+08 |
| A26 = | — | −6.7191731E+10 | −7.9460327E+08 |
| A28 = | — | 5.4178261E+10 | 4.6013928E+08 |
| A30 = | — | −1.9683987E+10 | −1.1953329E+08 |

In the 10th embodiment, the equation of the aspheric surface profiles of the aforementioned lens elements is the same as the equation of the 1st embodiment. Also, the definitions of these parameters shown in Table 10C below are the same as those stated in the 1st embodiment with corresponding values for the 10th embodiment, so an explanation in this regard will not be provided again.

Moreover, these parameters can be calculated from Table 10A and Table 10B as the following values and satisfy the following conditions:

TABLE C

Values of Conditional Expressions

| f [mm] | 1.10 | (R1 − R3)/(R1 + R3) | 1.88 |
|---|---|---|---|
| Fno | 1.37 | (R1 − R4)/(R1 + R4) | 1.90 |
| HFOV [deg.] | 29.3 | TD/T23 | 45.33 |
| FOV [deg.] | 58.6 | CT1/CT2 | 2.13 |
| TLd [mm] | 1.72 | 10 × T23/CT3 | 0.59 |
| TLd/ImgH | 2.70 | (CT1 + T12)/CT3 | 1.30 |
| tan(HFOVd) | 0.56 | V1d + V2d + V3d | 90.6 |
| FOVd/Fno [deg.] | 42.8 | V1d/N1d + V2d/N2d | 36.0 |
| Fno × FOVd [deg.] | 80.3 | V1d/N1d + V3d/N3d | 36.0 |
| TLd/EPDd | 2.14 | Nmaxd | 1.749 |
| BLd/EPDd | 0.45 | tan(CRA) | 0.29 |
| SLd/TD | 1.24 | Y3R2/Y1R1 | 1.46 |
| fd/f1d | 0.99 | SAG1R2/CT1 | −0.27 |
| f12d/f1d | 0.89 | SAG2R2/CT2 | −0.57 |
| |f23d/f12d| | 5.33 | CT1/ET1 | 1.89 |
| fd/R4 | −3.88 | ET3/CT3 | 0.82 |
| |fd/R3| + |SLd/R3| | 9.91 | | — |

11th Embodiment

Figure 21:
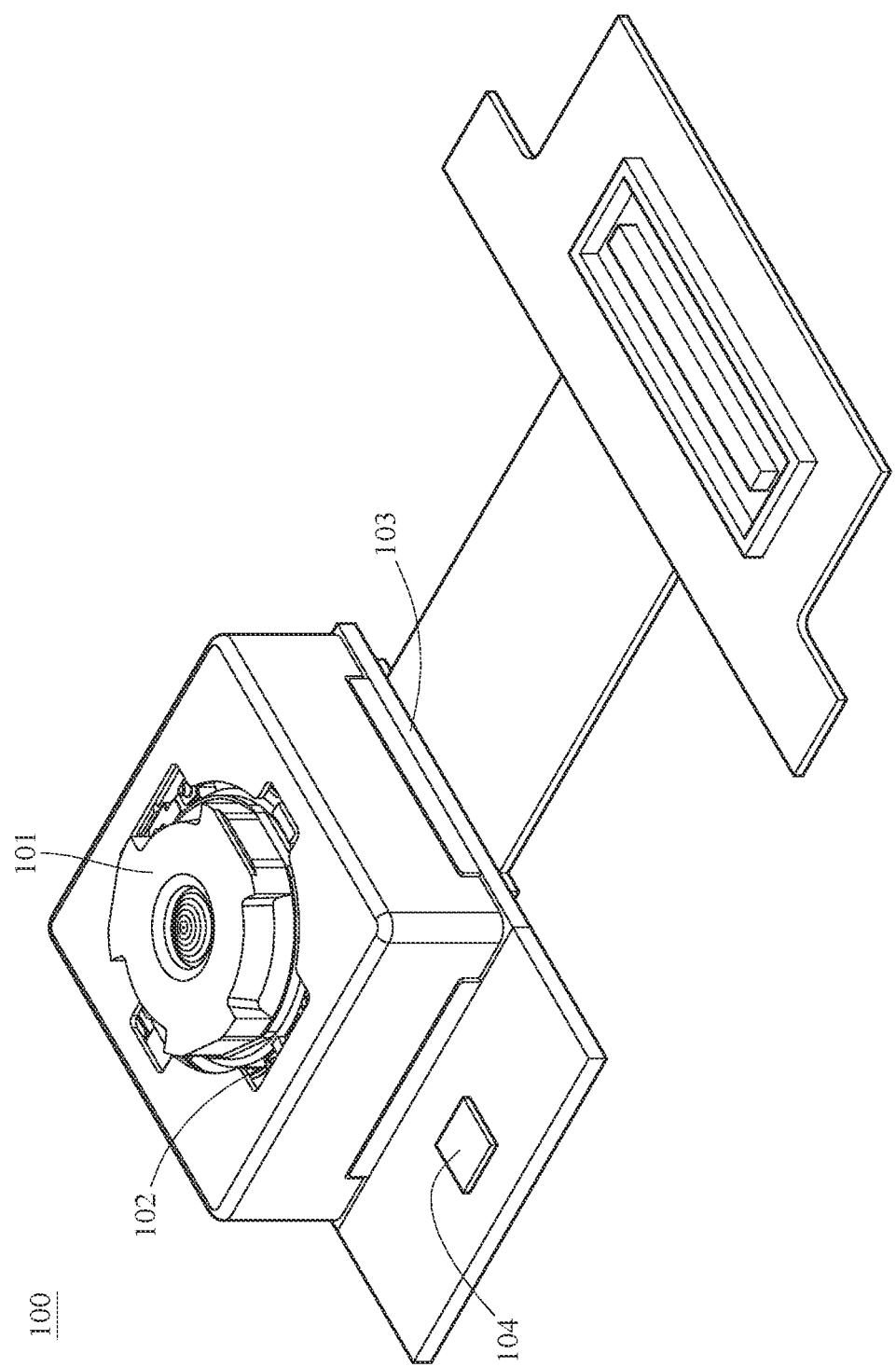
FIG. 21 is a perspective view of an image capturing unit according to the 11th embodiment of the present disclosure.

FIG. 21 is a perspective view of an image capturing unit according to the 11th embodiment of the present disclosure. In this embodiment, an image capturing unit 100 is a camera module including a lens unit 101, a driving device 102, an image sensor 103 and an image stabilizer 104. The lens unit 101 includes the imaging lens assembly as disclosed in the 1st embodiment, a barrel and a holder member (their reference numerals are omitted) for holding the imaging lens assembly. However, the lens unit 101 may alternatively be provided with the imaging lens assembly as disclosed in other embodiments of the present disclosure, and the present disclosure is not limited thereto. The imaging light converges in the lens unit 101 of the image capturing unit 100 to generate an image with the driving device 102 utilized for image focusing on the image sensor 103, and the generated image is then digitally transmitted to other electronic component for further processing.

The driving device 102 can have auto focusing functionality, and different driving configurations can be obtained through the usages of voice coil motors (VCM), micro electro-mechanical systems (MEMS), piezoelectric systems or shape memory alloy materials. The driving device 102 is favorable for obtaining a better imaging position of the lens unit 101, so that a clear image of the imaged object can be captured by the lens unit 101 with different object distances. The image sensor 103 (for example, CMOS or CCD), which can feature high photosensitivity and low noise, is disposed on the image surface of the imaging lens assembly to provide higher image quality.

The image stabilizer 104, such as an accelerometer, a gyro sensor and a Hall Effect sensor, is configured to work with the driving device 102 to provide optical image stabilization (OIS). The driving device 102 working with the image stabilizer 104 is favorable for compensating for pan and tilt of the lens unit 101 to reduce blurring associated with motion during exposure. In some cases, the compensation can be provided by electronic image stabilization (EIS) with image processing software, thereby improving image quality while in motion or low-light conditions.

12th Embodiment

Figure 22:
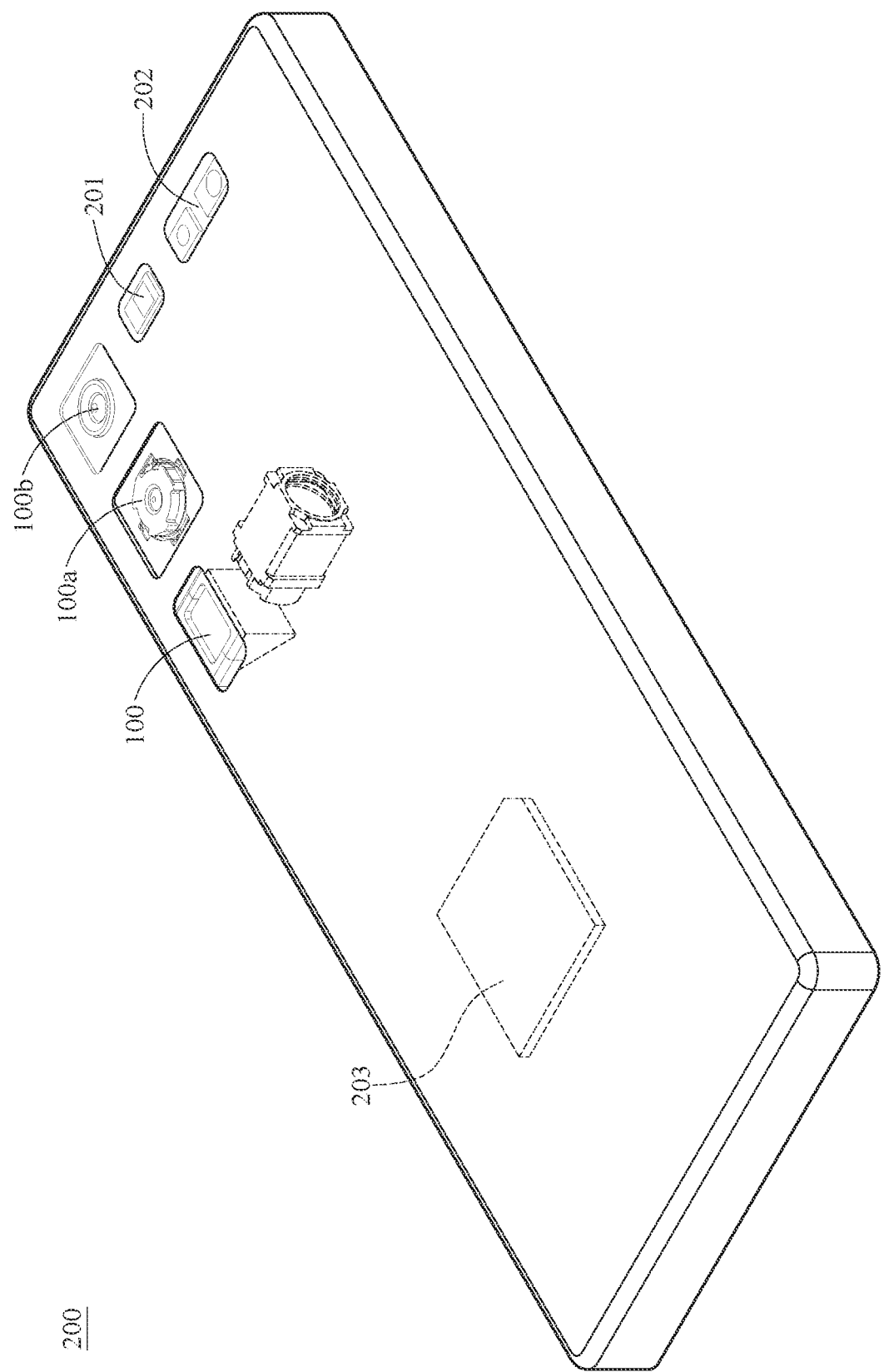
FIG. 22 is one perspective view of an electronic device according to the 12th embodiment of the present disclosure.
Figure 23:
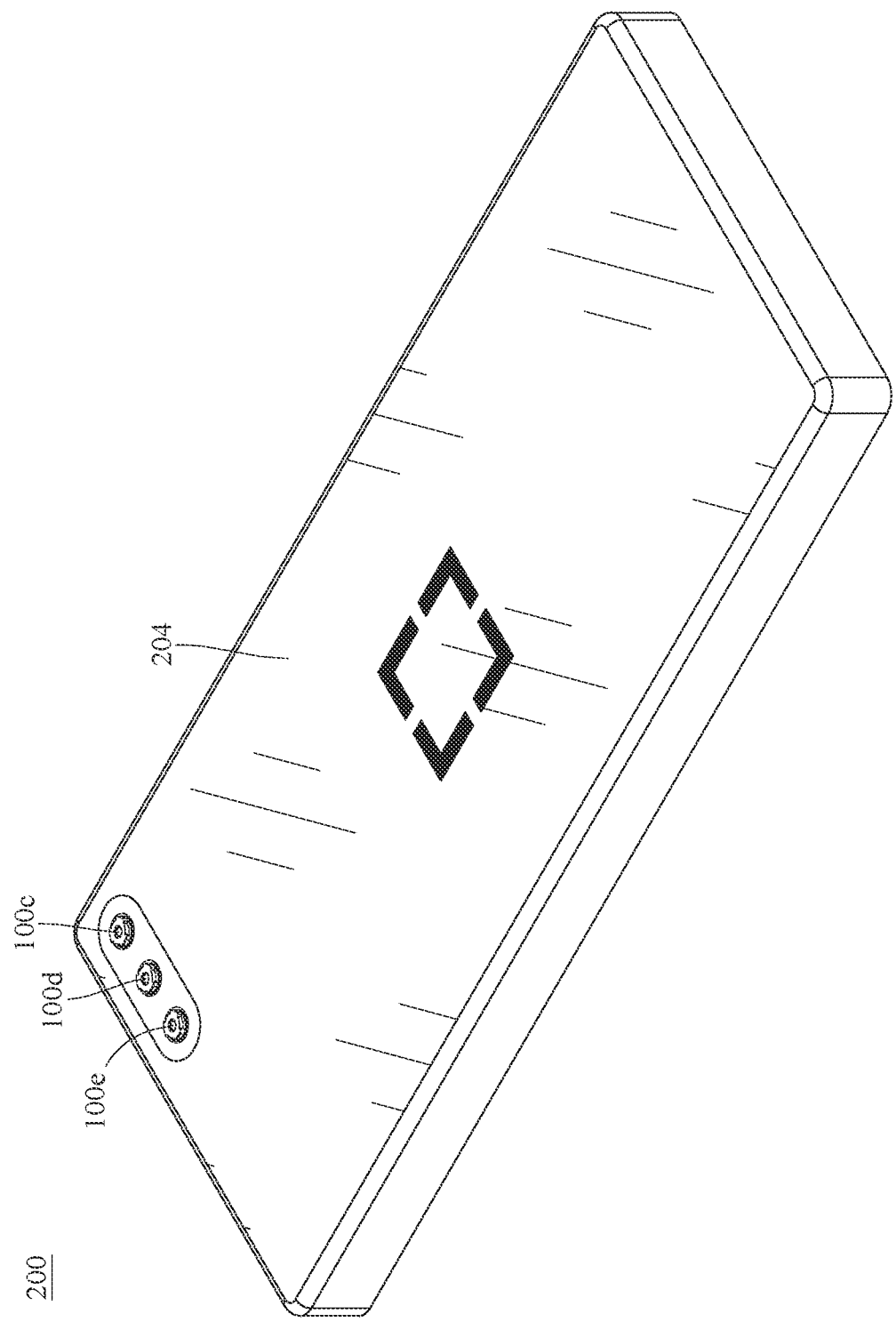
FIG. 23 is another perspective view of the electronic device in FIG. 22.
Figure 24:
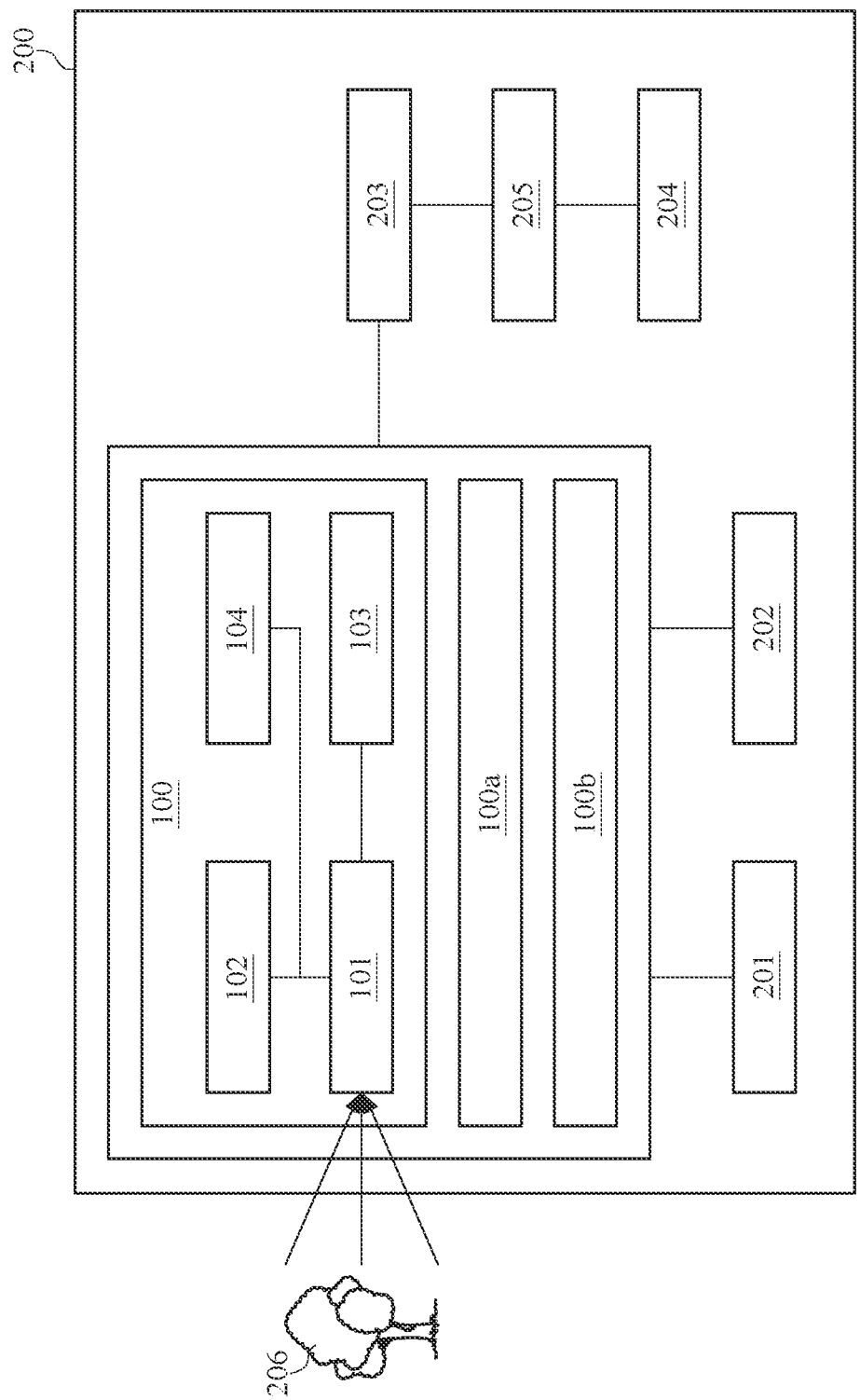
FIG. 24 is a block diagram of the electronic device in FIG. 22.

FIG. 22 is one perspective view of an electronic device according to the 12th embodiment of the present disclosure. FIG. 23 is another perspective view of the electronic device in FIG. 22. FIG. 24 is a block diagram of the electronic device in FIG. 22.

In this embodiment, an electronic device 200 is a smartphone including the image capturing unit 100 as disclosed in the 11th embodiment, an image capturing unit 100a, an image capturing unit 100b, an image capturing unit 100c, an image capturing unit 100d, an image capturing unit 100e, a flash module 201, a focus assist module 202, an image signal processor 203, a display module 204 and an image software processor 205. The image capturing unit 100, the image capturing unit 100a and the image capturing unit 100b are disposed on the same side of the electronic device 200 and each of the image capturing units 100, 100a and 100b has a single focal point. The focus assist module 202 can be a laser rangefinder or a ToF (time of flight) module, but the present disclosure is not limited thereto. The image capturing unit 100c, the image capturing unit 100d, the image capturing unit 100e and the display module 204 are disposed on the opposite side of the electronic device 200, and the display module 204 can be a user interface, such that the image capturing units 100c, 100d and 100e can be front-facing cameras of the electronic device 200 for taking selfies, but the present disclosure is not limited thereto. Furthermore, each of the image capturing units 100a, 100b, 100c, 100d and 100e can include the imaging lens assembly of the present disclosure and can have a configuration similar to that of the image capturing unit 100. In detail, each of the image capturing units 100a, 100b, 100c, 100d and 100e can include a lens unit, a driving device, an image sensor and an image stabilizer, and can also include a light-folding element for folding optical path. In addition, each lens unit of the image capturing units 100a, 100b, 100c, 100d and 100e can include the imaging lens assembly of the present disclosure, a barrel and a holder member for holding the imaging lens assembly.

The image capturing unit 100 is a telephoto image capturing unit with optical path folding function, the image capturing unit 100a is a wide-angle image capturing unit, the image capturing unit 100b is an ultra-wide-angle image capturing unit, the image capturing unit 100c is a wide-angle image capturing unit, the image capturing unit 100d is an ultra-wide-angle image capturing unit, and the image capturing unit 100e is a ToF image capturing unit. In this embodiment, the image capturing units 100, 100a and 100b have different fields of view, such that the electronic device 200 can have various magnification ratios so as to meet the requirement of optical zoom functionality. In addition, the image capturing unit 100e can determine depth information of the imaged object. Moreover, the light-folding configuration of the image capturing unit 100 can be similar to, for example, one of the configurations as shown in FIG. 34 to FIG. 36, which can be referred to foregoing descriptions corresponding to FIG. 34 to FIG. 36, and the details in this regard will not be provided again. In this embodiment, the electronic device 200 includes multiple image capturing units 100, 100a, 100b, 100c, 100d and 100e, but the present disclosure is not limited to the number and arrangement of image capturing units.

When a user captures images of an object 206, the light rays converge in the image capturing unit 100, the image capturing unit 100a or the image capturing unit 100b to generate images, and the flash module 201 is activated for light supplement. The focus assist module 202 detects the object distance of the imaged object 206 to achieve fast auto focusing. The image signal processor 203 is configured to optimize the captured image to improve image quality. The light beam emitted from the focus assist module 202 can be either conventional infrared or laser. In addition, the light rays may converge in the image capturing unit 100c, 100d or 100e to generate images. The display module 204 can include a touch screen, and the user is able to interact with the display module 204 and the image software processor 205 having multiple functions to capture images and complete image processing. Alternatively, the user may capture images via a physical button. The image processed by the image software processor 205 can be displayed on the display module 204.

13th Embodiment

Figure 25:
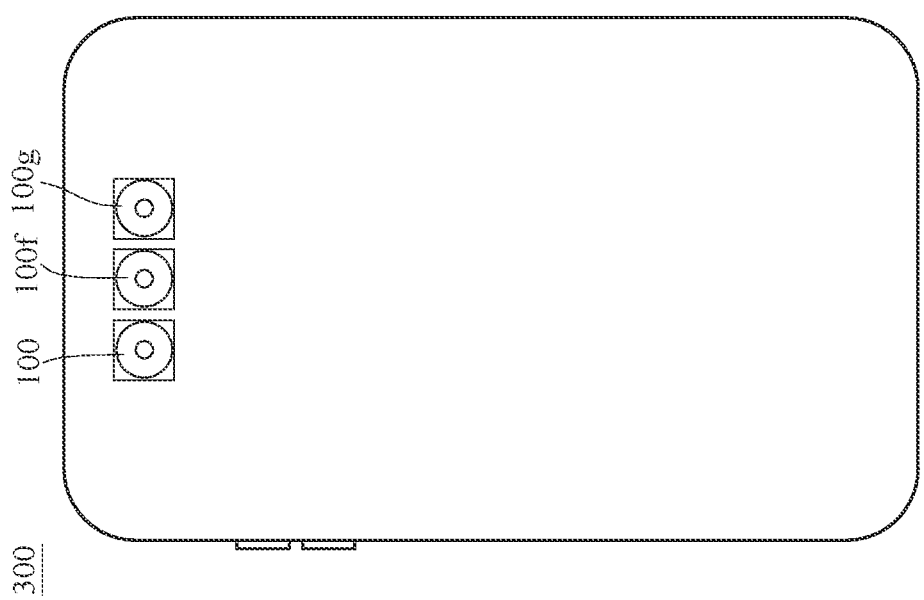
FIG. 25 is one perspective view of an electronic device according to the 13th embodiment of the present disclosure.
Figure 26:
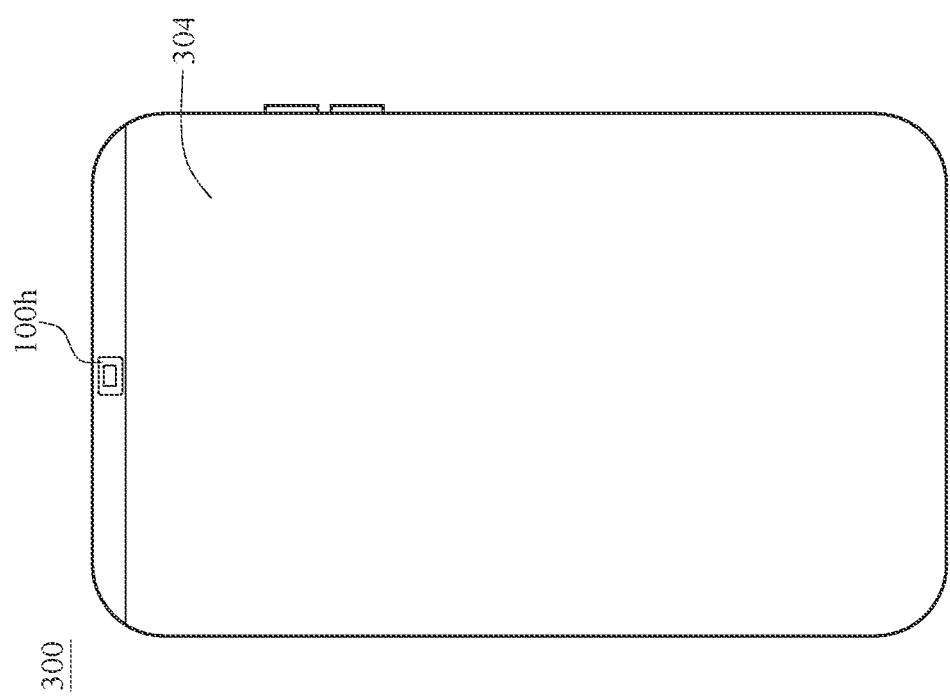
FIG. 26 is another perspective view of the electronic device in FIG. 25.

FIG. 25 is one perspective view of an electronic device according to the 13th embodiment of the present disclosure. FIG. 26 is another perspective view of the electronic device in FIG. 25.

In this embodiment, an electronic device 300 is a smartphone including the image capturing unit 100 as disclosed in the 11th embodiment, an image capturing unit 100f, an image capturing unit 100g, an image capturing unit 100h and a display module 304. As shown in FIG. 25, the image capturing unit 100, the image capturing unit 100f and the image capturing unit 100g are disposed on the same side of the electronic device 300 and each of the image capturing units 100, 100f and 100g has a single focal point. As shown in FIG. 26, the image capturing unit 100h and the display module 304 are disposed on the opposite side of the electronic device 300, such that the image capturing unit 100h can be a front-facing camera of the electronic device 300 for taking selfies, but the present disclosure is not limited thereto. Furthermore, each of the image capturing units 100f, 100g and 100h can include the imaging lens assembly of the present disclosure and can have a configuration similar to that of the image capturing unit 100. In detail, each of the image capturing units 100f, 100g and 100h can include a lens unit, a driving device, an image sensor and an image stabilizer. In addition, each lens unit of the image capturing units 100f, 100g and 100h can include the imaging lens assembly of the present disclosure, a barrel and a holder member for holding the imaging lens assembly.

The image capturing unit 100 is a telephoto image capturing unit, the image capturing unit 100f is a wide-angle image capturing unit, the image capturing unit 100g is an ultra-wide-angle image capturing unit, and the image capturing unit 100h is a wide-angle image capturing unit. In this embodiment, the image capturing units 100, 100f and 100g have different fields of view, such that the electronic device 300 can have various magnification ratios so as to meet the requirement of optical zoom functionality. In this embodiment, the electronic device 300 includes multiple image capturing units 100, 100f, 100g and 100h, but the present disclosure is not limited to the number and arrangement of image capturing units.

14th Embodiment

Figure 27:
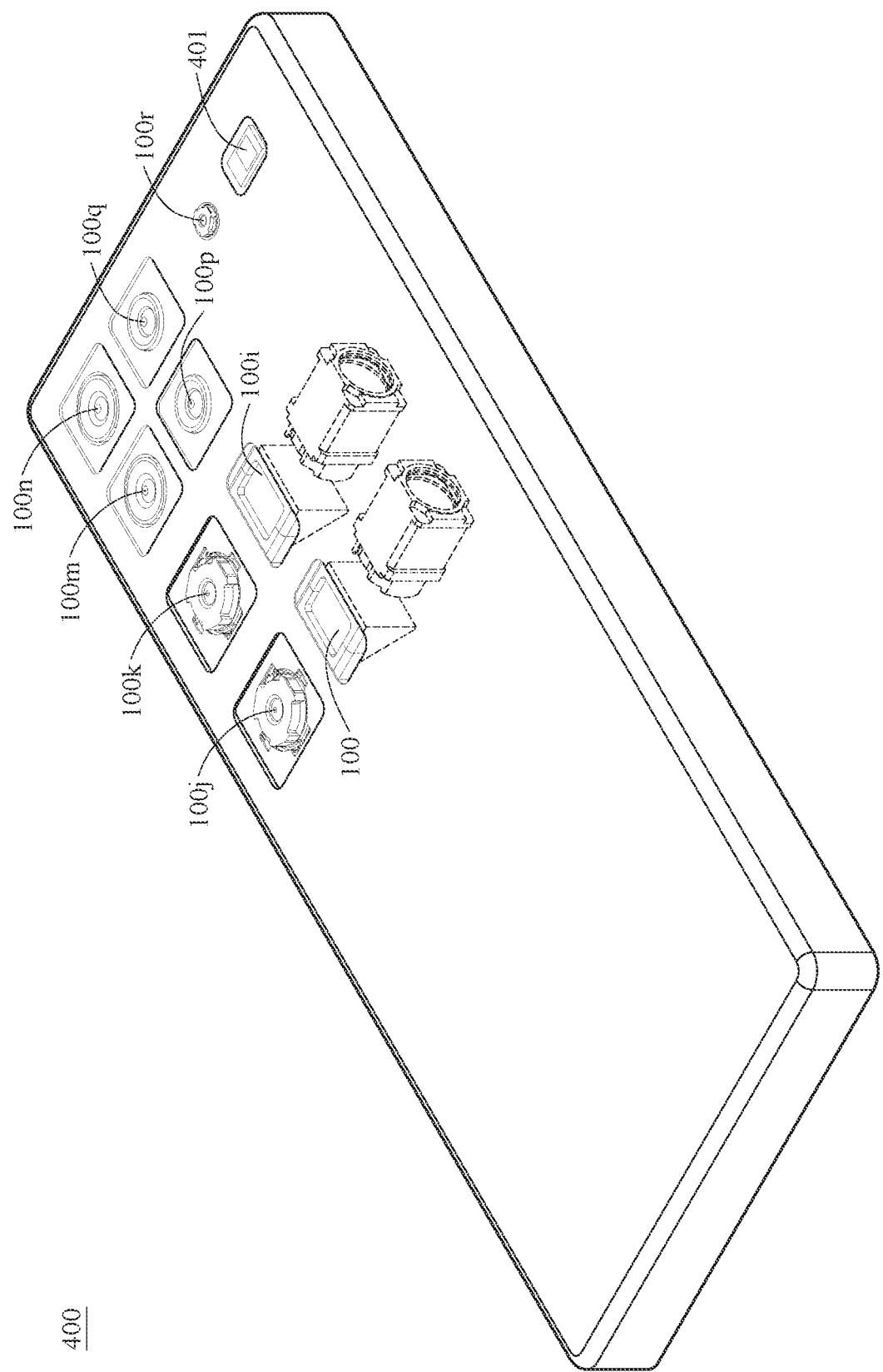
FIG. 27 is one perspective view of an electronic device according to the 14th embodiment of the present disclosure.

FIG. 27 is one perspective view of an electronic device according to the 14th embodiment of the present disclosure.

In this embodiment, an electronic device 400 is a smartphone including the image capturing unit 100 as disclosed in the 11th embodiment, an image capturing unit 100i, an image capturing unit 100j, an image capturing unit 100k, an image capturing unit 100m, an image capturing unit 100n, an image capturing unit 100p, an image capturing unit 100q, an image capturing unit 100r, a flash module 401, a focus assist module, an image signal processor, a display module and an image software processor (not shown). The image capturing units 100, 100i, 100j, 100k, 100m, 100n, 100p, 100q and 100r are disposed on the same side of the electronic device 400, while the display module is disposed on the opposite side of the electronic device 400. Furthermore, each of the image capturing units 100i, 100j, 100k, 100m, 100n, 100p, 100q and 100r can include the imaging lens assembly of the present disclosure and can have a configuration similar to that of the image capturing unit 100, and the details in this regard will not be provided again.

The image capturing unit 100 is a telephoto image capturing unit with optical path folding function, the image capturing unit 100i is a telephoto image capturing unit with optical path folding function, the image capturing unit 100j is a wide-angle image capturing unit, the image capturing unit 100k is a wide-angle image capturing unit, the image capturing unit 100m is an ultra-wide-angle image capturing unit, the image capturing unit 100n is an ultra-wide-angle telephoto image capturing unit, the image capturing unit 100p is a telephoto image capturing unit, the image capturing unit 100q is a telephoto image capturing unit, and the image capturing unit 100r is a ToF image capturing unit. In this embodiment, the image capturing units 100, 100i, 100j, 100k, 100m, 100n, 100p, and 100q have different fields of view, such that the electronic device 400 can have various magnification ratios so as to meet the requirement of optical zoom functionality. In addition, the image capturing unit 100r can determine depth information of the imaged object. Moreover, the light-folding configuration of the image capturing units 100 and 100i can be similar to, for example, one of the structures shown in FIG. 34 to FIG. 36, which can be referred to foregoing descriptions corresponding to FIG. 34 to FIG. 36, and the details in this regard will not be provided again. In this embodiment, the electronic device 400 includes multiple image capturing units 100, 100i, 100j, 100k, 100m, 100n, 100p, 100q and 100r, but the present disclosure is not limited to the number and arrangement of image capturing units. When a user captures images of an object, the light rays converge in the image capturing unit 100, 100i, 100j, 100k, 100m, 100n, 100p, 100q or 100r to generate images, and the flash module 401 is activated for light supplement. Further, the subsequent processes are performed in a manner similar to the abovementioned embodiments, and the details in this regard will not be provided again.

15th Embodiment

Figure 28:
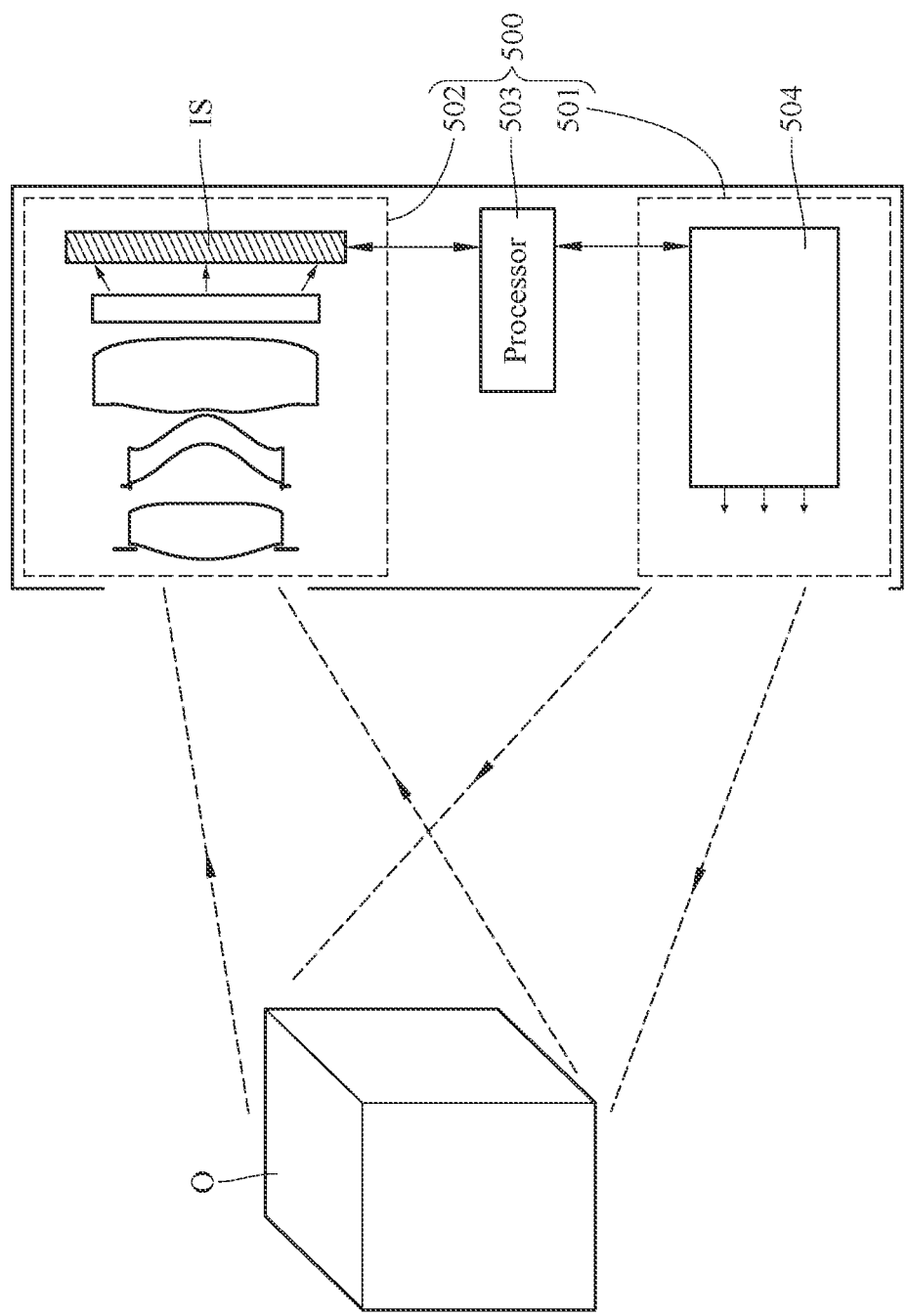
FIG. 28 is a schematic view of a ToF detecting module according to the 15th embodiment of the present disclosure.

FIG. 28 is a schematic view of a ToF detecting module according to the 15th embodiment of the present disclosure. In this embodiment, a ToF detecting module 500 includes an emitting end 501, a receiving end 502 and a processor 503. The emitting end 501 includes a light source 504, and the receiving end 502 includes the imaging lens assembly and the image sensor IS as disclosed in the 1st embodiment The light source 504 can be a laser, a superluminescent diode (SLED), a micro LED, a resonant cavity light emitting diode (RCLED), a vertical cavity surface emitting laser (VCSEL) and the like, and the light source 504 can be a single light source or multiple light sources. The light source 504 projects light onto a detected object O. The detected object O reflects the light, and the reflected light travels into the receiving end 502. The light traveling into the receiving end 502 passes through the imaging lens assembly and then is imaged on the image sensor IS.

The processor 503 is configured to analyze information of the image to obtain a relative distance between different parts of the detected object O, thereby determining a 3D profile of the detected object O.

The present disclosure is not limited to the ToF detecting module in FIG. 28. For example, the ToF detecting module can further include a focus tunable component or a reflector. The focus tunable component is configured to adjust the focal length of the imaging lens assembly of the receiving end 502 according to different photographing conditions so as to provide high image resolution. The reflector is configured to improve the space utilization.

According to the present disclosure, the ToF detecting module can be operated with infrared light having a wavelength range of 780 nm to 1200 nm, such that the ToF detecting module is applicable to applications such as augmented reality, face recognition and motion capturing.

16th Embodiment

Figure 29:
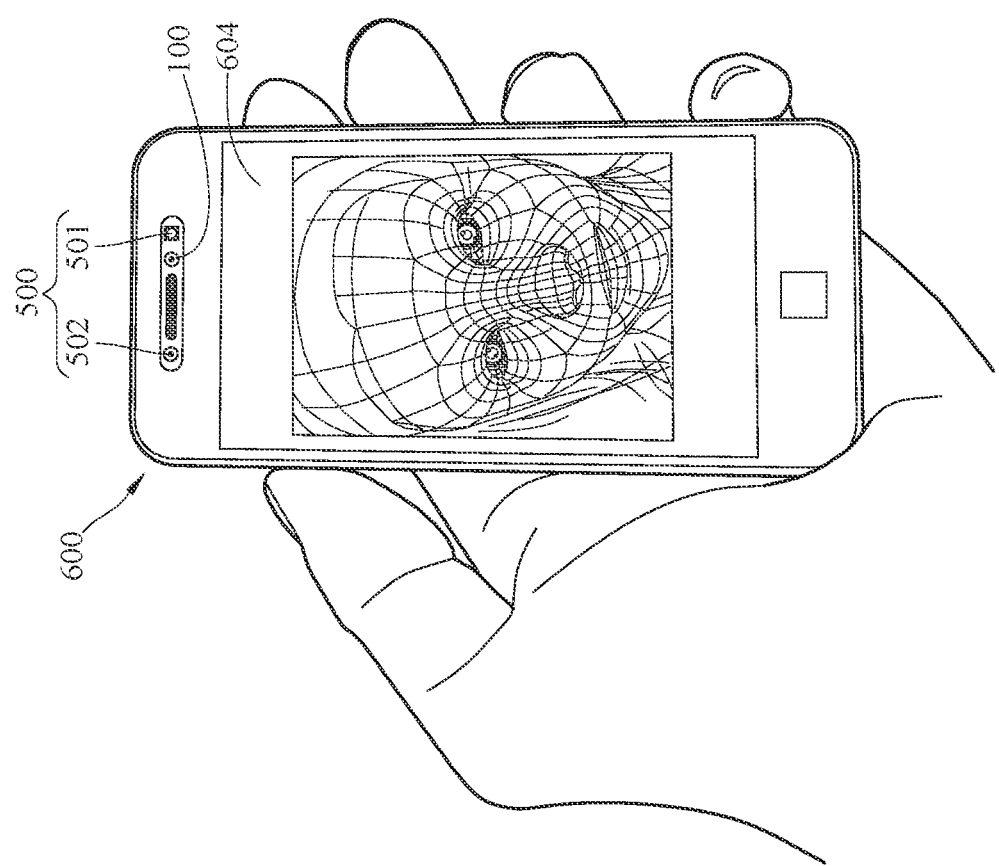
FIG. 29 is a front view of an electronic device according to the 16th embodiment of the present disclosure.

FIG. 29 is a front view of an electronic device according to the 16th embodiment of the present disclosure. In this embodiment, an electronic device 600 is a smartphone including the image capturing unit 100 as disclosed in the 11th embodiment, a display module 604 and the ToF detecting module 500 as disclosed in the 15th embodiment.

The image capturing unit 100 is operated within the wavelength range of visible light as a regular image capturing unit for imaging and photography.

The imaging lens assembly of the receiving end 502 of the ToF detecting module 500 receives the light reflected off the subject's face, and projected on the image sensor IS to generate a corresponding image. The processor 503 is configured to analyze information of the image to obtain a relative distance between different parts of the subject's face, thereby determining a 3D profile of the subject's face. Moreover, after the information of the image is analyzed by the processor 503, an analyzed human facial image can be displayed on the display module 604 of the electronic device 600.

The image capturing unit 100 including the imaging lens assembly as disclosed in the 7th embodiment and the receiving end 502 including the imaging lens assembly as disclosed in the 1st embodiment are only exemplary, and the present disclosure is not limited thereto. The image capturing unit 100 and the receiving end 502 may include the imaging lens assembly as disclosed in other embodiments of the present disclosure.

17th Embodiment

Figure 30:
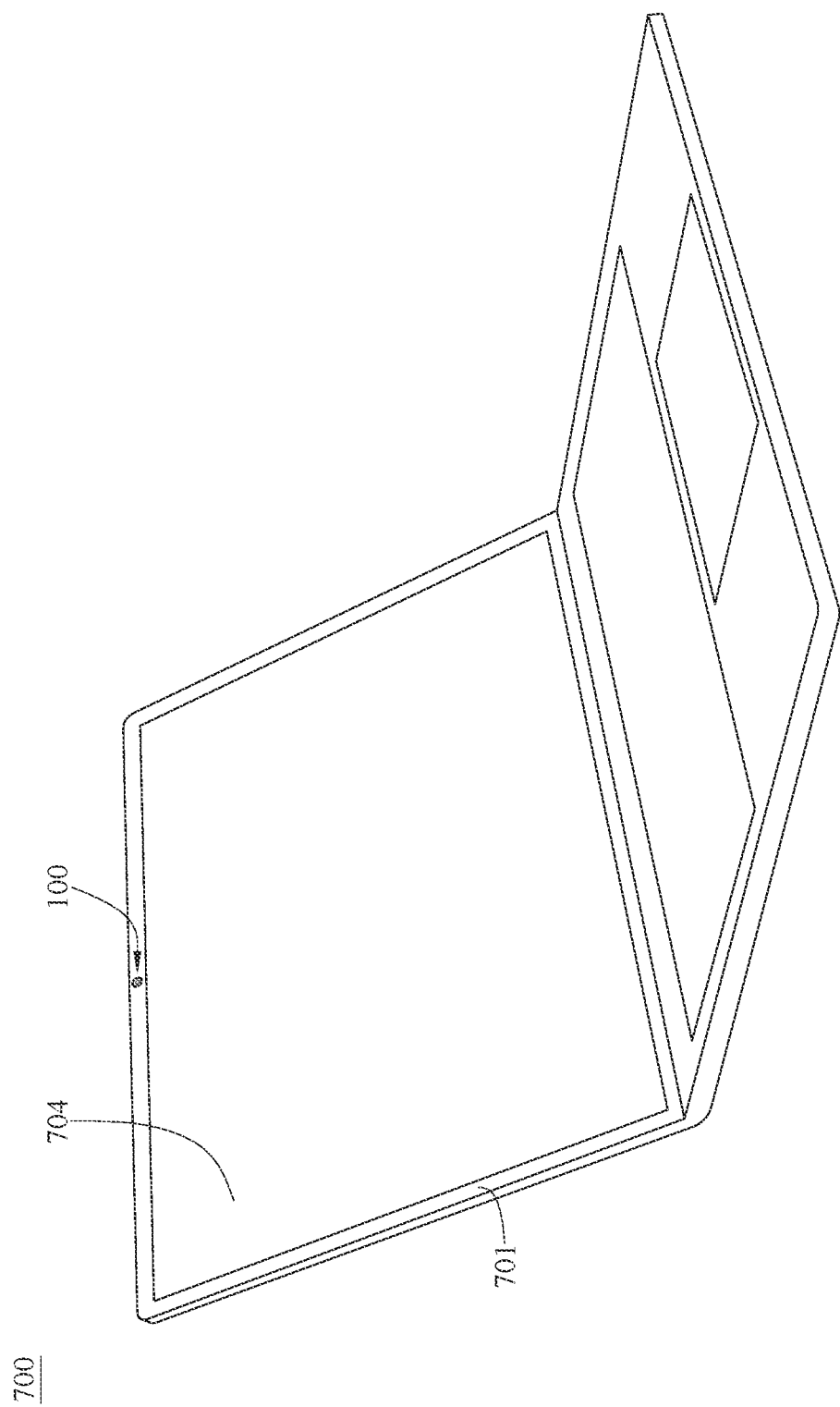
FIG. 30 is a schematic view of an electronic device according to the 17th embodiment of the present disclosure.

FIG. 30 is a schematic view of an electronic device according to the 17th embodiment of the present disclosure. In this embodiment, an electronic device 700 is a notebook computer including a casing 701, an image capturing unit 100 and a display module 704. The image capturing unit 100 and the display module 704 are disposed in the casing 701, and disposed on the same side of the electronic device 700, but the present disclosure is not limited thereto. Moreover, the image capturing unit 100 may include the imaging lens assembly as disclosed in any of the 1st to 10th embodiments of the present disclosure.

The electronic device 700 includes a single image capturing unit 100 as an example, but the present disclosure is not limited to the number or arrangement of image capturing units.

The smartphone in the embodiment(s) is only exemplary for showing the image capturing unit of the present disclosure installed in an electronic device, and the present disclosure is not limited thereto. The image capturing unit can be optionally applied to optical systems with a movable focus. Furthermore, the imaging lens assembly of the image capturing unit features good capability in aberration corrections and high image quality. For example, the image capturing unit can be applied to real-time detection on laptops, facial recognition, vehicle safety recognition, smart driving, fast focusing, night photography, interactive gaming consoles, distance sensing, and 3D shape sensing, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, aerial cameras, wearable devices, portable video recorders and other electronic imaging devices.

The foregoing description, for the purpose of explanation, has been described with reference to specific embodiments. It is to be noted that TABLES 1A-10C show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly comprising three lens elements, the three lens elements being, in order from an object side to an image side along an optical path, a first lens element, a second lens element and a third lens element, and each of the three lens elements having an object-side surface facing toward the object side and an image-side surface facing toward the image side;

wherein the object-side surface of the second lens element is concave in a paraxial region thereof, and at least one surface of at least one lens element in the imaging lens assembly has at least one inflection point;

wherein a curvature radius of the object-side surface of the first lens element is R1, a curvature radius of the object-side surface of the second lens element is R3, and a curvature radius of the image-side surface of the second lens element is R4;

and with a wavelength of helium d-line as a reference wavelength for the imaging lens assembly, an axial distance between the object-side surface of the first lens element and an image surface is TLd, an entrance pupil diameter of the imaging lens assembly is EPDd, an Abbe number of the first lens element is V1d, an Abbe number of the second lens element is V2d, an Abbe number of the third lens element is V3d, a focal length of the imaging lens assembly is fd, and a focal length of the first lens element is f1d, and the following conditions are satisfied:

$$1.75 < TLd/EPDd < 2.80;$$

$$0.75 < (R1 - R3)/(R1 + R3) < 2.55;$$

$$0.50 < (R1 - R4)/(R1 + R4) < 4.20;$$

$$30.00 < V1d + V2d + V3d < 105.00; \text{ and}$$

$$0.70 < fd/f1d < 1.70.$$

wherein a maximum effective radius of the object-side surface of the first lens element is Y1R1, a maximum effective radius of the image-side surface of the third lens element is Y3R2, a displacement in parallel with an optical axis from an axial vertex of the image-side surface of the first lens element to a maximum effective radius position of the image-side surface of the first lens element is SAG1R2, a central thickness of the first lens element is CT1, and the following conditions are satisfied:

$$1.10 < Y3R2/Y1R1 < 2.00; \text{ and}$$

$$-0.65 < SAG1R2/CT1 < 0.$$

2. The imaging lens assembly of claim 1, wherein the first lens element has positive refractive power, the object-side surface of the first lens element is convex in a paraxial region thereof, the image-side surface of the second lens element is convex in a paraxial region thereof, the object-side surface of the third lens element has at least one inflection point, and there is an air gap in a paraxial region between each of all adjacent lens elements of the imaging lens assembly.

3. The imaging lens assembly of claim 1, wherein an axial distance between the object-side surface of the first lens element and the image-side surface of the third lens element is TD, an axial distance between the second lens element and the third lens element is T23, and the following condition is satisfied:

$$22.90 < TD/T23 < 45.90.$$

4. The imaging lens assembly of claim 1, wherein with the wavelength of helium d-line as the reference wavelength for the imaging lens assembly, the Abbe number of the first lens element is V1d, the Abbe number of the second lens element is V2d, the Abbe number of the third lens element is V3d, the focal length of the first lens element is f1d, and a composite focal length of the first lens element and the second lens element is f12d, and the following conditions are satisfied:

$$30.00 < V1d + V2d + V3d < 96.00;$$

and $$0.00 < f12d/f1d.$$

5. The imaging lens assembly of claim 1, further comprising an aperture stop, wherein the curvature radius of the object-side surface of the second lens element is R3; and with the wavelength of helium d-line as the reference wavelength for the imaging lens assembly, the focal length of the imaging lens assembly is fd, a composite focal length of the first lens element and the second lens element is f12d, a composite focal length of the second lens element and the third lens element is f23d, and an axial distance between the aperture stop and the image surface is SLd, and the following conditions are satisfied:

$$7.30 < |fd/R3| + |SLd/R3| < 13.50;$$

and $$1.10 < |f23d/f12d| < 15.10.$$

6. The imaging lens assembly of claim 1, wherein a maximum image height of the imaging lens assembly is ImgH; and with the wavelength of helium d-line as the reference wavelength for the imaging lens assembly, the axial distance between the object-side surface of the first lens element and the image surface is TLd, and the following condition is satisfied:

$$2.00 < TLd/ImgH < 3.50.$$

7. The imaging lens assembly of claim 1, wherein with the wavelength of helium d-line as the reference wavelength for the imaging lens assembly, half of a maximum field of view of the imaging lens assembly is HFOVd, and the following condition is satisfied:

$$0.38 < \tan(HFOVd) < 0.68.$$

8. The imaging lens assembly of claim 1, wherein a chief ray angle of a maximum field of view on the image surface of the imaging lens assembly is CRA, and the following condition is satisfied:

$$0.16 < \tan(CRA) < 0.63.$$

9. The imaging lens assembly of claim 1, wherein at least two lens elements of the imaging lens assembly are made of plastic material;
wherein a wavelength of light incident into the imaging lens assembly is λ, and the following condition is satisfied:

780 nm<λ<1200 nm.

10. An image capturing unit comprising:
the imaging lens assembly of claim 1; and
an image sensor disposed on the image surface of the imaging lens assembly.

11. An electronic device comprising:
the image capturing unit of claim 10.

* * * * *